US008127429B2

(12) United States Patent
Saito et al.

(10) Patent No.: US 8,127,429 B2
(45) Date of Patent: Mar. 6, 2012

(54) METHOD FOR PRODUCING RING CORE

(75) Inventors: Masafumi Saito, Utsunomiya (JP);
Tetsuo Suzuki, Utsunomiya (JP); Naoya Saruhashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 12/516,125

(22) PCT Filed: Oct. 19, 2007

(86) PCT No.: PCT/JP2007/070488
§ 371 (c)(1),
(2), (4) Date: May 22, 2009

(87) PCT Pub. No.: WO2008/065830
PCT Pub. Date: Jun. 5, 2008

(65) Prior Publication Data
US 2010/0052463 A1     Mar. 4, 2010

(30) Foreign Application Priority Data

Nov. 27, 2006 (JP) .................................. 2006-318797
Apr. 17, 2007 (JP) .................................. 2007-108324

(51) Int. Cl.
*H02K 15/00* (2006.01)
(52) U.S. Cl. ............... 29/596; 29/597; 29/598; 29/732; 310/216.001

(58) Field of Classification Search ............ 29/596–598, 29/732–736, 605–606; 310/43, 71, 259
See application file for complete search history.

(56) References Cited

U.S. PATENT DOCUMENTS 3,283,399 A * 11/1966 Hart et al. ...................... 29/605
(Continued)

FOREIGN PATENT DOCUMENTS

JP          2000-041364 A      2/2000
(Continued)

*Primary Examiner* — Minh Trinh
(74) *Attorney, Agent, or Firm* — Arent Fox LLP

(57) ABSTRACT

A method for producing a ring core having a plurality of separate core plates with lobes defined on an inner circumferential surface thereof, the separate core plates being arranged and stacked in a ring-shaped pattern. The method includes the steps of supporting the separate core plates with either one of an inner guide member being disposed radially inwardly of the separate core plates stacked in the ring-shaped pattern and an outer guide member disposed radially outwardly of the separate core plates, and applying a pressure from the other of the inner guide member and the outer guide member, wherein the inner guide member has recesses corresponding to the lobes for positioning and supporting the lobes, and stacking the separate core plates in the ring-shaped pattern to form the ring core, while rotating the separate core plates in unison through a predetermined angle with the inner and outer guide members.

13 Claims, 39 Drawing Sheets

U.S. PATENT DOCUMENTS

| | | | |
|---|---|---|---|
| 4,116,033 A | * 9/1978 | Iwaki et al. | 72/142 |
| 4,403,489 A | * 9/1983 | Munsterman et al. | 72/19.6 |
| 6,147,431 A | * 11/2000 | Asao et al. | 310/216.004 |
| 6,470,563 B1 | * 10/2002 | Asao et al. | 29/596 |

FOREIGN PATENT DOCUMENTS

| | | |
|---|---|---|
| JP | 2004-201431 A | 7/2004 |
| JP | 2006-223022 A | 8/2006 |

* cited by examiner

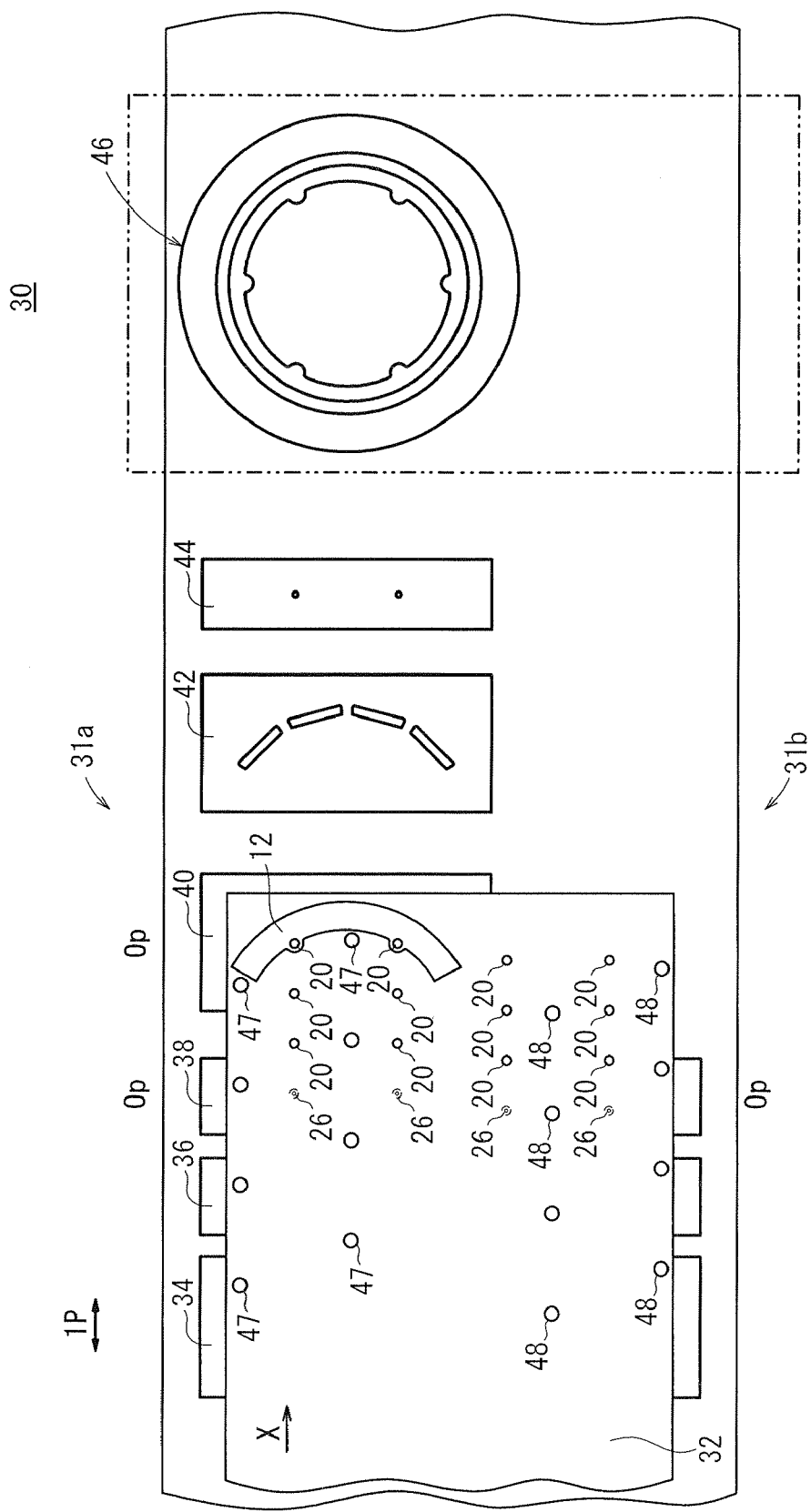

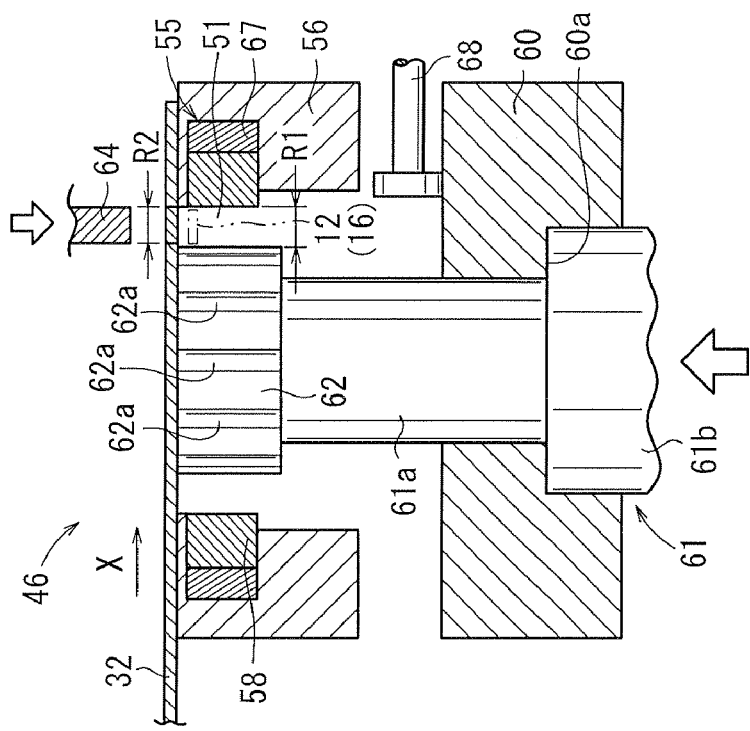
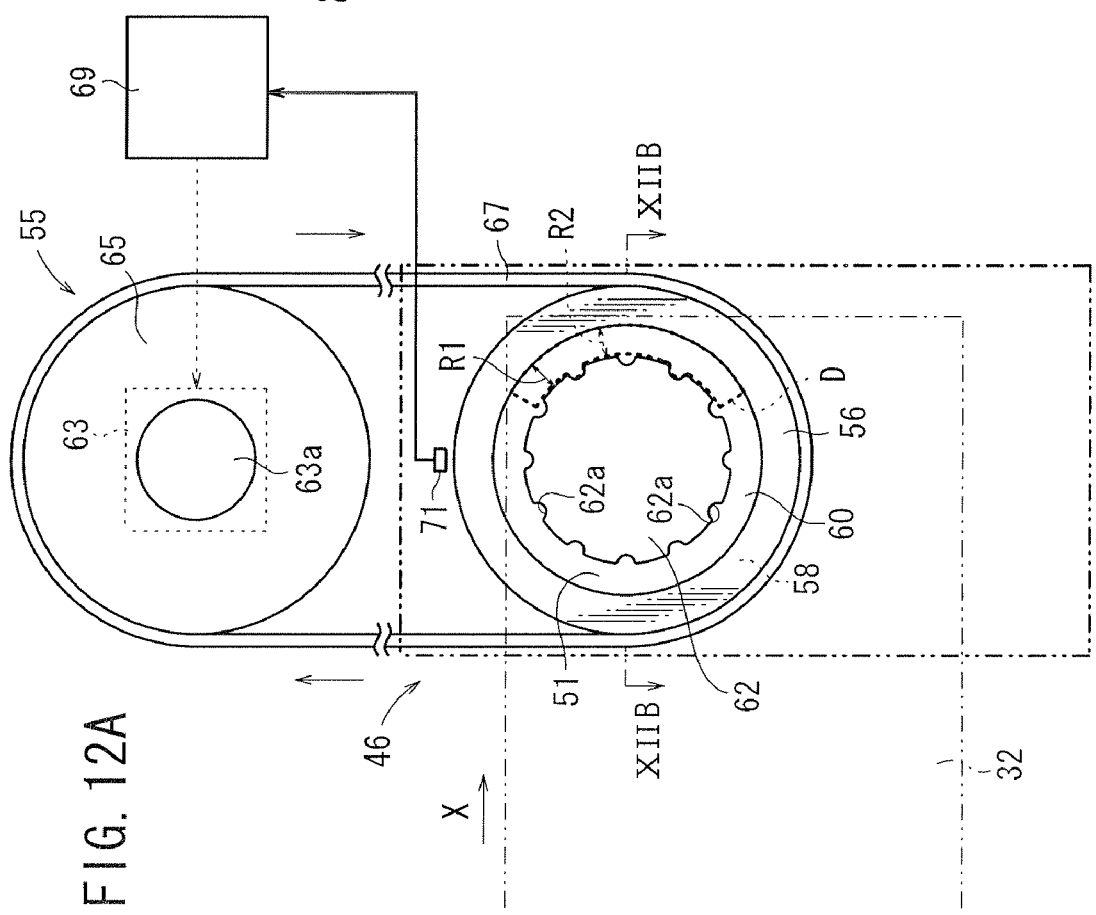

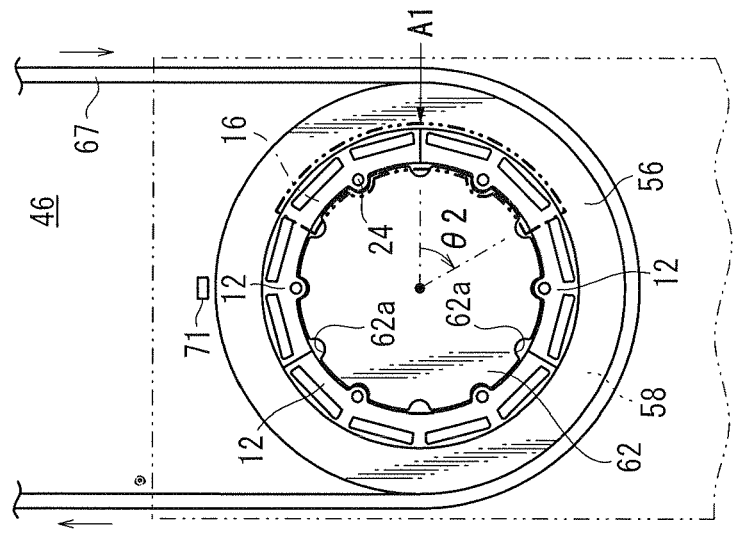
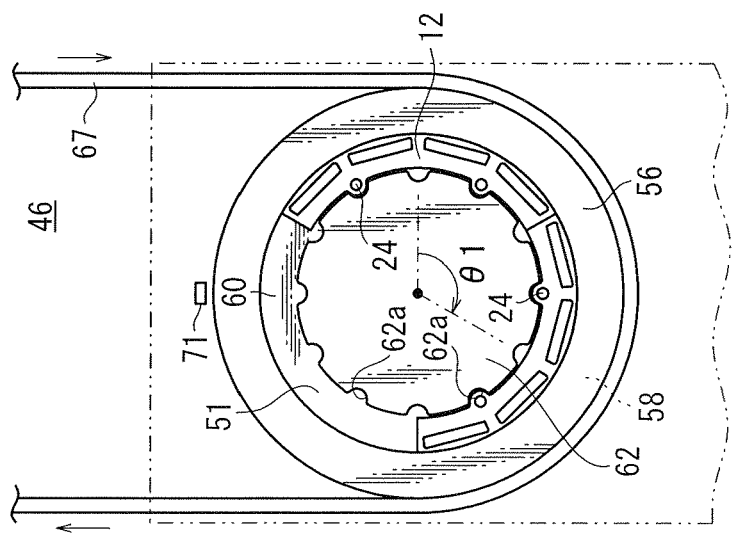
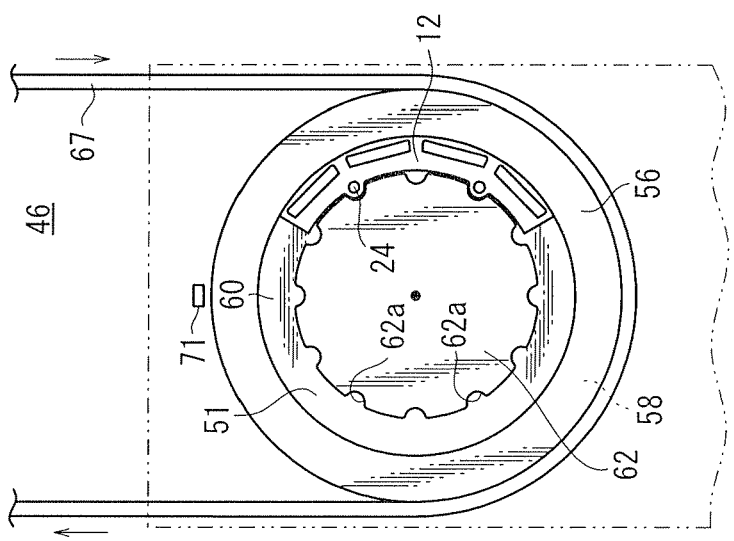

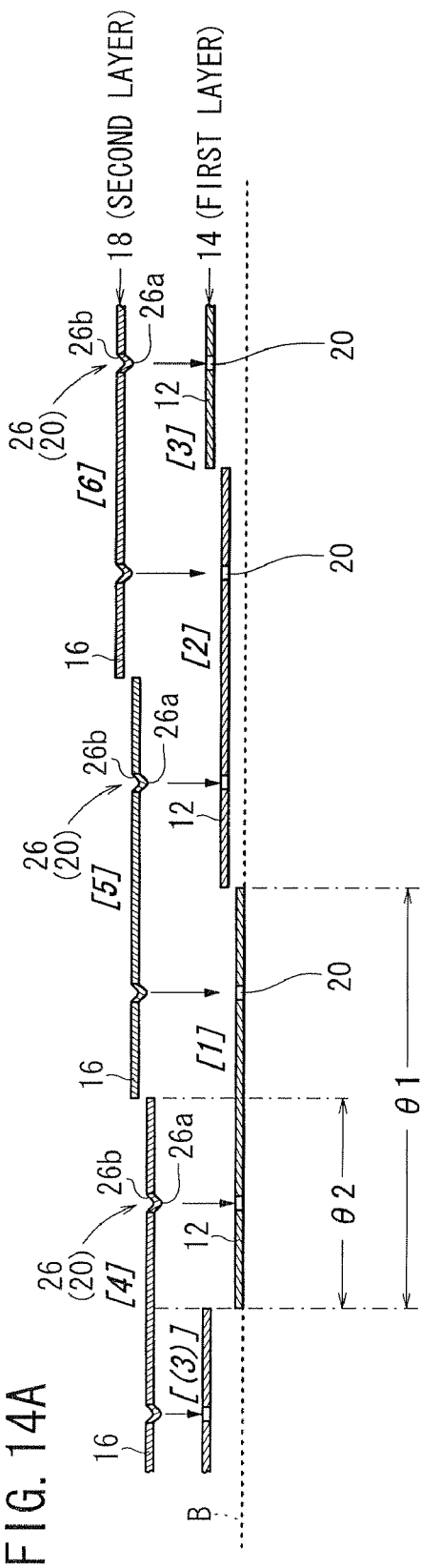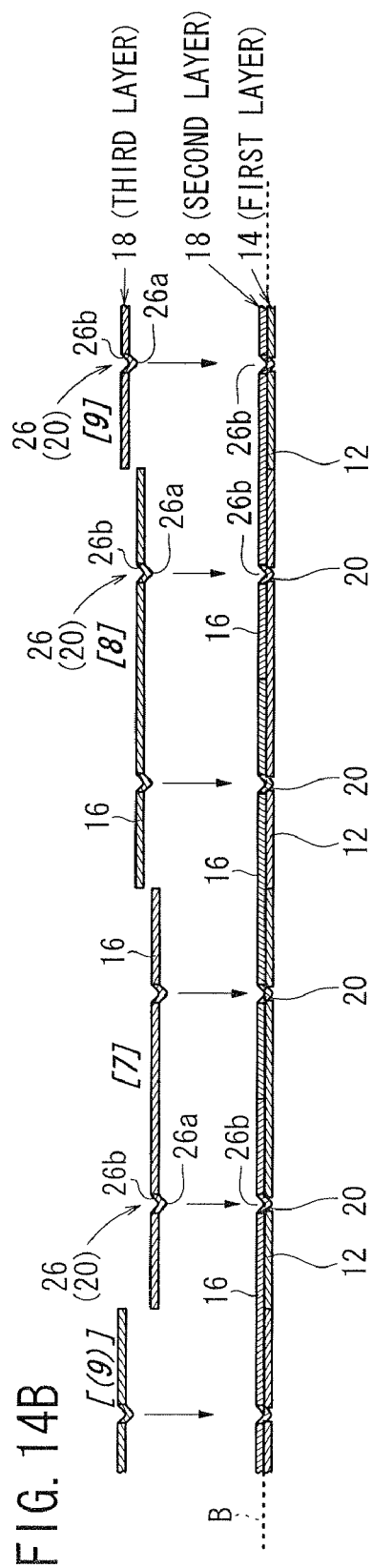

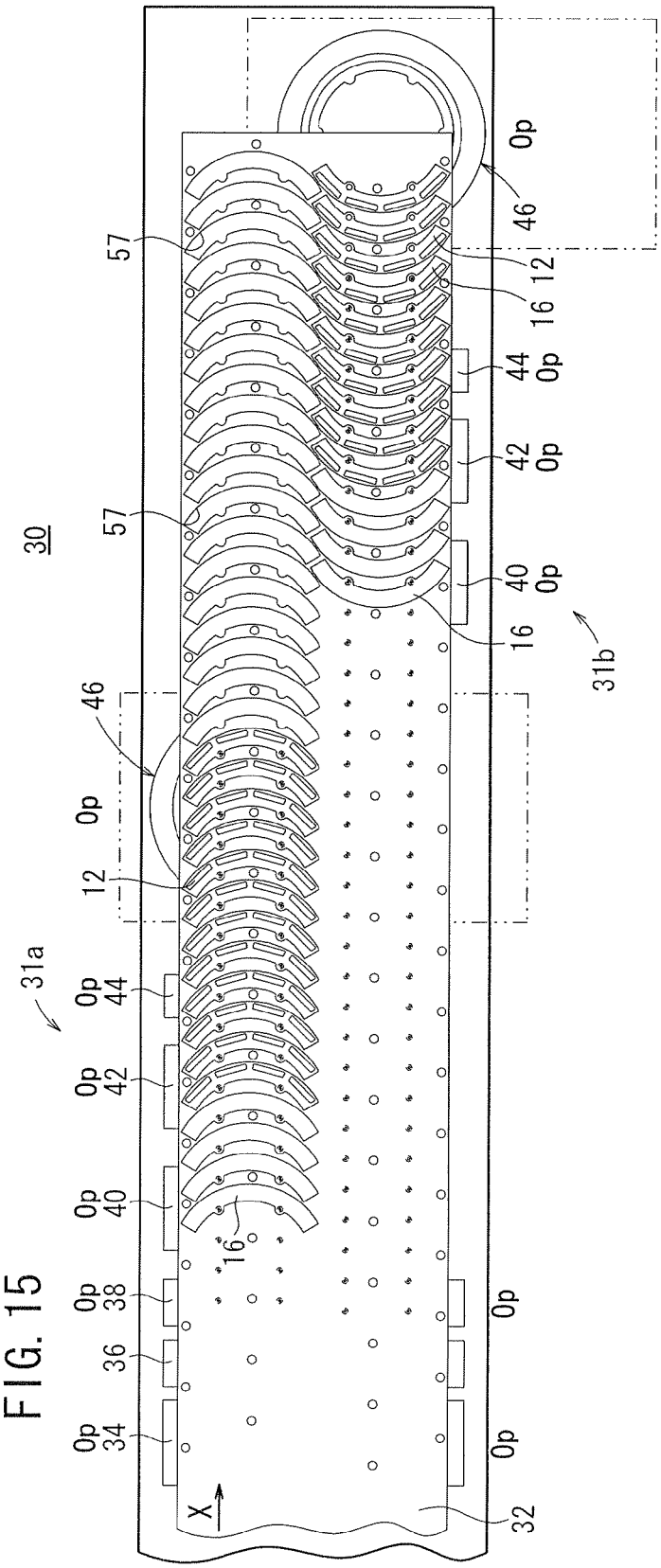

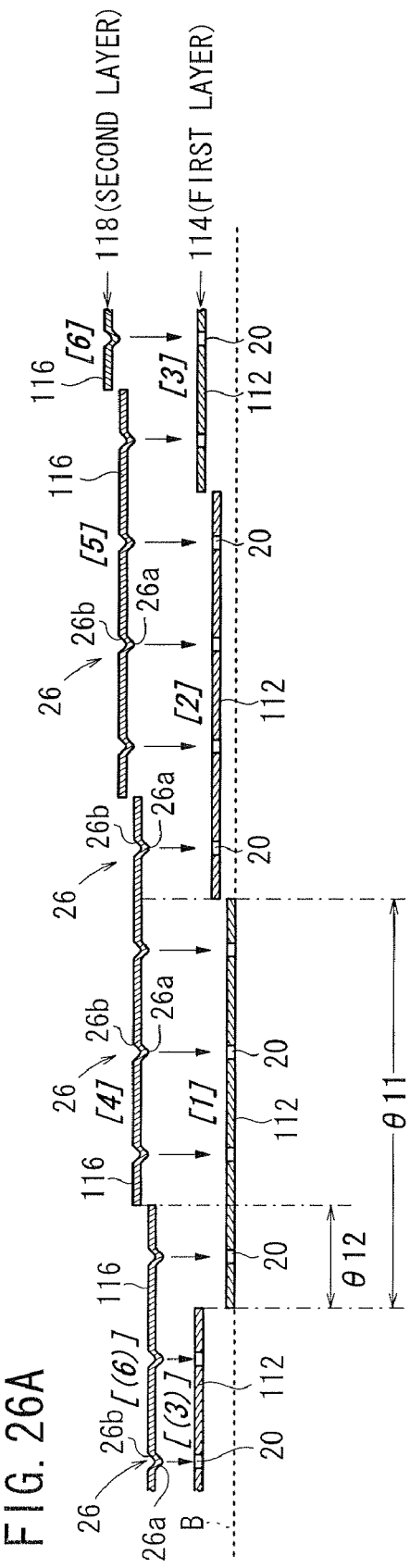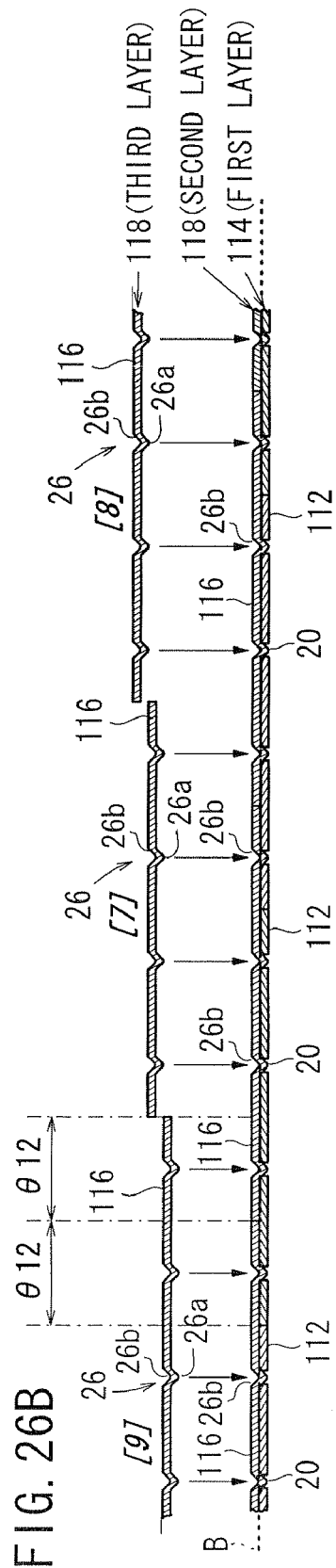
FIG. 26A
FIG. 26B

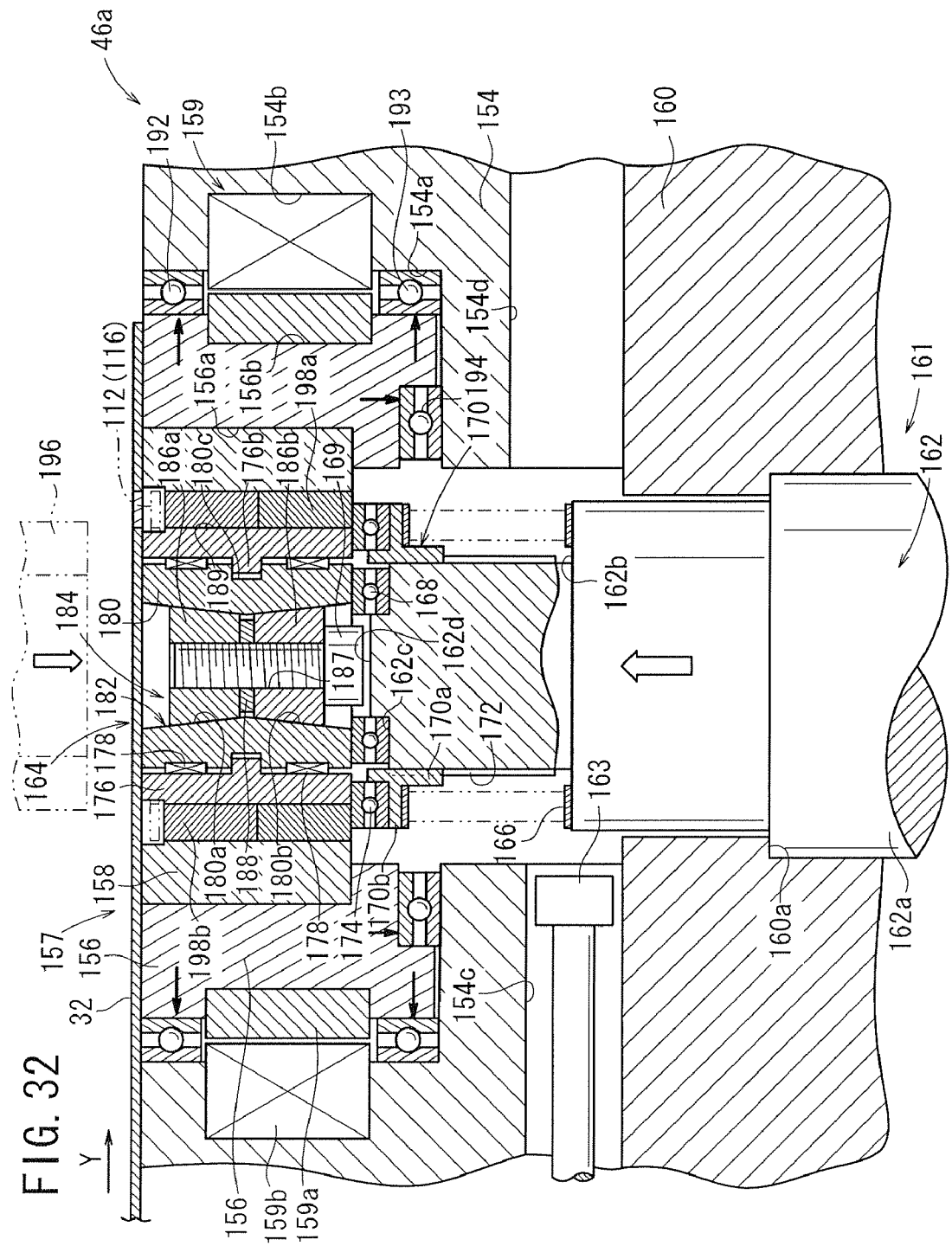

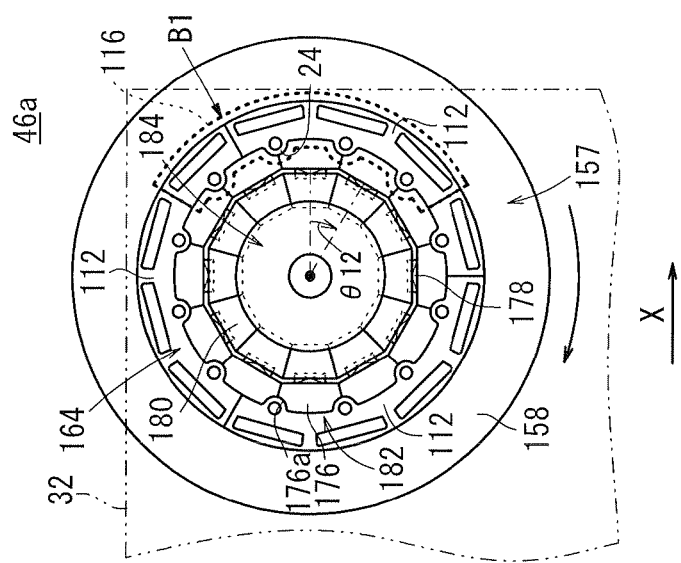
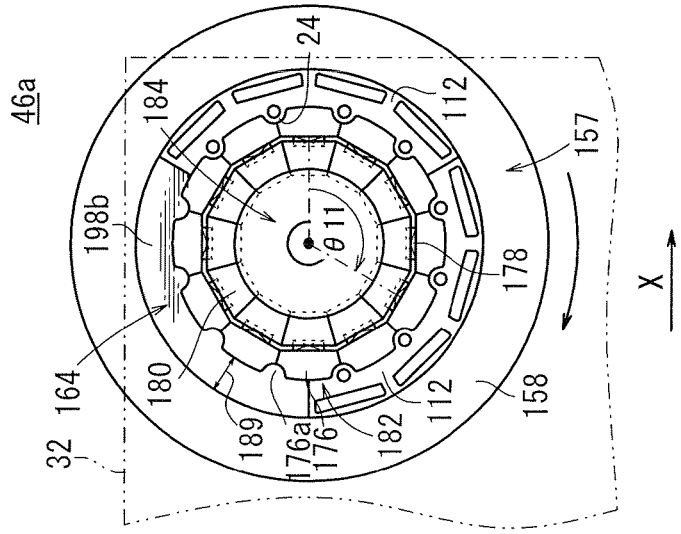
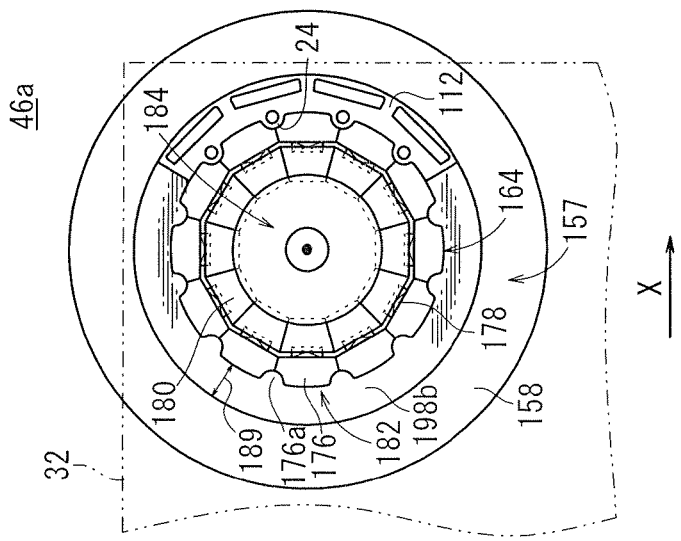

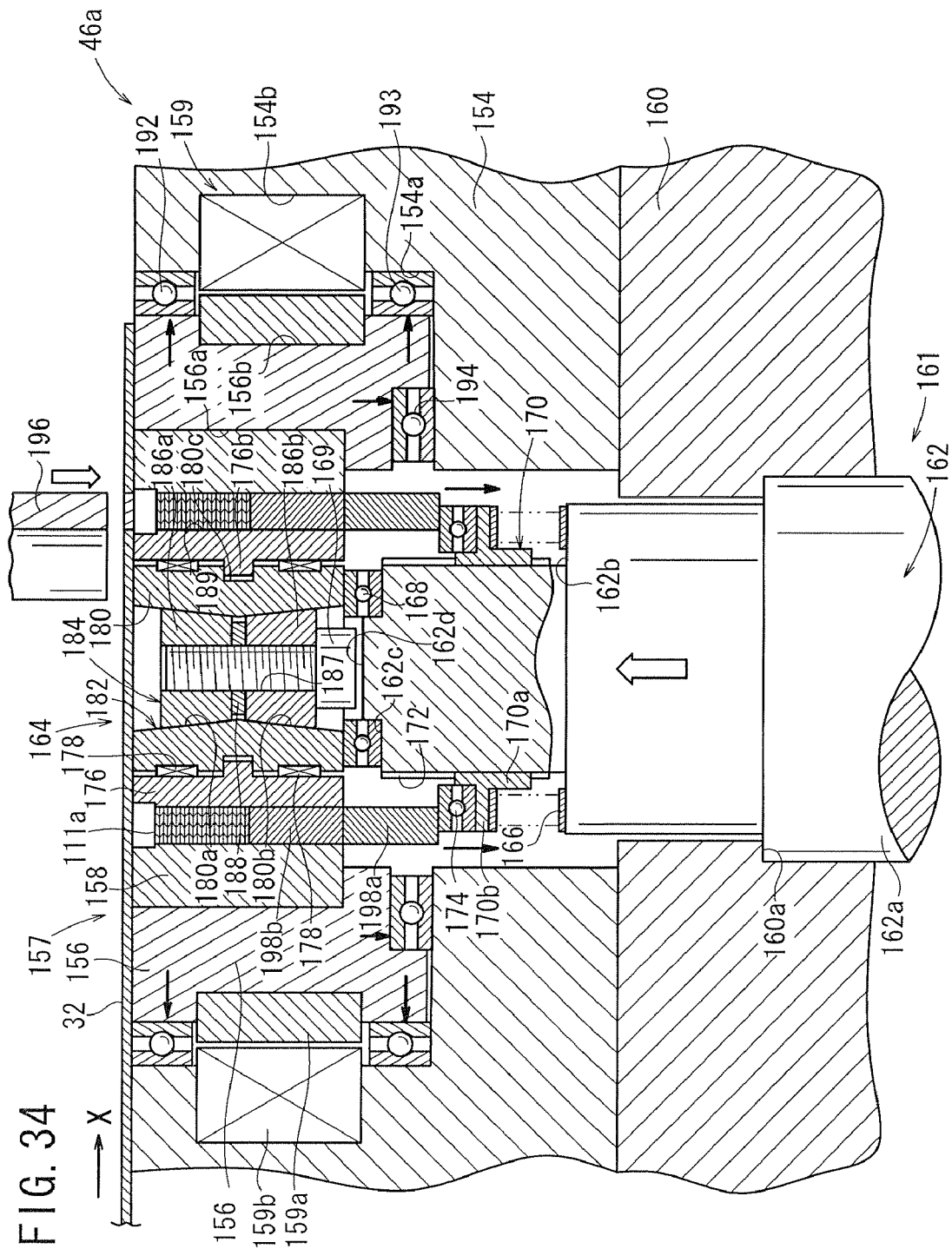

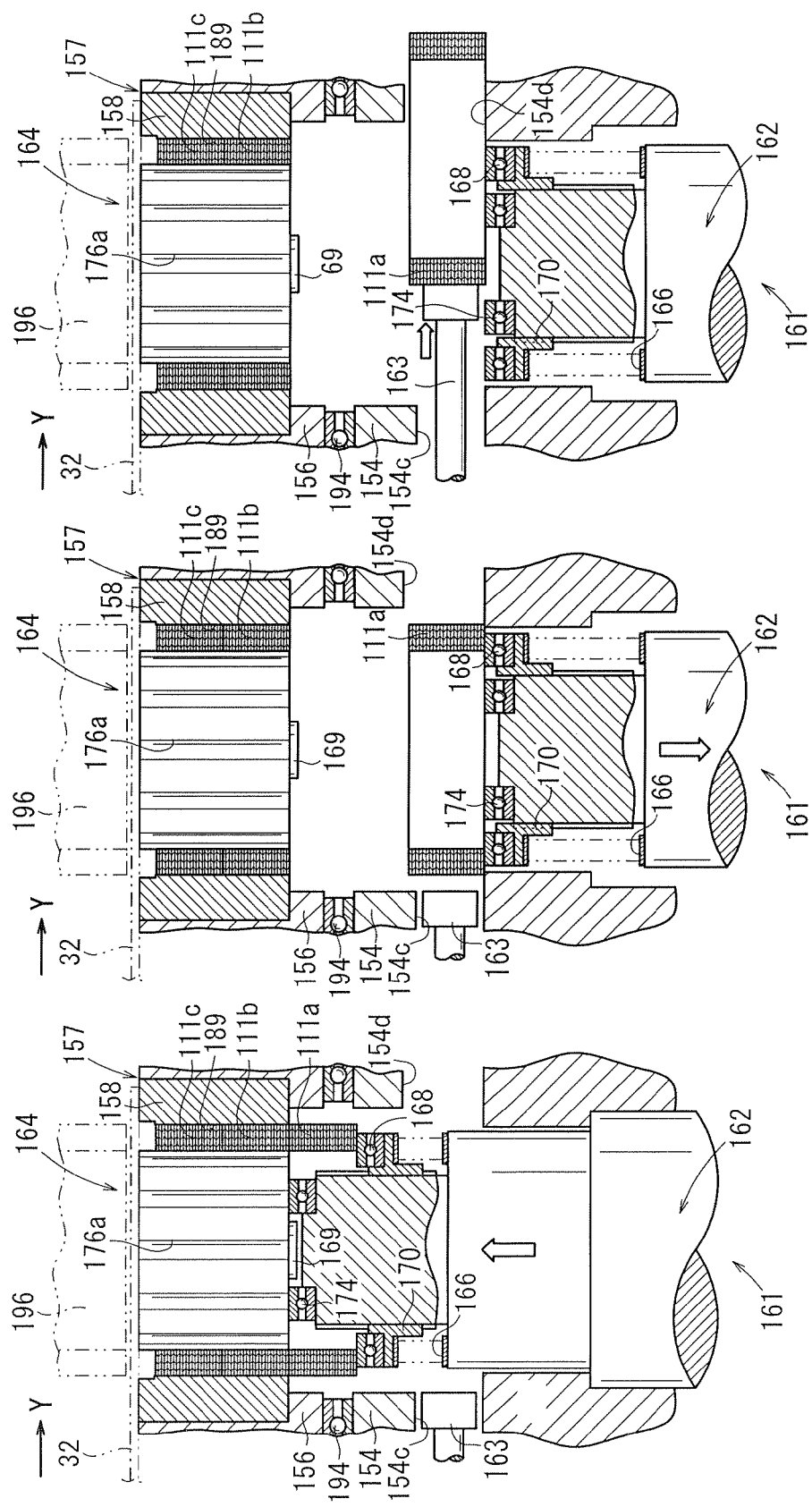

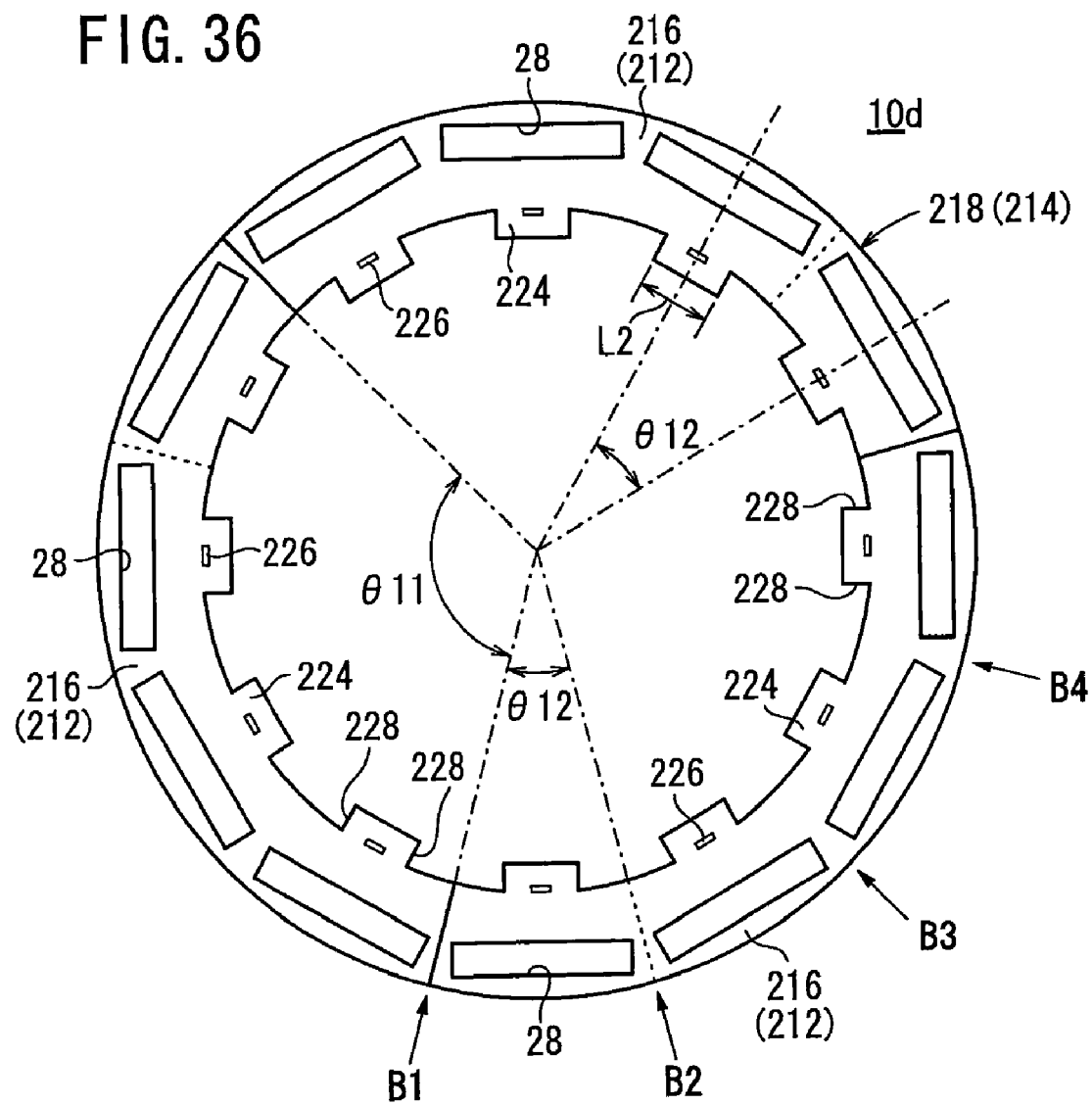

METHOD FOR PRODUCING RING CORE

CROSS-REFERENCE TO RELATED APPLICATION

This application is a National Stage entry of International Application No. PCT/JP2007/070488, filed Oct. 19, 2007, the disclosure of the prior application is hereby incorporated in its entirety by reference.

TECHNICAL FIELD

The present invention relates to an apparatus and method for manufacturing a ring core made up of a plurality of separate core plates arranged and stacked in a ring-shaped pattern, as well as to a ring core manufactured by such a method.

BACKGROUND ART

Rotor cores for use in electric motors, for example, have a ring shape (hollow cylindrical shape) constructed from a stack of thin steel sheets. Each of the thin steel sheets is cut from a steel sheet into a ring shape. Scrap metal cut off from inside the ring sheet is wasted.

In an attempt to utilize the steel sheet at an increased rate, a rotor core is known, which comprises a plurality of separate core plates in the form of circumferentially separate sectorial thin steel sheets.

The present applicant has proposed a method of manufacturing a rotor core (ring core) by alternately stacking and forming separate core plates, as disclosed in Patent Document 1. According to this proposed manufacturing method, it is possible to increase the rate of utilization of the sheet material, and shorten the time required to stack the separate core plates.

When separate core plates are stacked to produce a ring core, it is desirable to further shorten the time required to stack the separate core plates, as well as to stack the separate core plates with higher accuracy.

Patent Document 1: Japanese Laid-Open Patent Publication No. 2006-223022

DISCLOSURE OF THE INVENTION

It is an object of the present invention to provide an apparatus for manufacturing a ring core by quickly, efficiently, and highly accurately stacking a plurality of separate core plates in a ring-shaped pattern.

Another object of the present invention is to provide a method of manufacturing a ring core by quickly, efficiently, and highly accurately stacking separate core plates.

Still another object of the present invention is to provide a ring core made up of a plurality of separate core plates, which are stacked as layers in a ring-shaped pattern, the layers being joined together with a high joint strength.

According to an embodiment of the present invention, there is provided an apparatus for manufacturing a ring core made up of a plurality of separate core plates arranged and stacked in a ring-shaped pattern, comprising a rotating mechanism for rotating stacked separate core plates through a predetermined angle, an inner guide member disposed radially inwardly of the separate core plates stacked in the ring-shaped pattern, and an outer guide member disposed radially outwardly of the separate core plates, wherein while either one of the inner guide member and the outer guide member supports the separate core plates, the other of the inner guide member and the outer guide member applies a pressure to the separate core plates.

With the above arrangement, the separate core plates can quickly be stacked while being rotated through a predetermined angle by the rotating mechanism. The stacked separate core plates are positioned and held by the inner guide member and the outer guide member. The separate core plates can be stacked highly accurately, and can easily be unloaded from a lower position after stacking a predetermined number of separate core plates, to result in increased manufacturing efficiency.

If the apparatus includes a back pressure applying mechanism for applying a back pressure to an axial end surface of the inner guide member in order to hold another axial end surface of the inner guide member and an axial end surface of the outer guide member lying flush with each other, then the inner guide member is prevented from becoming positionally displaced under pressing forces from a punch at the time the separate core plates are stacked. As a result, the separate core plates can be stacked in a stable manner.

If the separate core plates include plate-side lobes or plate-side recesses on inner circumferential surfaces thereof, and the inner guide member includes recesses or lobes corresponding to the plate-side lobes or the plate-side recesses of the separate core plates, then the inner guide member can position and support the separate core plates reliably.

If the rotating mechanism comprises a rotational drive source directly mounted on an outer circumferential surface of the outer guide member, for rotating the separate core plates, which are held by the outer guide member and the inner guide member, through the predetermined angle, then the separate core plates can be rotated highly accurately to a desired position at a high speed, and be positioned in the desired position. Therefore, the period of time required to manufacture the ring core can be shortened.

If the rotational drive source has a rotor directly mounted on the outer guide member in surrounding relation to the outer circumferential surface of the outer guide member, and the apparatus further comprises bearings disposed on opposite axial ends of the rotor for supporting the outer guide member, then pressing forces applied when the separate core plates are stacked and pressing forces from the inner guide members can reliably be borne by the bearings. Therefore, the outer guide member is effectively prevented from becoming distorted and deformed by the pressing forces, and the rotational drive source is effectively prevented from being subjected to excessive stresses.

The apparatus may manufacture a ring core by blanking the separate core plates from a sheet, thereafter pushing back the blanked separate core plates to portions of the sheet from which the separate core plates have been blanked, and arranging and stacking the separate core plates, which have been pushed back to the sheet in the ring-shaped pattern. The apparatus may further comprise a punch for pressing a separate core plate pushed back to the sheet, so as to hold the separate core plate between the outer guide member and the inner guide member, and successively pressing other separate core plates against side and upper surfaces of the separate core plate, which is rotated through the predetermined angle by the rotational drive source, so as to arrange and stack the separate core plates in the ring-shaped pattern.

The inner guide member may comprise an outer frame member comprising a plurality of sets, arranged in a ring-shaped pattern, made up of first guide members held against inner circumferential surfaces of the separate core plates, second guide members disposed radially inwardly of the first guide members with resilient members interposed therebetween, and a central member disposed radially inwardly of the outer frame member and having a slanted surface corresponding to slanted surfaces on inner circumferential surfaces of the second guide members, the central member being movable in an axial direction to positionally adjust the sets of the outer frame member in a diametrical direction perpendicular to the axial direction, for diametrically applying a predetermined pressure to the inner circumferential surfaces of the separate core plates. Since the central member is capable of positionally adjusting the second guide member to adjust the pressing forces applied from the first guide member to the separate core plates under biasing forces of the resilient members, the separate core plates can be held stably in position. Further, the separate core plates can reliably be stacked highly accurately, thereby forming the ring core with increased quality.

The separate core plates may include plate-side rectangular lobes or plate-side rectangular recesses on inner circumferential surfaces thereof, whereas the inner guide member may include rectangular recesses or rectangular lobes corresponding to the plate-side rectangular lobes or the plate-side rectangular recesses of the separate core plates, wherein the inner guide member supports the inner circumferential surfaces of the separate core plates when the plate-side rectangular lobes or the plate-side rectangular recesses of the separate core plates are press-fitted in or over the rectangular recesses or the rectangular lobes. The stacked core plates can thus be held in position under increased retentive forces in the direction in which they are rotated. Since the separate core plates are stably held and stacked, the ring core can be formed highly efficiently and quickly.

According to the embodiment of the present invention, there also is provided a method of manufacturing a ring core made up of a plurality of separate core plates arranged and stacked in a ring-shaped pattern, comprising supporting the separate core plates with either one of an inner guide member disposed radially inwardly of the separate core plates stacked in the ring-shaped pattern, and an outer guide member disposed radially outwardly of the separate core plates, and applying pressure from the other of the inner guide member and the outer guide member, and stacking the separate core plates in the ring-shaped pattern to form the ring core, while rotating the separate core plates in unison through a predetermined angle with the inner guide member and the outer guide member.

If the separate core plates have plate-side lobes on inner circumferential surfaces thereof, the plate-side lobes including positioners for fitting into engagement with the core plates in adjacent layers when the separate core plates are stacked as layers, and the inner guide member has recesses corresponding to the plate-side lobes for positioning and supporting the plate-side lobes, then the separate cores can be stacked highly accurately.

If the method further comprises steps of blanking the positioners and thereafter pushing back blanked portions to portions of the separate core plates from which the blanked positions have been blanked, ejecting the blanked portions that have been pushed back to the stacked separate core plates with pins, and inserting the pins into the separate core plates stacked as layers to thereby couple the layers together, then the pins can be inserted easily and quickly for coupling the layers.

When the separate core plates are stacked as layers in the ring-shaped pattern, the separate core plates may have ends thereof displaced relatively to each other between superimposed layers. Therefore, the layers can be coupled together with increased strength.

According to the embodiment of the present invention, there also is provided a ring core manufactured by the above method of manufacturing a ring core. The ring core comprises core plates, each including a ring-shaped pattern of separate core plates, each of which has at least two magnet insertion holes defined therein at equally spaced intervals, the core plates being successively stacked such that the separate core plates are displaced through an angle corresponding to one of the magnet insertion holes.

With the above arrangement, the layers of the ring core comprise layers of core plates, which are coupled together with increased strength.

BRIEF DESCRIPTION OF THE DRAWINGS

FIG. 7 is a plan view, with partial omission, showing an eighth step of the method of manufacturing a rotor core;

FIG. 12A is a plan view, with partial omission, showing a drop-through die assembly shown in FIG. 3 at an enlarged scale;

FIG. 12B is a schematic cross-sectional view taken along line XIIB-XIIB of FIG. 12A;

FIG. 13A is a plan view, with partial omission, showing the manner in which a 1st first separate core plate is dropped through the drop-through die assembly shown in FIG. 3;

FIG. 13B is a plan view, with partial omission, showing the manner in which a 2nd first separate core plate is dropped;

FIG. 13C is a plan view, with partial omission, showing the manner in which an outer guide member is turned a predetermined angle after a 3rd first separate core plate is dropped;

FIG. 14A is a cross-sectional view showing the manner in which a second core plate is stacked on a first core plate by the drop-through die assembly shown in FIG. 3, the view being expanded circumferentially through 360°;

FIG. 14B is a cross-sectional view showing the manner in which a second core plate in an upper layer is stacked on the second core plate, the view being expanded circumferentially through 360°;

FIG. 15 is a plan view, with partial omission, showing a forty-third step of the method of manufacturing a rotor core;

FIG. 26A is a cross-sectional view showing the manner in which a second core plate is stacked on a first core plate of the rotor core shown in FIG. 23 by the drop-through die assembly, the view being expanded circumferentially through 360°;

FIG. 26B is a cross-sectional view showing the manner in which a second core plate in an upper layer is stacked on the second core plate, the view being expanded circumferentially through 360°;

FIG. 32 is a schematic cross-sectional view taken along line XXXII-XXXII of FIG. 30;

FIG. 33A is a plan view, with partial omission, showing the manner in which a 1st first separate core plate is dropped through the drop-through die assembly shown in FIG. 30;

FIG. 33B is a plan view, with partial omission, showing the manner in which a 2nd first separate core plate is dropped;

FIG. 33C is a plan view, with partial omission, showing the manner in which the first core plate is turned a predetermined angle after a 3rd first separate core plate is dropped;

FIG. 34 is a schematic cross-sectional view showing a stacked assembly produced by the drop-through die assembly shown in FIG. 30;

FIG. 35A is a schematic cross-sectional view showing the manner in which two stacked assemblies are produced on the stacked assembly, which is produced by the drop-through die assembly shown in FIG. 30;

FIG. 35B is a schematic cross-sectional view showing the manner in which the first stacked assembly is placed on the upper surface of a lower frame;

FIG. 35C is a schematic cross-sectional view showing the manner in which the first stacked assembly is unloaded;

FIG. 36 is a plan view of a rotor core manufactured by a method of manufacturing a ring core according to a fourth embodiment of the present invention;

BEST MODE FOR CARRYING OUT THE INVENTION

Apparatus for manufacturing a ring core according to preferred embodiments of the present invention, in relation to methods of manufacturing a ring core carried out by the apparatus, will be described in detail below with reference to the accompanying drawings.

Figure 1:
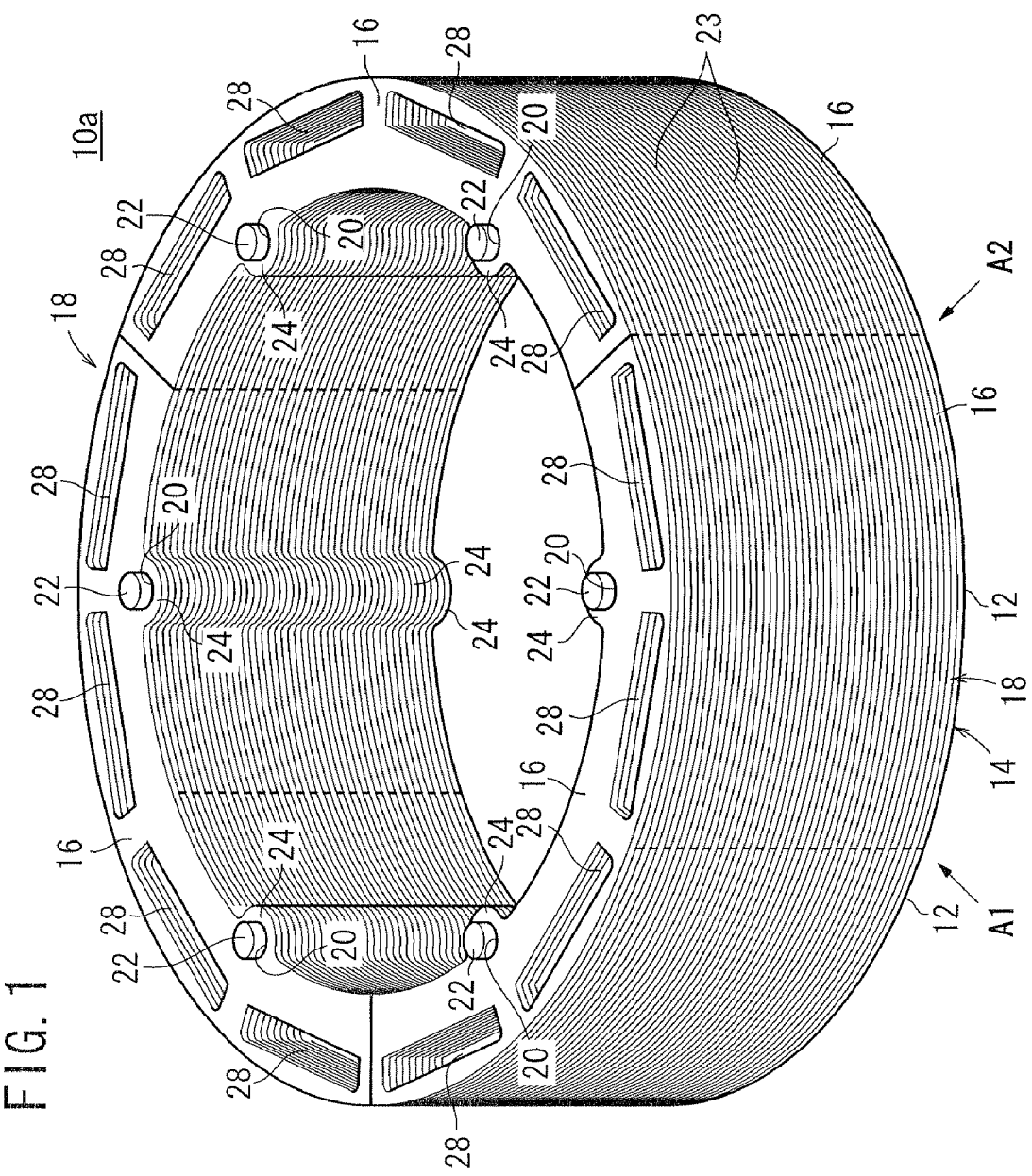
FIG. 1 is a perspective view of a rotor core manufactured by a method of manufacturing a ring core according to a first embodiment of the present invention.

FIG. 1 is a perspective view of a rotor core (ring core) 10a manufactured by an apparatus for manufacturing a ring core according to a first embodiment of the present invention. The rotor core 10a serves as part of a rotor, for example. The rotor and a stator, not shown, jointly make up an electric motor (rotary machinery).

The rotor core 10a comprises a ring-shaped first core plate 14 made up of a plurality of (three in the present embodiment) first separate core plates (rotor core pieces) 12 arranged circumferentially, each of the first separate core plates comprising a thin sectorial magnetic steel sheet, and ring-shaped second core plates 18 made up of second separate core plates (rotor core pieces) 16 arranged circumferentially, each of the second separate core plates comprising a thin sectorial magnetic steel sheet. The second core plates 18 are angularly spaced from the first core plate 14 by a predetermined phase. The rotor core 10a includes a total of fifty layers, including the first core plate 14 as a lowermost layer, and plural (49 in the present embodiment) second core plates 18 being stacked on the first core plate 14.

Each of the separate core plates has two holes (coupling portions, through holes) 20, or alternatively, each layer has six holes (coupling portions, through holes) 20. Pins (coupling members) 22 made of a nonmagnetic material (nonmagnetic bodies) are inserted respectively into the holes 20 in the stacking direction (axial direction), thereby interconnecting the layers. The layers of the rotor core 10a are firmly coupled to each other by an adhesive 23, which is applied to upper and lower surfaces of the first separate core plates 12 and the second separate core plates 16. The number of layers of the rotor core 10a may be changed depending on the conditions of use thereof.

The nonmagnetic material of the pins 22 may be aluminum, brass, austenitic stainless steel, or the like. In the present embodiment, austenitic stainless steel preferably is used, in view of its strength and easy availability. If the pins 22 are made of aluminum, then the pins 22 need to be greater in diameter because of the low strength of aluminum. Although brass has sufficient strength, the availability of brass is low, and the cost of the pins 22 may possibly be high.

The separate core plates of the layers, which are interposed on one another, i.e., the odd-numbered layers (the first layer, the third layer, etc.) and the even-numbered layers (the second layer, the fourth layer, etc.) have abutting ends (abutting ends) disposed at positions that are angularly spaced by a predetermined angle (predetermined distance). Ends of the separate core plates in each of the odd-numbered layers are disposed in a total of three positions, which are spaced 120° from a reference position A1 in FIG. 1, and ends of the separate core plates in each of the even-numbered layers are disposed in a total of three positions, which are spaced 120° from a reference position A2 in FIG. 1, which in turn is spaced 60° from the reference position A1.

Figure 2:
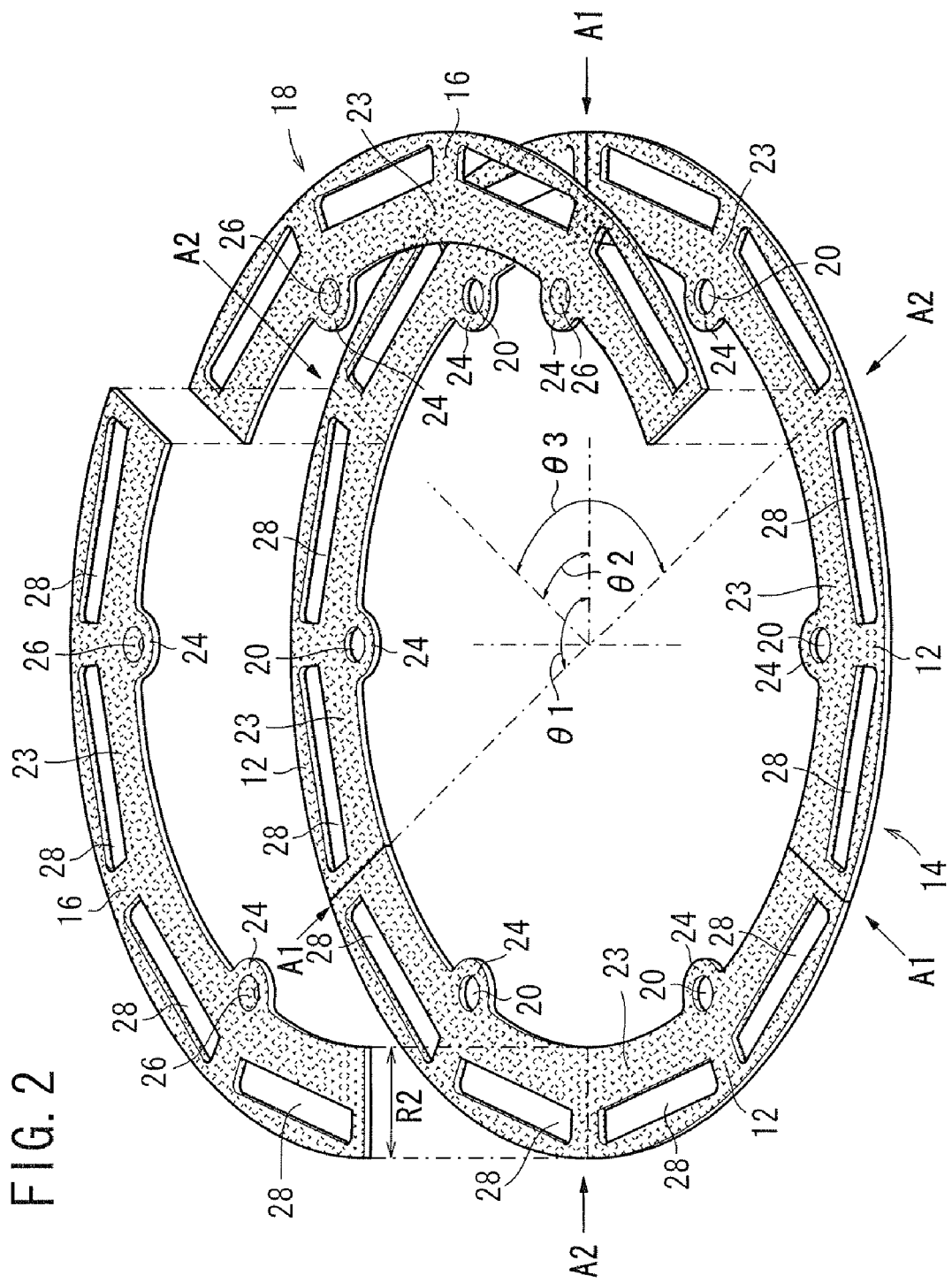
FIG. 2 is an exploded perspective view of a portion of the rotor core shown in FIG. 1.

Specifically, as shown in FIG. 2, the first core plate 14, which serves as the odd-numbered first layer (lowermost layer), has the first separate core plates 12, whose ends abut at three positions A1 that are angularly spaced by a predetermined angle θ1 (120° in the present embodiment). The second core plate 18, which serves as the even-numbered second layer, has the second separate core plates 16, whose ends abut at three positions A2 that are angularly spaced by a predetermined angle θ3 (120° in the present embodiment). The positions A2 are angularly spaced from the positions A1 by a predetermined angle θ2 (60° in the present embodiment).

Each of the first separate core plates 12 includes a pair of substantially semicircular lobes (protrusions, plate-side lobes) 24, 24 on an inner arcuate edge thereof. The lobes 24 are disposed at equal angular intervals on the first core plate 14, which is made up of the three first separate core plates 12. The lobes 24 have substantially central portions engaged by positioners (coupling portions, crimped portions) 26 of the second separate core plate 16 (see FIGS. 14A and 14B). The lobes 24 also have the holes 20, for receiving the pins 22 inserted therein.

Each of the first separate core plates 12 also has four rectangular magnet holes (magnet insertion holes) 28 defined therein at substantially equal angular intervals along the outer arcuate edge thereof. When the first core plate 14 and the second core plate 18 are stacked together, magnets (not shown) are inserted into the respective magnet holes 28. Each of the lobes 24 is disposed in a central phase position between and adjacent to two of the magnet holes 28.

Each of the second separate core plates 16 includes a pair of substantially semicircular lobes 24, 24 on the inner arcuate edge thereof. The lobes 24 are disposed at equal angular intervals on the second core plate 18, which is constituted by three of the second separate core plates 16. The lobes 24 have substantially conical positioners 26 that project downwardly from substantially central portions thereof (see FIGS. 14A and 14B). As with the first separate core plate 12, each of the second core plates 18 has four rectangular magnet holes 28 defined therein, at substantially equal angular intervals along the outer arcuate edge thereof.

Each of the positioners 26 comprises a positioning lobe 26a disposed on a lower surface of the second separate core plate 16 and projecting downwardly, and a positioning cavity 26b defined in an upper surface of the second separate core plate 16 by an inner wall surface of the positioning lobe 26a (see FIGS. 14A and 14B). When the layers are stacked, each of the positioners 26 functions as a positioner, due to the positioning lobe 26a engaging in a corresponding hole 20 in the first core plate 14 serving as the lower layer, or in a corresponding positioning cavity 26b of the second core plate 18.

After the layers have been positioned and stacked, the positioners 26 and surrounding areas thereof are ejected by a pin inserting device 70, to be described later, and function as holes 20 for insertion of the pins 22 therethrough.

The second separate core plates 16 essentially are identical in shape to the first separate core plates 12. When three second separate core plates 16 are angularly spaced by the predetermined angle θ3 (120° in the present embodiment), they jointly make up a ring-shaped second core plate 18, which essentially is identical in shape to the first core plate 14.

Upper and lower surfaces (surfaces) of the first separate core plates 12 and the second separate core plates 16 are coated with an adhesive 23, as indicated by the broken-line mesh pattern shown in FIG. 2. The adhesive 23 is applied beforehand to upper and lower surfaces of a sheet 32 (see FIG. 3), which comprises a blank steel sheet for forming the first separate core plates 12 and the second separate core plates 16. The adhesive 23, as it is applied to the surfaces of the sheet 32, the first separate core plates 12, etc., is in the form of a thin film and does not exhibit any bonding power per se. More specifically, the adhesive 23 exhibits a bonding power (i.e., becomes effective) when it is heated and cooled.

A method of manufacturing the rotor core 10a will be described below with reference to the drawings.

Figure 3:
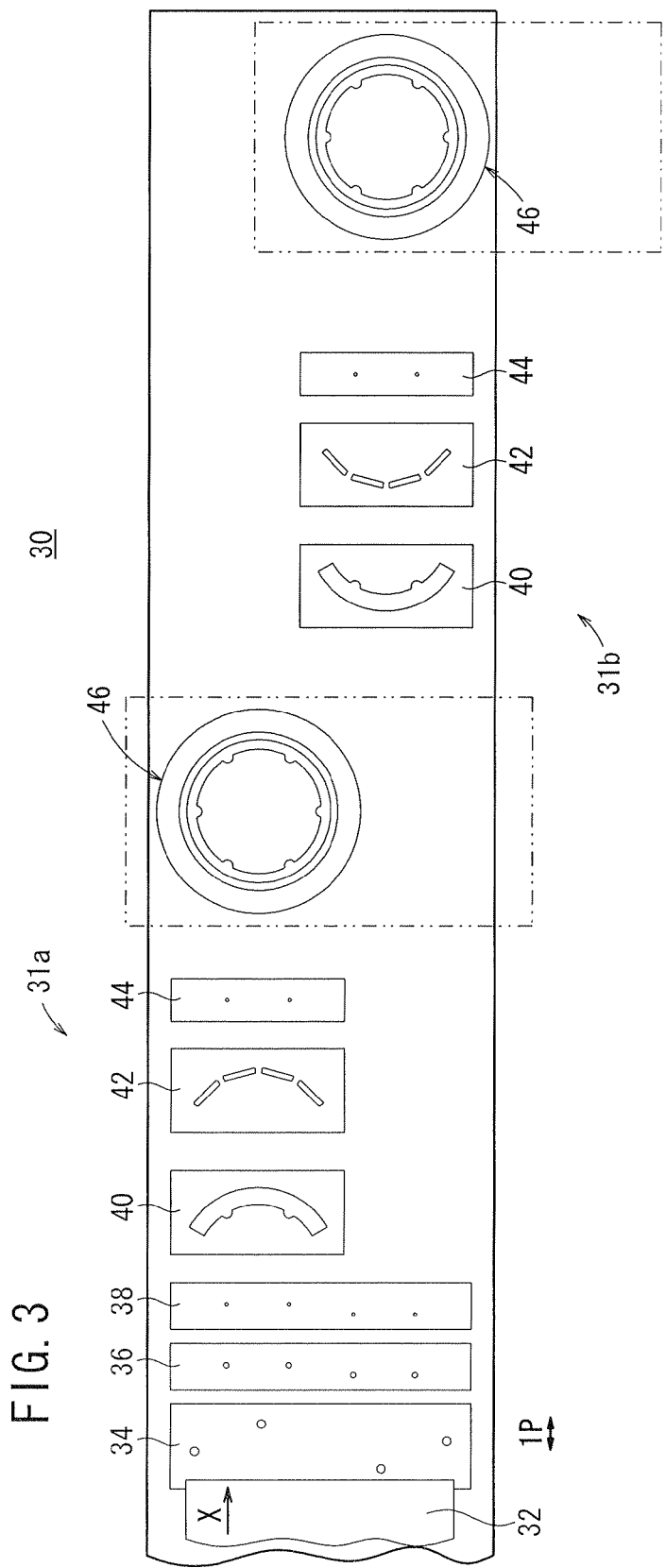
FIG. 3 is a schematic plan view of a rotor core production line according to the first embodiment of the present invention.

As shown in FIG. 3, a rotor core production line 30 comprises a first forming apparatus 31a, and a second forming apparatus 31b disposed in a juxtaposed relation to the first forming apparatus 31a. On the rotor core production line 30, the sheet 32 in the form of a thin web of a magnetic steel sheet, which extends through the first forming apparatus 31a and the second forming apparatus 31b, is fed one pitch (an interval 1P indicated by the arrow in FIG. 3) at a time in the direction indicated by the arrow. The first separate core plates 12 and the second separate core plates 16 are successively formed two at a time concurrently from the sheet 32, by the first forming apparatus 31a and the second forming apparatus 31b. Then, the first separate core plates 12 and the second separate core plates 16 are stacked in order to produce two rotary cores 10a concurrently.

The first forming apparatus 31a comprises a pilot hole forming die assembly 34, a hole forming die assembly 36, a positioner forming die assembly 38, a blanking push-back die assembly 40, a magnet hole forming die assembly 42, a hole push-back die assembly 44, and a drop-through die assembly 46, which are arranged downstream in the direction in which the sheet 32 is fed (the direction indicated by the arrow X). Each of such die assemblies comprises an upper die (not shown) having a punch for punching holes and separate core plates, and a lower die (not shown) disposed in facing relation to the upper die and over which the sheet 32 is fed.

The second forming apparatus 31b is substantially identical in structure to the first forming apparatus 31a, and has a pilot hole forming die assembly 34, a hole forming die assembly 36, and a positioner forming die assembly 38, which are integral with those of the first forming apparatus 31a. The second forming apparatus 31b also includes a blanking push-back die assembly 40, a magnet hole forming die assembly 42, a hole push-back die assembly 44, and a drop-through die assembly 46, which are provided successively downstream of and slightly spaced from the positioner forming die assembly 38. The hole forming die assembly 36, the positioner forming die assembly 38, the blanking push-back die assembly 40, the magnet hole forming die assembly 42, the hole push-back die assembly 44, and the drop-through die assembly 46 of the second forming apparatus 31b are configured in a symmetrical relation to those of the first forming apparatus 31a, in a direction perpendicular to the direction in which the sheet 32 is fed (as indicated by the arrow X).

Figure 4:
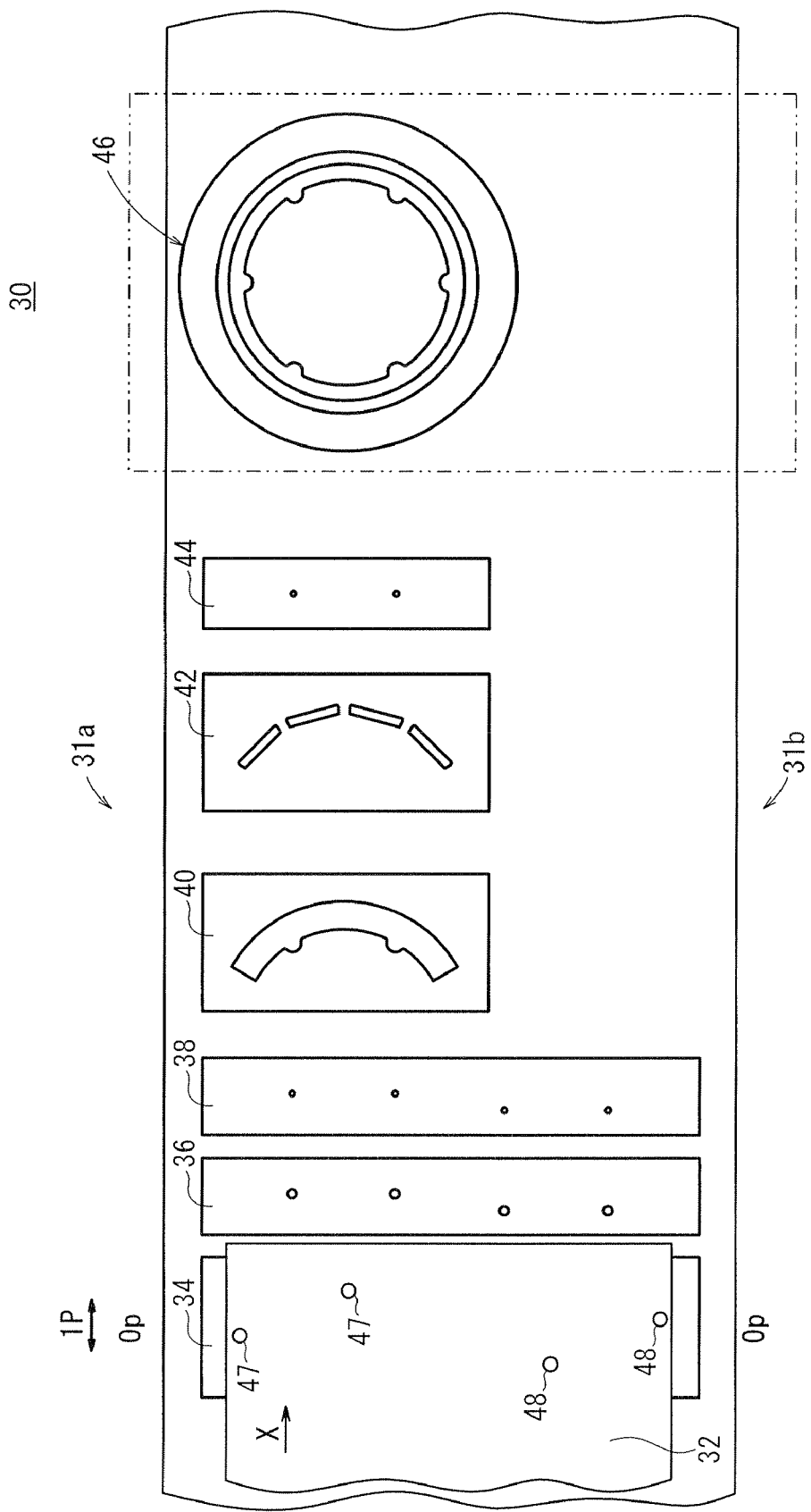
FIG. 4 is a plan view, with partial omission, showing a first step of a method of manufacturing a rotor core on the rotor core production line shown in FIG. 3.

FIG. 4 is a plan view, with partial omission, showing a first step of a method of manufacturing the rotor core 10a on the rotor core production line 30. The steps of the manufacturing method are carried out each time the sheet 32 is fed by one pitch. The die assembly, which is operated in each step, is denoted by the reference character Op. If a plurality of die assemblies are simultaneously operated in one step in synchronism with each other, then all of the operated die assemblies are denoted by reference characters Op.

As shown in FIG. 4, in the first step, the pilot hole forming die assemblies 34 of the first forming apparatus 31a and the second forming apparatus 31b form pilot holes 47, 47 and 48, 48 in the sheet 32, which is fed by a feed means (not shown). The pilot holes 47, 48 function to position the sheet 32 in a given position through engagement with pilot pins (not shown) disposed on the die assemblies and the rotor core production line 30, in respective steps. The pilot holes 47 mainly are used in the first forming apparatus 31a, while the pilot holes 48 mainly are used in the second forming apparatus 31b. On the rotor core production line 30, the pilot hole forming die assembly 34 is operated every other step, i.e., during each odd-numbered step. However, the pilot hole forming die assembly 34 may be operated during all of the steps, for example, if desired.

After the pilot holes 47, 48 have been formed in the first step, the sheet 32 is fed by two pitches (in the direction indicated by the arrow), and the pilot holes 47, 48 are engaged by pilot pins, to thereby position the sheet 32. Since the process of positioning the sheet 32 with the pilot holes 47, 48 and the pilot pins is performed similarly in each step, it will not be described below.

Figure 5:
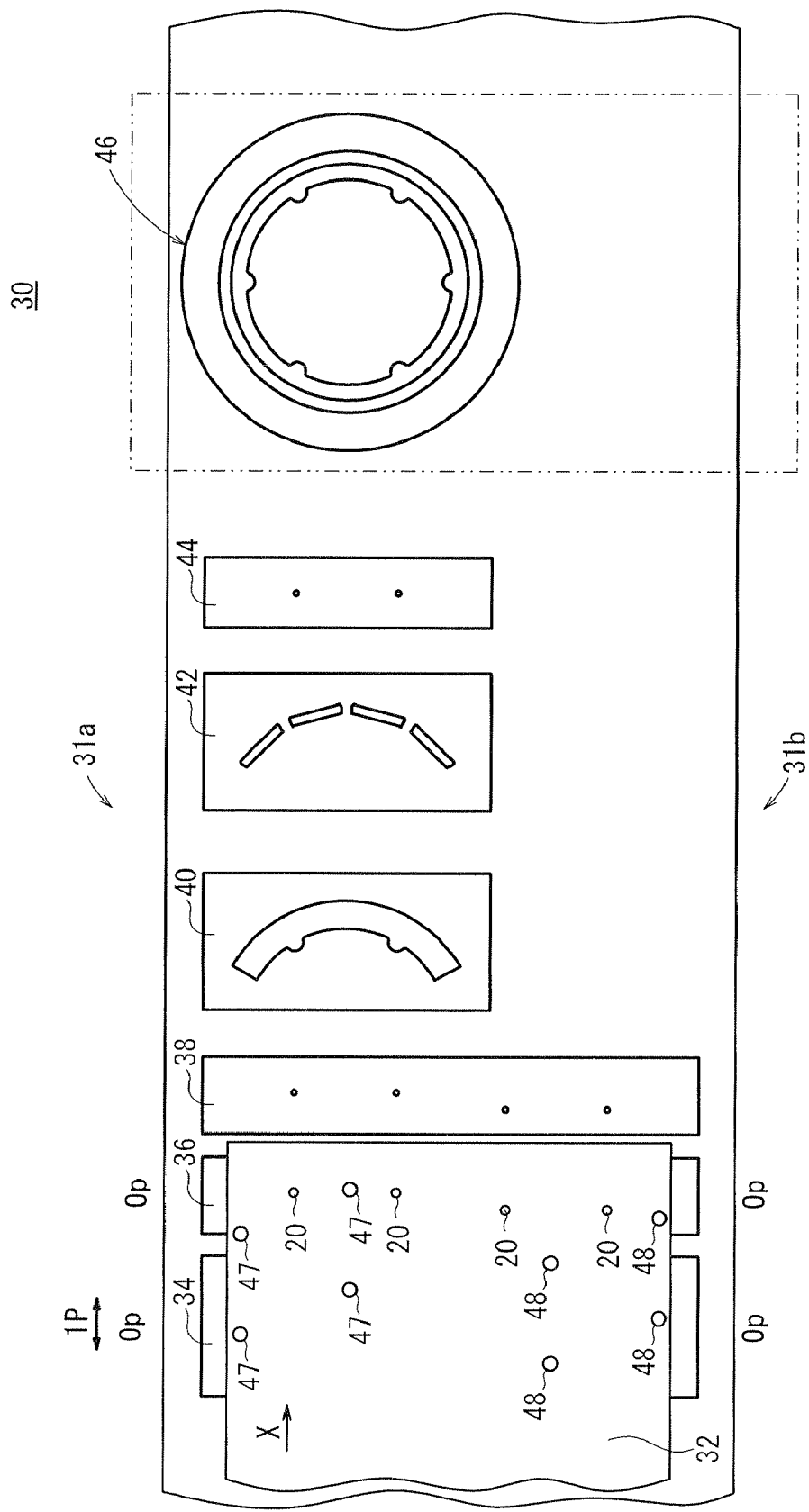
FIG. 5 is a plan view, with partial omission, showing a third step of the method of manufacturing a rotor core.

In a third step, as shown in FIG. 5, the pilot hole forming apparatus 34 forms new pilot holes 47, 48, two pitches rearwardly (upstream) of the pilot holes 47, 48 that were formed in the first step. At the same time, the hole forming die assemblies 36 of the first forming apparatus 31a and the second forming apparatus 31b form holes 20, which will be positioned in a 1st first separate core plate 12 in the forming apparatus 31a, 31b. Since the process of forming the pilot holes 47, 48 with the pilot hole forming apparatus 34 is performed similarly every other step, it will not be described below.

After the third step, the sheet 32 is fed by one pitch. Then, as with the third step, the hole forming die assemblies 36 are operated to form holes 20, one pitch rearwardly of the holes 20 that were formed in the third step. The holes 20 will be positioned in a 2nd first separate core plate 12 in the forming apparatus 31a, 31b (fourth step). Thereafter, the sheet 32 is fed by one pitch.

Figure 6:
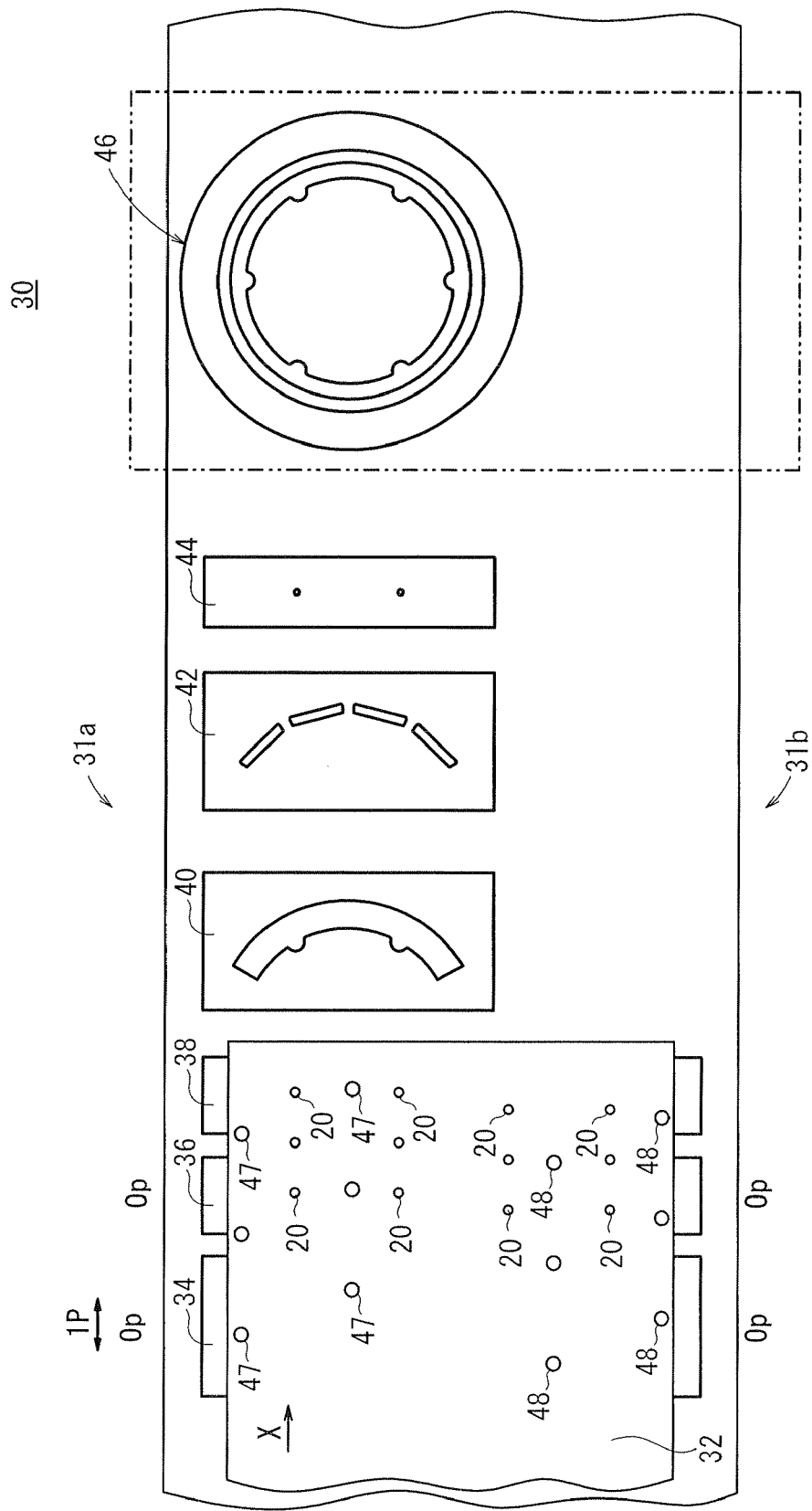
FIG. 6 is a plan view, with partial omission, showing a fifth step of the method of manufacturing a rotor core.

In a fifth step, as shown in FIG. 6, the hole forming die assemblies 36 of the first forming apparatus 31a and the second forming apparatus 31b form holes 20, one pitch rearwardly of the holes 20 that were formed in the fourth step. The holes 20 will be positioned in a 3rd first separate core plate 12 in the forming apparatus 31a, 31b. After the fifth step, the sheet 32 is fed by one pitch.

In an eighth step, as shown in FIG. 7, the positioner forming die assembly 38 of the first forming apparatus 31a forms positioners 26, one pitch rearwardly of the holes 20 that were formed in the fifth step. The holes 20 will be positioned in a 1st second separate core plate 16 (a fourth one of the first and second separate core plates) in the first forming apparatus 31a. In other words, the 1st second separate core plate 16 is formed successively after the 3rd first separate core plate 12.

At the same time, the blanking push-back die assembly 40 of the first forming apparatus 31a blanks an outer shape (contour) of the 1st first separate core plate 12 formed by the first forming apparatus 31a, and carries out a push-back process thereon. The push-back process is a process for pushing back the blanked workpiece (the first separate core plate 12 or the second separate core plate 16) to its original position.

A push-back mechanism of the blanking push-back die assembly 40, for forming the first separate core plate 12 according to the push-back process, will be described below with reference to FIGS. 8A through 8C.

Figure 8A:
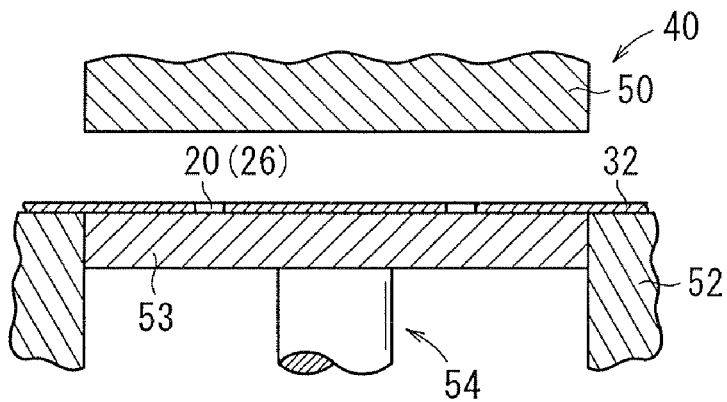
FIG. 8A is a schematic cross-sectional view showing the manner in which a sheet is set in a push-back blanking die assembly shown in FIG. 3.

First, as shown in FIG. 8A, the sheet 32 is set on the blanking push-back die assembly 40, and is positioned by the pilot holes 47 and the pilot pins. The blanking push-back die assembly 40 comprises an upper die 50 and a lower die 52, which includes a push-back mechanism 54.

Figure 8B:
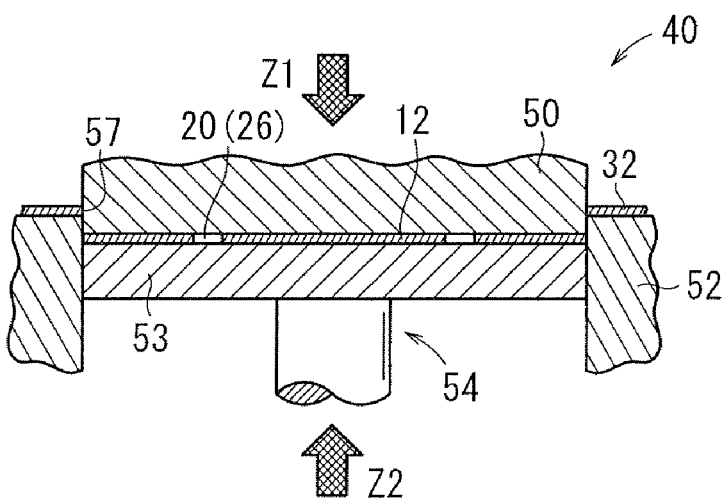
FIG. 8B is a schematic cross-sectional view showing the manner in which a separate core plate is blanked out of the sheet by an upper die of the push-back blanking die assembly shown in FIG. 8A.
Figure 8C:
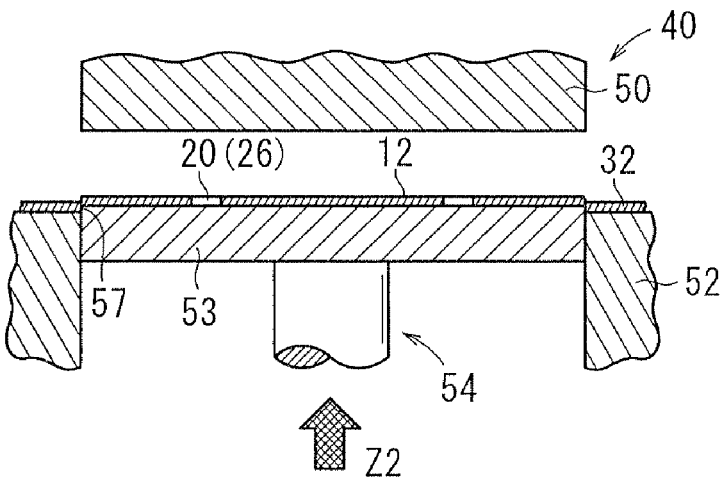
FIG. 8C is a schematic cross-sectional view showing the manner in which the separate core plate blanked out of the sheet by the push-back blanking die assembly shown in FIG. 8A is pushed back.

Then, as shown in FIG. 8B, the upper die 50 is lowered in the direction indicated by the arrow Z1 in order to blank the first separate core plate 12.

Then, the upper die 50 is elevated to elevate a back pusher 53 of the push-back mechanism 54 in the direction indicated by the arrow Z2. Specifically, as shown in FIG. 8C, the push-back mechanism 54 pushes back the first separate core plate 12 into a blanked hole 57 in the sheet 32, from which the first separate core plate 12 has been blanked out. The first separate core plate 12 is now fitted back into the blanked hole 57 in the sheet 32, from which it had been blanked out. The first separate core plate 12 is then fed to a subsequent step.

After the eighth step, the sheet 32 is fed by four pitches. During this time, in ninth through eleventh steps, the positioner forming die assembly 38 of the first forming apparatus 31a successively forms new positioners 26. The blanking push-back die assembly 40 of the first forming apparatus 31a forms 2nd and 3rd first separate core plates 12 according to the push-back process (ninth and tenth steps), and then forms a 1st second separate core plate 16 (a fourth one of the first and second separate core plates) (eleventh step).

Figure 9:
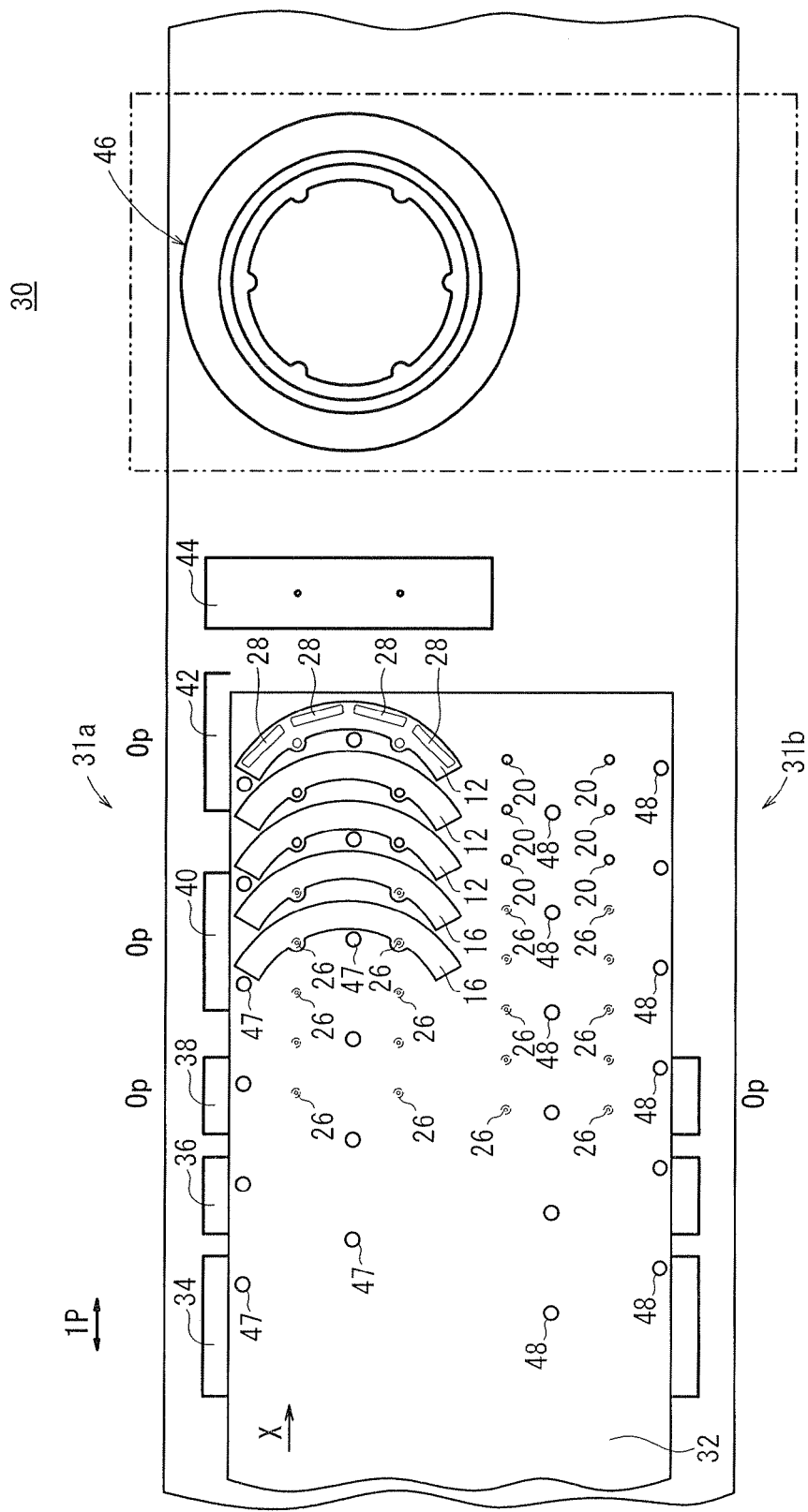
FIG. 9 is a plan view, with partial omission, showing a twelfth step of the method of manufacturing a rotor core.

In a twelfth step, as shown in FIG. 9, the positioner forming die assemblies 38 of the first forming apparatus 31a and the second forming apparatus 31b form new positioners 26 one pitch rearwardly of the positioners 26 that were formed in the eleventh step. At the same time, the blanking push-back die assembly 40 of the first forming apparatus 31a forms a 2nd second separate core plate 16 (a fifth one of the first and second separate core plates) one pitch rearwardly of the 1st second separate core plate 16 formed in the eleventh step, according to the push-back process.

In the twelfth step, furthermore, the magnet hole forming die assembly 42 of the first forming apparatus 31a forms magnet holes 28 in the 1st first separate core plate 12.

After the twelfth step, the sheet 32 is fed by six pitches. During this time, in thirteenth through seventeenth steps, the pilot hole forming die assemblies 34 and the positioner forming die assemblies 38 of the first forming apparatus 31a and the second forming apparatus 31b, and the blanking push-back die assembly 40 and the magnet hole forming die assembly 42 of the first forming apparatus 31a, are operated in order to machine the sheet 32 according to predetermined processes.

Figure 10:
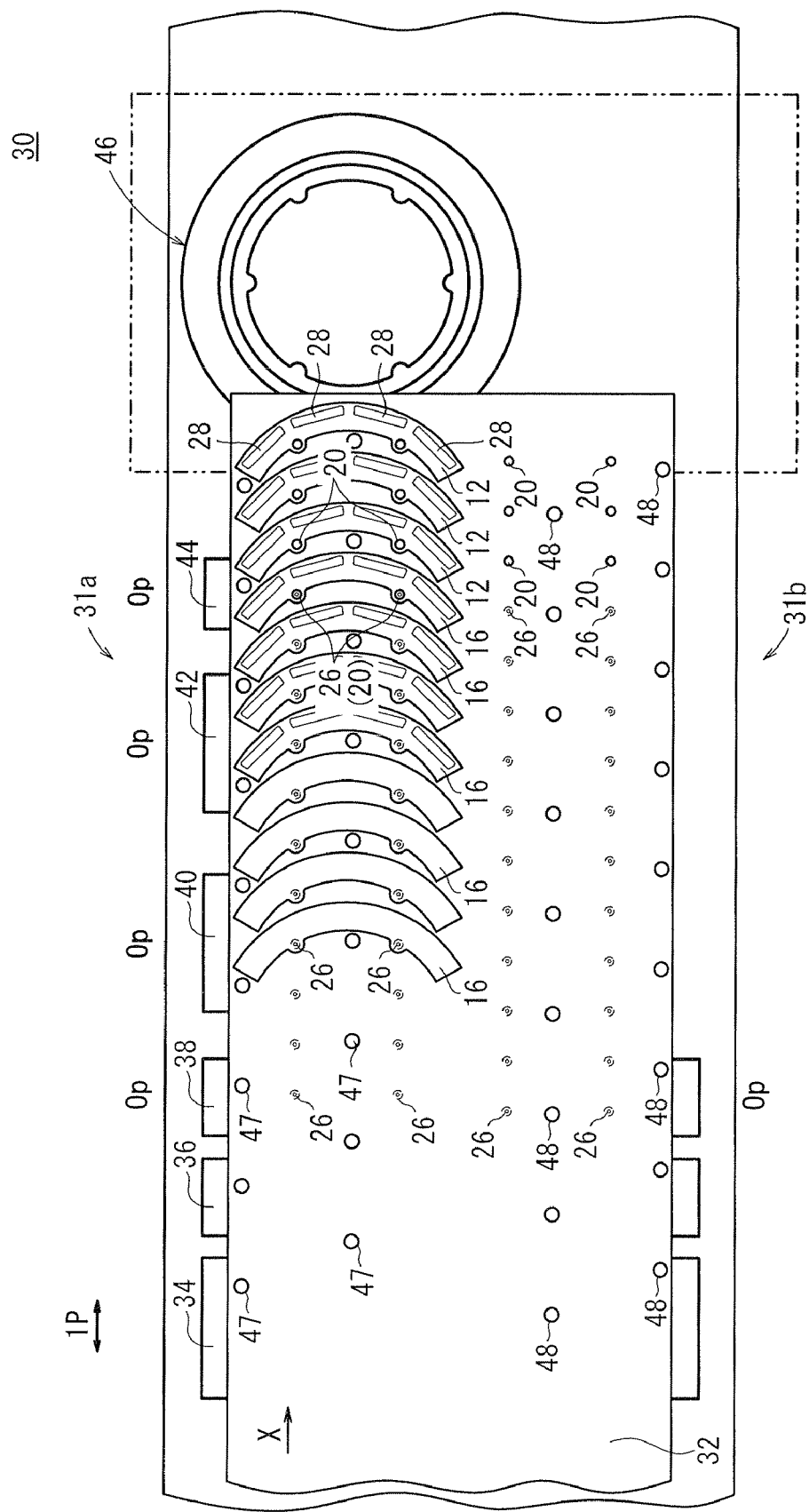
FIG. 10 is a plan view, with partial omission, showing an eighteenth step of the method of manufacturing a rotor core.

In an eighteenth step, as shown in FIG. 10, the positioner forming die assemblies 38 of the first forming apparatus 31a and the second forming apparatus 31b form new positioners 26. At the same time, the blanking push-back die assembly 40 of the first forming apparatus 31a forms a new second separate core plate 16 according to the push-back process, while the magnet hole forming die assembly 42 of the first forming apparatus 31a forms magnet holes 28 in the new second separate core plate 16.

In the eighteenth step, furthermore, the hole push-back die assembly 44 of the first forming apparatus 31a punches out circular portions including the positioners 26 and surrounding areas thereof on the lobes 24 of the 1st second separate core plate 16 (the fourth one of the first and second separate core plates), and then pushes back the punched-out circular portions. The punched-out circular portions are concentric and equal in diameter to the holes 20 defined in the lobes 24 of the first separate core plate, when the second separate core plate 16 is superimposed on the first separate core plate 12. When the punched-out circular portions are pushed back, therefore, the positioners 26 and surrounding areas thereof that are punched out are fitted back into the holes 20, which are formed in the lobes 24 of the second separate core plate 16 when the positioners 26 and surrounding areas thereof are punched out.

The above process of punching out and pushing back the circular portions, which is carried out by the hole push-back die assembly 44, essentially is the same as the process of blanking and pushing back the first separate core plate 12, etc., which is carried out by the blanking push-back die assembly 40, and will not be described in detail below.

After the eighteenth step, the sheet 32 is fed by five pitches. During this time, in nineteenth through twenty-second steps, the pilot hole forming die assemblies 34 and the positioner forming die assemblies 38 of the first forming apparatus 31a and the second forming apparatus 31b, the blanking push-back die assembly 40, the magnet hole forming die assembly 42, and the hole push-back die assembly 44 of the first forming apparatus 31a are operated to machine the sheet 32 according to predetermined processes.

Figure 11:
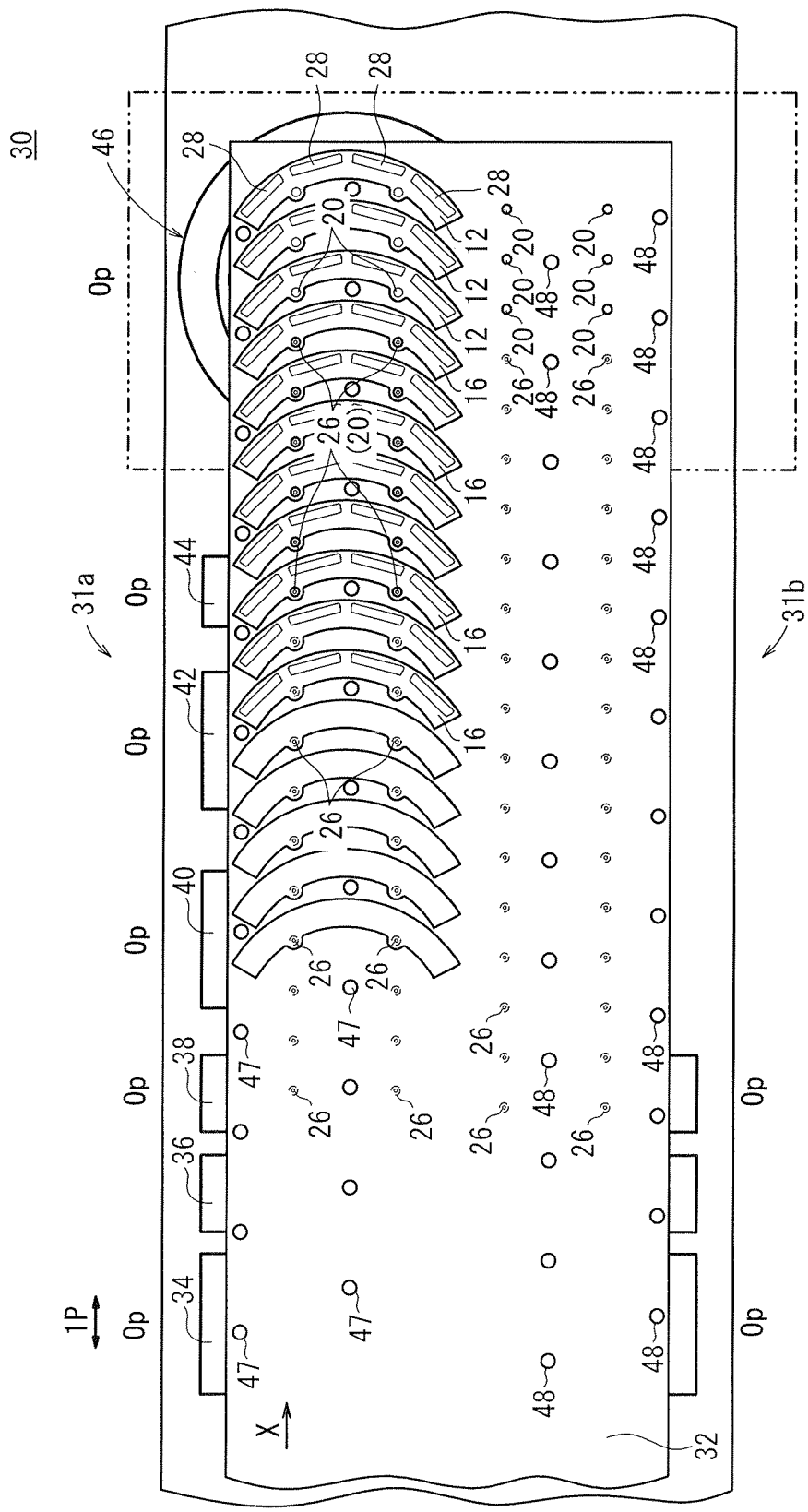
FIG. 11 is a plan view, with partial omission, showing a twenty-third step of the method of manufacturing a rotor core.

In a twenty-third step, as shown in FIG. 11, the blanking push-back die assembly 40 of the first forming apparatus 31a forms a new second separate core plate 16 according to the push-back process, and thereafter, the magnet hole forming die assembly 42 of the first forming apparatus 31a forms magnet holes 28 in the new second separate core plate 16. The hole push-back die assembly 44 of the first forming apparatus 31a forms holes 20 in the positioners 26 of the new second separate core plate 16 according to the push-back process.

In the twenty-third step, the 1st first separate core plate 12 reaches a drop-through position D (a range enclosed by the dotted lines shown in FIG. 12A) in the drop-through die assembly 46. Then, the drop-through die assembly 46 is operated in order to drop the first separate core plate 12, which has been blanked by the blanking push-back die assembly 40, and then is pushed back. The drop-through die assembly 46 is operated successively in subsequent steps, i.e., a twenty-fourth step and steps thereafter, in order to stack first separate core plates 12 and second separate core plates 16 in a ring-shaped pattern.

A process of dropping and stacking first separate core plates 12 and second separate core plates 16 with the drop-through die assembly 46 will be described below with reference to FIGS. 12A, 12B, 13A-13C, and 14A, 14B.

As shown in FIGS. 12A and 12B, the drop-through die assembly 46 comprises a substantially cylindrical hollow upper frame 56, having an annular groove defined on an inner circumferential surface thereof, an outer guide member (crimping ring) 58 mounted in the annular groove in the upper frame 56 and which is rotatable by a rotating mechanism (drive mechanism) 55, and a cylindrical hollow lower frame 60 spaced from and disposed in confronting relation to a lower surface of the upper frame 56.

An inner guide member 62, which is backed up by a rod 61a of a hydraulic cylinder mechanism (back pressure applying mechanism) 61 and held at a predetermined position (height), is disposed radially inwardly of the upper frame 56 and the lower frame 60. The hydraulic cylinder mechanism 61 is vertically movable and can be stopped at a given position. A flange 61b is mounted on the lower end of the rod 61a. The flange 61b functions as a positioner for preventing the rod 61a from being lifted beyond a predetermined position (height) when the flange 61b abuts against a flange 60a disposed on an inner circumferential portion of the lower frame 60. The rod 61a has a distal end surface (upper surface), which is engageable in a recess (not shown) defined in the lower surface of the inner guide member 62, for thereby radially positioning the inner guide member 62.

The inner guide member 62 is in the form of a substantial cylinder, having an outer circumferential surface that is fittingly engageable with and disengageable from (i.e., substantially complementary in shape to) inner annular edges of the first core plate 14 and the second core plates 18. The outer circumferential surface of the inner guide member 62 has a plurality of axially extending recesses 62a defined therein, for receiving the lobes 24 on inner circumferential surfaces of the first core plate 14 and the second core plates 18.

Although each of the first core plate 14 and other core plates has six lobes 24, to provide versatility, the inner guide member 62 has twelve recesses 62a spaced at equal intervals. Specifically, the inner guide member 62 with the twelve recesses 62a is compatible with a first core plate 114 as well as with other core plates having twelve lobes 24, described later (see FIGS. 25A through 25C). According to the present embodiment, therefore, each of the lobes 24 engages within every other recess 62a. However, the inner guide member 62 may contain as many recesses 62a, i.e., six recesses 62a, as the number of lobes 24.

As shown in FIG. 12A, the rotating mechanism 55 comprises a servomotor 63, a pulley 65 coupled to a drive shaft 63a of the servomotor 63 and rotatable thereby, and a timing belt 67 trained around the pulley 65 and the outer guide member 58. When a servo controller 69 controls the servomotor 63 to rotate the pulley 65 through a predetermined angle, the timing belt 67 causes the outer guide member 58 to rotate through a predetermined angle highly accurately and quickly. A sensor 71 is disposed near the outer guide member 58 for detecting and inputting rotational angle information and angular position (phase) information of the outer guide member 58 to the servo controller 69. Based on the rotational angle information and the angular position information, the servo controller 69 controls the servomotor 63 through a feedback loop.

A dimension R1, which represents the width of a gap 51 between the outer circumferential surface of the inner guide member 62 and the inner circumferential surface of the outer guide member 58, is set to be slightly smaller than another dimension R2 (see FIGS. 2, 12A, and 12B), which represents the radial width of the first separate core plates 12 and the second separate core plates 16 (R1<R2). Therefore, the gap 51 functions as a holder 51 for holding the first separate core plates 12, etc., that have been dropped.

In the drop-through die assembly 46, the 1st first separate core plate 12, which has been pushed back to the sheet 32 by the blanking push-back die assembly 40, moves over the inner guide member 62 and is set at a position above the holder 51, while being positioned by the pilot holes 47 and the pilot pins (see FIG. 12B). In other words, the 1st first separate core plate 12 is set at the drop-through position D in the drop-through die assembly 46.

Then, as shown in FIG. 12B, a punch 64 is lowered to drop the 1st first separate core plate 12 from the sheet 32.

In the holder 51, an inner arcuate edge of the dropped 1st first separate core plate 12 is held in sliding contact with the outer circumferential surface of the inner guide member 62 and is subjected to an internal pressure, while the outer arcuate edge thereof is held in sliding contact with the inner circumferential surface of the outer guide member 58 and is subjected to a side pressure (external pressure). More specifically, the inner circumferential surface of the dropped 1st first separate core plate 12 is supported by the inner guide member 62 while being positioned by the lobes 24 and the recesses 62a, and the outer circumferential surface of the dropped 1st first separate core plate 12 is subjected to a pressure imposed from the outer guide member 58, so that the 1st first separate core plate 12 is press-fitted into the holder 51 (the gap 51). Therefore, as indicated by the two-dot-and-dash lines in FIG. 12B, the first separate core plate 12 is held in the holder 51 without dropping further downwardly (see FIG. 13A). The lobes 24 may be replaced with recesses, and the recesses 62a may be replaced with lobes, for providing a similar positioning action.

At this time, since the inner guide member 62 is backed up by a back pressure applied from the hydraulic cylinder mechanism 61, the inner guide member 62 is not displaced, even under downward pressing forces from the punch 64, but rather is held in the given position.

The twenty-third step is completed in the manner described above. Operation of the drop-through die assembly 46, in twenty-forth and subsequent steps, will be described below.

In the twenty-forth step, the rotating mechanism 55 of the drop-through die assembly 46 is actuated while the 1st first separate core plate 12 that was dropped in the twenty-third step is held in the holder 51 (see FIG. 13A). Then, the outer guide member 58 is turned through a predetermined angle θ1 (120° in the present embodiment) (see FIG. 13B).

Because of the above relationship, in which the dimension R1 is less than the dimension R2 (R1<R2), the first separate core plate 12 is fitted into the holder 51, while the lobes 24 thereof engage in the recesses 62a of the inner guide member 62. Consequently, rotation of the outer guide member 58 is transmitted through the first separate core plate 12 to the inner guide member 62. While being backed up by the hydraulic cylinder mechanism 61, therefore, the inner guide member 62 is turned through the predetermined angle θ1 in synchronism with the outer guide member 58. The first separate core plate 12 held in the holder 51 also is turned through the predetermined angle θ1 in unison with the outer guide member 58.

Then, the 2nd first separate core plate 12 is dropped and pressed into the holder 51 in the same manner as the 1st first separate core plate 12. As shown in FIG. 13B, the dropped 2nd first separate core plate 12 is positioned in a circumferentially juxtaposed relation to the 1st first separate core plate 12.

In a twenty-fifth step, the outer guide member 58 of the drop-through die assembly 46 is further turned through the predetermined angle θ1, and thereafter, the 3rd first separate core plate 12 is dropped and pressed into the holder 51. The dropped 3rd first separate core plate 12 is placed in a juxtaposed relation to the 1st and 2nd first separate core plates 12, lying flush therewith, and jointly making up the ring-shaped first core plate 14. The first core plate 14 formed in this manner serves as the lowermost layer (first layer) of the rotor core 10a.

In a twenty-sixth step, as shown in FIG. 13C, while the first core plate 14 is held in the holder 51 of the drop-through die assembly 46, the outer guide member 58 is turned through a predetermined angle θ2 (60° in the present embodiment), thereby turning the first core plate through the predetermined angle θ2.

Then, the 1st second separate core plate 16 (i.e., a fourth one of the first and second separate core plates) is dropped and fitted into the holder 51, so as to become superimposed on the first core plate 14.

Since the first core plate 14 has already been turned through the predetermined angle θ2, the center of the arcuate shape of the dropped 1st second separate core plate 16 is aligned with abutting ends A1 of two first separate core plates 12 (the 1st and 3rd first separate core plates 12) of the first core plate 14 (see FIG. 13C). The dropped 1st second separate core plate 16 is fitted into the holder 51 under a blanking load (pressing action) of the punch 64, and at the same time pushes against the first separate core plates 12 disposed therebeneath.

The two positioning lobes 26a of the dropped 1st second separate core plate 16 engage in one of the holes 20 of the 1st first separate core plate 12, and in one of the holes 20 of the 3rd first separate core plate 12 (see FIG. 14A).

In FIGS. 14A and 14B, numerals [1] through [9], assigned to and located near the separate core plates 12, 16, represent the order by which the separate core plates 12, 16 are formed on the rotor core production line 30. For example, [1] indicates the 1st first separate core plate 12, and [4] indicates the 1st second separate core plate 16. Reference lines B, indicated by the broken lines in FIGS. 14A and 14B, represent a position (height) where the 1st through 3rd first separate core plates 12 (the first core plate 14) are initially blanked and held in the holder 51.

In twenty-seventh and twenty-eighth steps, the rotating mechanism 55 turns the outer guide member 58 through the predetermined angle θ1 (120°), so as to turn the first core plate 14 and the 1st second separate core plate 16 through the predetermined angle θ1. Then, 2nd and 3rd second separate core plates 16 (i.e., fifth and sixth ones of the separate core plates) are dropped. Accordingly, the second core plate 18 is stacked as a second layer on the first core plate 14, which forms the first layer, and the second core plate 18 is angularly spaced a predetermined angle θ2 (60°) from the first layer. At this time, the positioning lobes 26a of the positioners 26 of the second core plate 18 engage within respective holes 20 of the first core plate 14 (see FIG. 14A).

Likewise, in a twenty-ninth step, the outer guide member 58 is turned through the predetermined angle θ2 (60°), thereby turning the first core plate 14 (first layer) and the second core plate 18 (second layer) through the predetermined angle θ2 (60°). Thereafter, a 4th second separate core plate 16 (i.e., a seventh one of the separate core plates) is dropped onto the second layer. Then, the first core plate 14 (first layer), the second core plate 18 (second layer), and the 4th second separate core plate 16 (i.e., the seventh one of the separate core plates) are turned through the predetermined angle θ1 (120°), after which the 5th and 6th second separate core plates 16 (eighth and ninth ones of the separate core plates) are dropped (thirtieth and thirty-first steps) (see FIG. 14B).

Accordingly, the second core plate 18 is stacked as a third layer on the second layer, while the second core plate 18 is angularly spaced by the predetermined angle θ2 (60°) from the second layer. At this time, the positioning lobes 26a of the positioners 26 of the second core plate 18, forming the third layer, engage within the positioning cavities 26b of the second core plate 18 that forms the second layer (see FIG. 14B).

The process of dropping and stacking second separate core plates 16 with the drop-through die assembly 46 in the thirty-second and subsequent steps is substantially the same as the twenty-ninth through thirty-first steps (see FIG. 14B) described above, and will not be described in detail below. With respect to each of the twenty-fourth and subsequent steps, only the operation of the drop-through die assembly 46 has been described. However, in those steps, the other die assemblies also are operated to machine the sheet 32.

When the sheet 32 is fed successively to respective machining positions in the blanking push-back die assembly 40, the magnet hole forming die assembly 42, the hole push-back die assembly 44, and the drop-through die assembly 46 of the second forming apparatus 31b, the second forming apparatus 31b machines the sheet 32 according to predetermined processes, in the same manner as the first forming apparatus 31a. For example, in a forty-third step, as shown in FIG. 15, the 1st first separate core plate 12 is dropped by the drop-through die assembly 46 of the second forming apparatus 31b.

Figure 16:
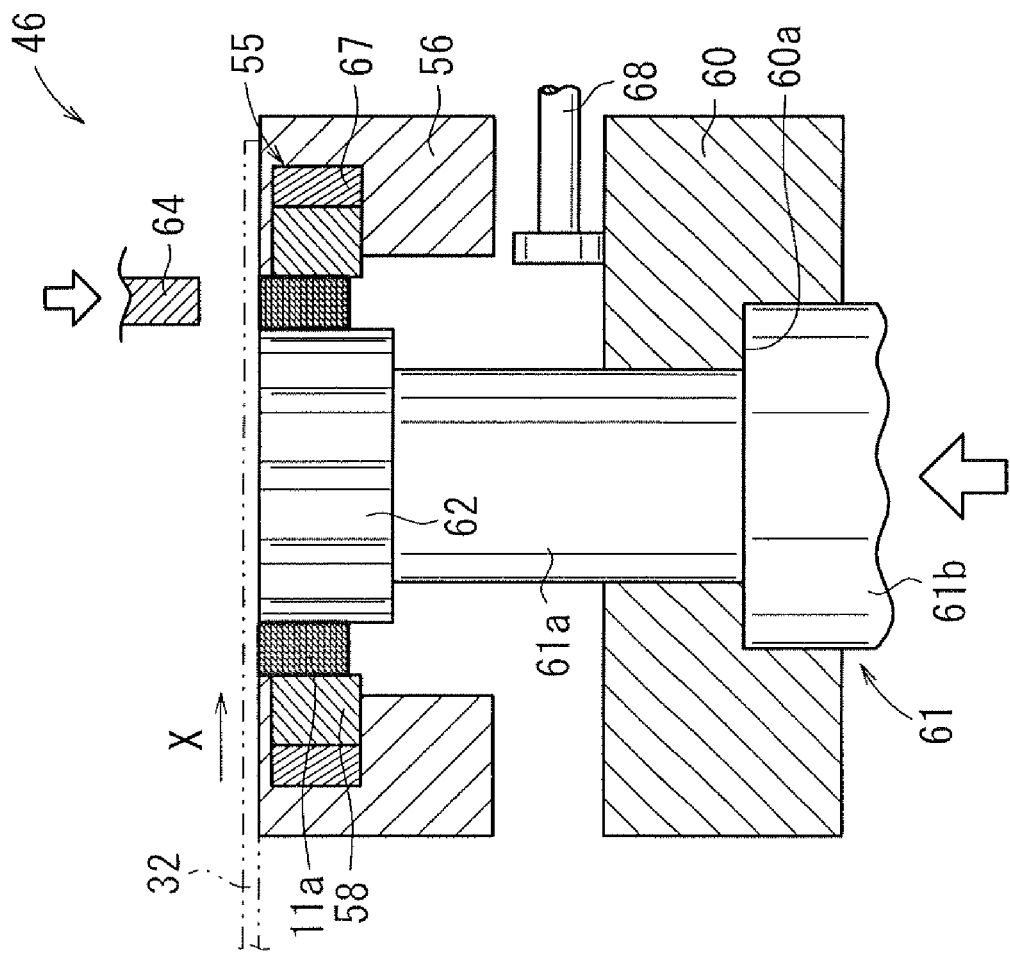
FIG. 16 is a schematic cross-sectional view showing the manner in which a stacked assembly is produced by the drop-through die assembly shown in FIG. 3.

Thereafter, the drop-through die assemblies 46 of the first forming apparatus 31a and the second forming apparatus 31b continuously stack the core plates in a predetermined number of layers (in the present embodiment, a total of 50 layers, including the first core plate 14 as the lowermost layer and 49 second core plates 18 stacked thereon). When the first core plate 14 and the second core plates 18 are stacked in such a predetermined number of layers (i.e., 50 layers), a stacked assembly 11a made up of fifty layers is formed while being held in the holder 51 (see FIG. 16).

The stacked assembly 11a formed in this manner is made up of the separate core plates 12, 16, which are stacked and press-fitted in the holder 51. The layers of the stacked assembly 11a are integrally pressed together with a strength large enough to prevent the layers from being displaced outside of the stack (displaced out of position) under light shocks during transportation thereof, for example. Since the separate core plates 12, 16 are stacked while the outer guide member 58 is rotated, even if the positioning lobes 26a and the positioning cavities 26b are positionally displaced slightly between the layers when they are stacked, the separate core plates 12, 16 become axially aligned due to sliding contact of the outer guide member 58 with the annular outer circumferential surfaces of the layers upon rotation of the outer guide member 58, and hence the separate core plates 12, 16 are pressed together and stacked accurately.

Then, a 1st first separate core plate 12 in a second cycle (a 151st one of the separate core plates) is stacked onto the pressed stacked assembly 11a. First separate core plates 12 and second separate core plates 16 are successively stacked in a predetermined number of layers, in the same manner as in the steps described above.

Figure 17:
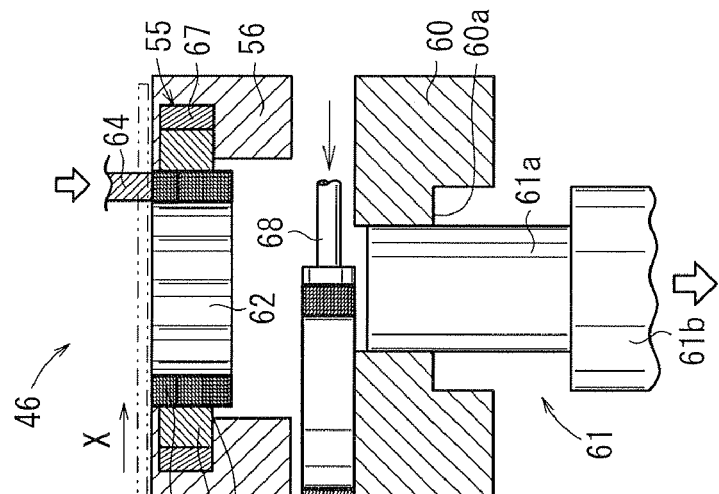
FIG. 17A is a schematic cross-sectional view showing the manner in which another stacked assembly is produced on the stacked assembly, which is produced by the drop-through die assembly shown in FIG. 3.
FIG. 17B is a schematic cross-sectional view showing the manner in which the first stacked assembly is dropped.
FIG. 17C is a schematic cross-sectional view showing the manner in which the dropped stacked assembly is unloaded.

As shown in FIG. 17A, a new stacked assembly 11b is then formed on the stacked assembly 11a. Similar to the lowermost layer of the stacked assembly 11a, the lowermost layer (first layer) of the stacked assembly 11b is provided by the first core plate 14, the flat lower surface of which is free of positioning lobes 26a. Therefore, the lowermost layer (first layer) of the stacked assembly 11b does not engage in and is not pressed into the positioning cavities 26b in the uppermost layer (50th layer) of the stacked assembly 11a. Rather, the stacked assembly 11a and the stacked assembly 11b are formed separately from each other.

When a new stacked assembly 11c starts to be formed on the stacked assembly 11b, as shown in FIG. 17B, the stacked assembly 11a passes fully through the holder 51. Therefore, the first stacked assembly 11a is automatically released from the holder 51 and falls onto an upper surface of the lower frame 60.

As shown in FIG. 17C, the rod 61a of the hydraulic cylinder mechanism 61 is lowered, and an unloader 68 is moved horizontally on the upper surface of the lower frame 60, so as to unload the stacked assembly 11a easily from the drop-through die assembly 46 and proceed to a subsequent step (i.e., a step of inserting pins 22 in the present embodiment). At this time, since the stacked assembly 11b is pressed and held in the holder 51 between the outer guide member 58 and the inner guide member 62, the stacked assembly 11b and the inner guide member 62 are prevented from falling, even when the rod 61a is lowered.

The rotor core production line 30 forms a new stacked assembly on the stacked assembly 11c, and successively carries out such processes in order to form a succession of stacked assemblies, to thereby produce the rotor core 10a from a single web of the sheet 32, and automatically unload the stacked assemblies.

Figure 18:
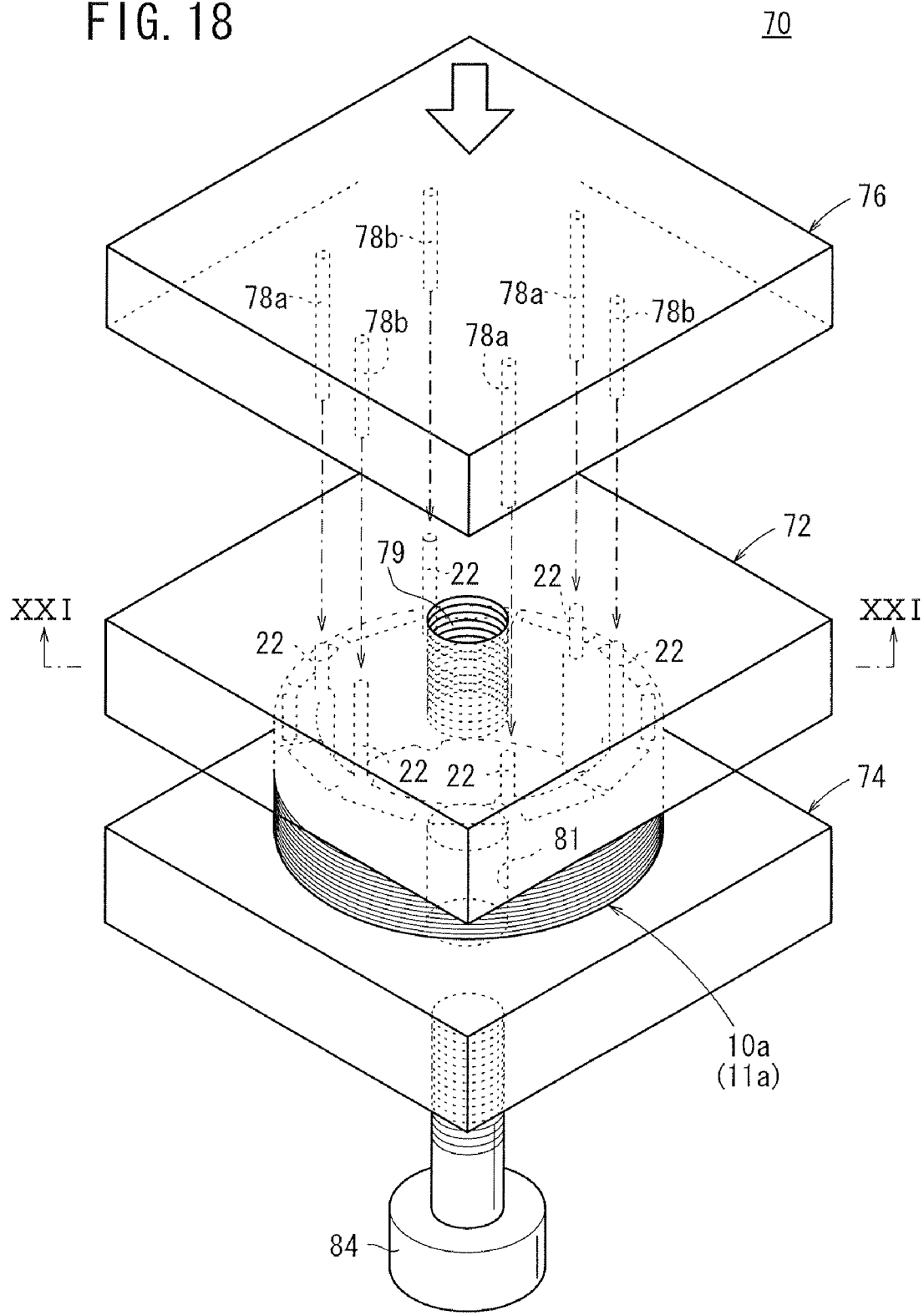
FIG. 18 is a schematic perspective view showing the manner in which pins are inserted by a pin inserting device into the stacked assembly manufactured on the rotor core production line shown in FIG. 3.
Figure 19:
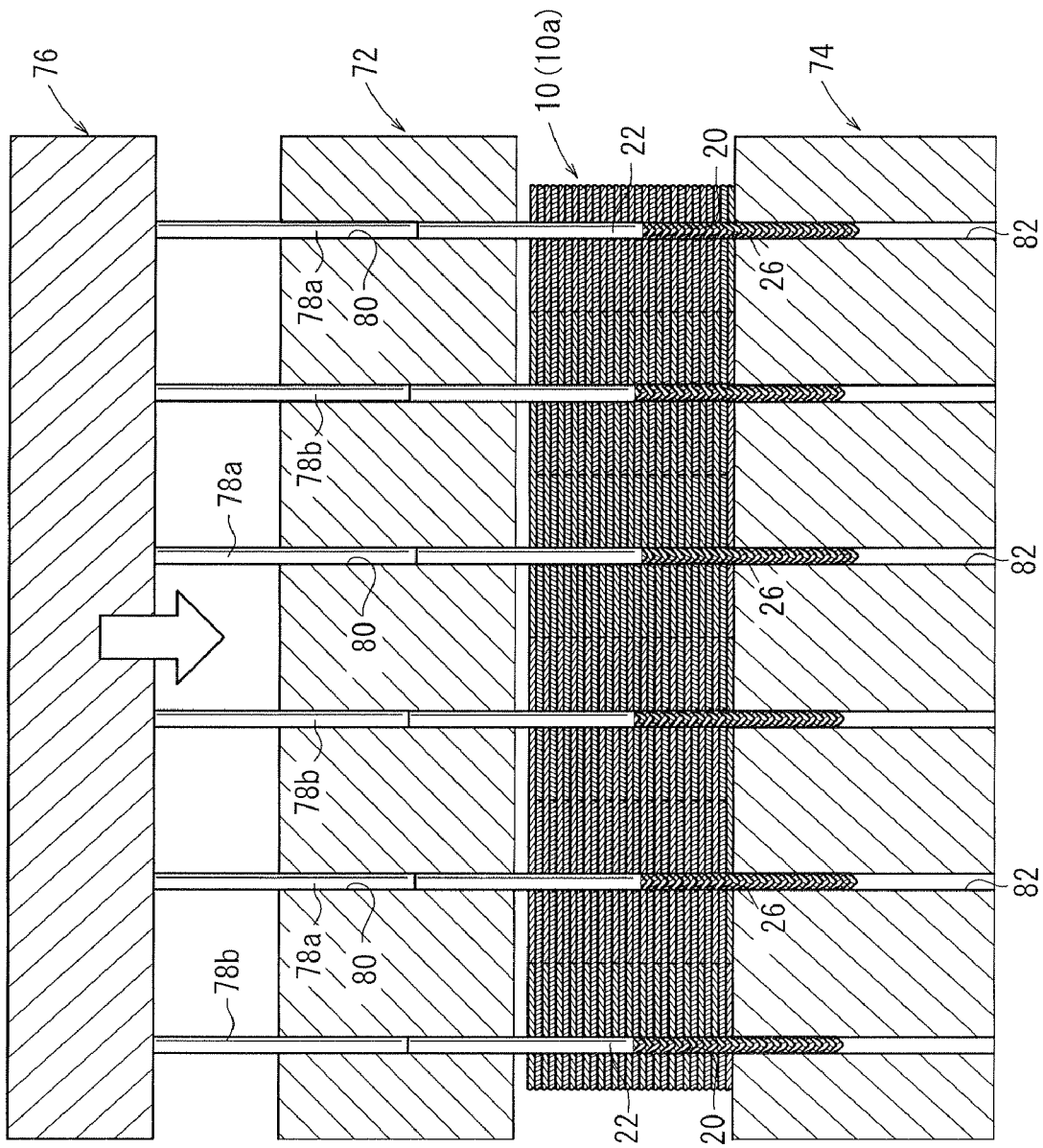
FIG. 19 is a cross-sectional view showing the manner in which the pins are inserted into the stacked assembly by the pin inserting device, the view being expanded circumferentially through 360°.

A process of inserting pins 22 into the stacked assembly 11a produced on the rotor core production line 30, in order to connect the layers with the pin inserting device 70, will be described below with reference to FIGS. 18 through 20.

The pin inserting device 70 comprises an upper surface pressing jig 72 and a lower surface pressing jig 74, for pressing respective upper and lower surfaces of the stacked assembly 11a, and for producing the rotor core 10a to hold the stacked assembly 11a, and a pushing jig 76 for inserting pins 22 into respective holes 20 in the stacked assembly 11a.

The pushing jig 76 has a plurality of (six in the present embodiment) jig pins 78a, 78b projecting from a lower surface thereof (a surface facing in the pushing direction) and corresponding to the respective holes 20. The jig pins 78a, 78b have two types of lengths. In the present embodiment, three jig pins 78a are slightly longer than the other three jig pins 78b. The difference between the length of the jig pins 78a and the length of the jig pins 78b is equal to or greater than the thickness of each layer of the stacked assembly 11a (rotor core 10a), i.e., the thickness of one of the first core plate 14 and the second core plates 18.

Figure 21:
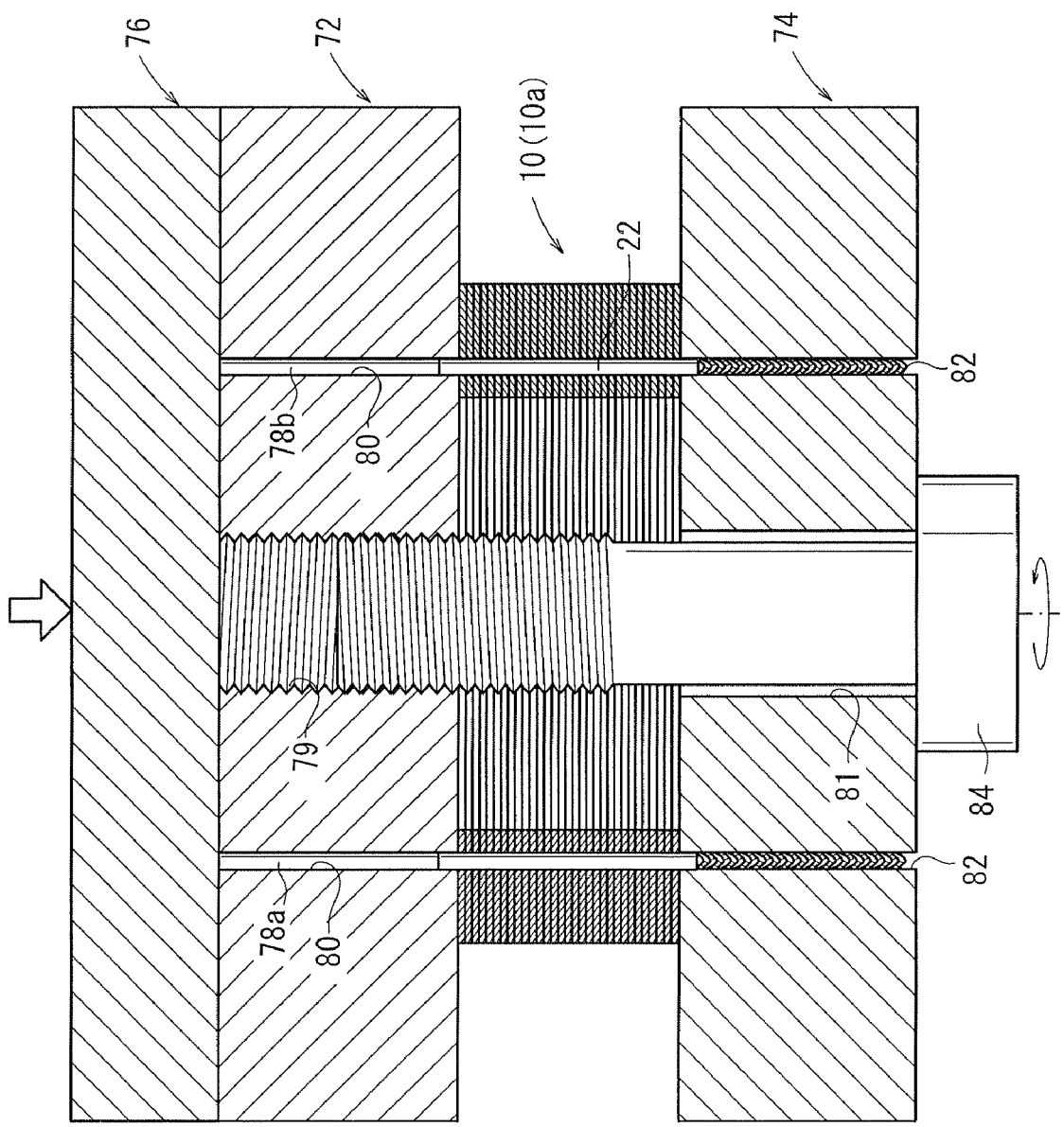
FIG. 21 is a cross-sectional view taken along line XXI-XXI of FIG. 18.

The upper surface pressing jig 72 is in the form of a block whose thickness is slightly greater than the length of the pins 22, and has an internally threaded hole 79 extending centrally therethrough (see FIG. 21). The upper surface pressing jig 72 also has a plurality of (six in the present embodiment) guide holes 80 corresponding in position to the holes 20 (see FIG. 19).

The lower surface pressing jig 74 is substantially identical in shape to the upper surface pressing jig 72, and has a bolt insertion hole 81 extending centrally therethrough (see FIG. 21). The lower surface pressing jig 74 also has a plurality of (six in the present embodiment) ejector holes 82 corresponding in position to the holes 20 (see FIG. 19).

The pin inserting device 70 operates as follows: First, the upper surface pressing jig 72 and the lower surface pressing jig 74 holds the stacked assembly 11a while pressing the same. At this time, the holes 20 in the stacked assembly 11a, the guide holes 80 in the upper surface pressing jig 72, and the ejector holes 82 in the lower surface pressing jig 74 are held in positional alignment with each other by a positioning means or the like (not shown), so that the respective holes are connected coaxially and continuously.

Pins 22 are inserted into the guide holes 80 in the upper surface pressing jig 72, and then, the jig pins 78a, 78b of the pushing jig 76 are inserted into the guide holes 80 after the pins 22. The pushing jig 76 is pushed downwardly, thereby causing the jig pins 78a, 78b to press and lower the pins 22. As shown in FIG. 19, when pushed by the jig pins 78a, 78b, the pins 22 push the positioners 26 and surrounding areas downwardly, which make up punched-out portions that have been pushed out of the layers by the hole push-back die assembly 44, and eject the positioners 26 successively into ejector holes 82 in the lower surface pressing jig 74.

The jig pins 78a, 78b of the pushing jig 76 have two types of lengths. Therefore, one-half (three) of the punched-out portions (the positioners 26 and surrounding areas thereof) are initially pushed out of the layers of the stacked assembly 11a, and then the remainder (three) of the positioners 26 are pushed out and ejected into the ejector holes 82.

When the pins 22 are inserted into each layer by the first three jig pins 78a and coupled to the upper layer, the remaining three punched-out portions are pressed against the positioners 26 in the upper and lower layers at all times. In other words, when the pins 22 are inserted, one-half of the positioners 26 in each layer serve a positioning function at all times. Consequently, the layers are prevented from becoming displaced outside of the stack (displaced out of position) when the pins 22 are inserted, and the pins 22 can be inserted accurately and quickly.

When the pins 22 are inserted into the lowermost layer, the positioners 26, which are dropped stepwise from the upper layer, are fitted into the holes 20 in the lowermost layer. Therefore, the positioning lobes 26a of the positioners 26 partially engage within the ejector holes 82 in the lower surface pressing jig 74, thereby preventing the layers from becoming displaced outside of the stack.

With the pushing jig 76, one-half of the jig pins are designated jig pins 78a, and the remainder as jig pins 78b. However, if either one of these pin groups comprises at least one jig pin, then it is effective to prevent the layers from becoming displaced outside of the stack. Preferably, either one of the pin groups should comprise two or more jig pins. Alternatively, the pushing jig 76 may have half as many jig pins as the number of holes 20, and after one-half of the pins 22 have been inserted, the remaining pins 22 may then be inserted.

Figure 20:
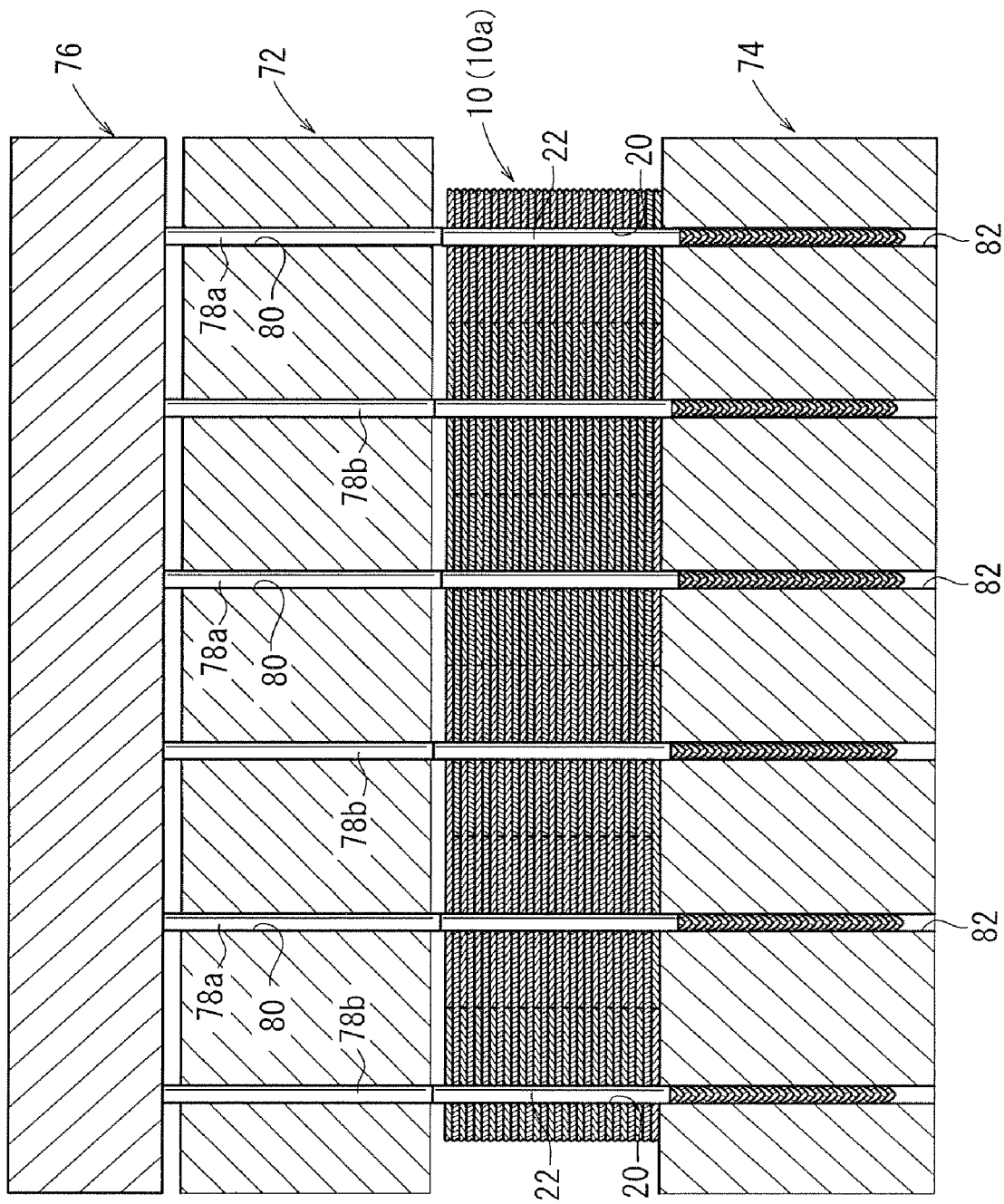
FIG. 20 is a cross-sectional view showing the manner in which the pins are inserted in the stacked assembly by the pin inserting device, the view being expanded circumferentially through 360°.

As shown in FIG. 20, the pins 22 are inserted until all of the pins 22 interconnect the layers of the stacked assembly 11a. When the layers of the stacked assembly 11a have been interconnected, then the manufacturing method proceeds to a subsequent step, i.e., a step of heating and cooling the stacked assembly 11a.

The process of heating and cooling the stacked assembly 11a connected by the pins 22, in order to firmly connect the layers with an adhesive 23 to form the rotor core 10a, will be described below with reference to FIGS. 21 and 22.

First, as shown in FIG. 21, the stacked assembly 11a with the pins 22 inserted therein is sandwiched between the pushing jig 76, the upper surface pressing jig 72, and the lower surface pressing jig 74. Then, a bolt 84 is inserted into the bolt insertion hole 81, and threaded into the internally threaded hole 79. Specifically, the bolt 84 extends through the bolt insertion hole 81, passes through the stacked assembly 11a, and is tightened in the internally threaded hole 79.

The bolt 84 is tightened while the pushing jig 76 is pressed in a direction (downward in FIG. 21), which is opposite to the direction (upward in FIG. 21) in which the bolt 84 advances. While being sandwiched by the upper surface pressing jig 72 and the lower surface pressing jig 74, the stacked assembly 11a is firmly tightened by the bolt 84, without gaps therein, and is firmly clamped.

Then, the pushing jig 76 is separated, and ejected debris (the positioners 26 and surrounding areas of the second core plate 18, which have been ejected by the pins 22) that is left in the ejector holes 82 in the lower surface pressing jig 74 is discarded.

Figure 22B:
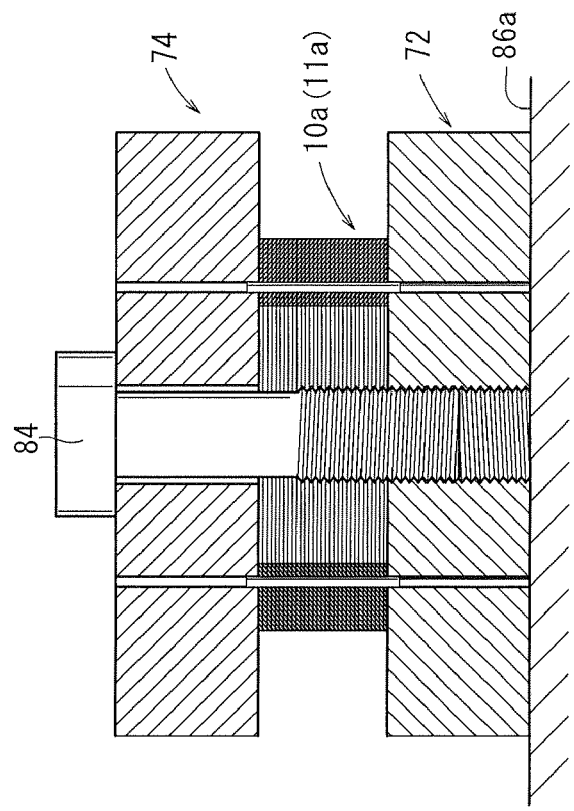
FIG. 22B is an enlarged cross-sectional view of one of the stacked assemblies.
Figure 22A:
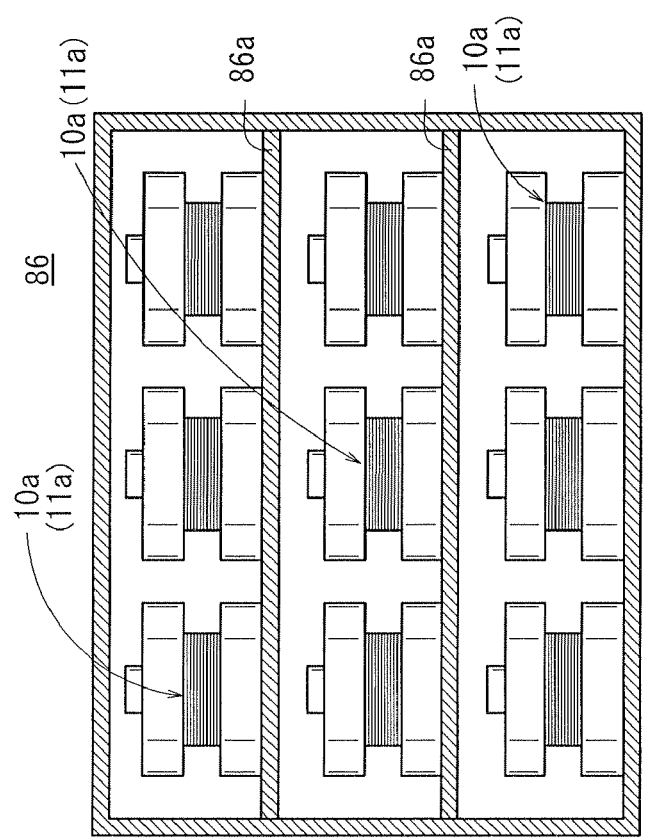
FIG. 22A is a view showing the manner in which a plurality of stacked assemblies, each of which are shown in FIG. 21, are simultaneously heated in a heating furnace.

Then, as shown in FIGS. 22A and 22B, the stacked assembly 11a, which is firmly clamped by the upper surface pressing jig 72, the lower surface pressing jig 74, and the bolt 84, is heated in a heating furnace 86. In the heating furnace 86, the stacked assembly 11a is heated to a temperature at which the adhesive 23 is rendered dissolvable, for a predetermined period of time. The adhesive 23 is thus reliably dissolved and sufficiently impregnates into clearances between the layers of the stacked assembly 11a.

Thereafter, the stacked assembly 11a is cooled (e.g., left to stand at normal temperature for a predetermined period of time). The adhesive 23, which has impregnated the clearances between the layers, is solidified, thereby producing a bonding power to firmly bond the layers of the stacked assembly 11a. Then, the upper surface pressing jig 72, the lower surface pressing jig 74, and the bolt 84 are removed, thus completing production of the rotor core 10a, whose layers are firmly connected together.

As shown in FIG. 22A, the heating furnace 86 has a plurality of shelves 86a disposed therein, and a volume that is sufficiently greater than the stacked assembly 11a, for simultaneously heating a plurality of stacked assemblies 11a. The heating furnace 86 allows the rotor cores 10 to be manufactured highly efficiently.

With the method and apparatus for manufacturing the rotor core 10a according to the first embodiment described above, as shown in FIG. 15, the first separate core plates 12 and the second separate core plates 16 are cut out of the single sheet 32, without leaving substantial gaps therebetween, so that the sheet 32 can be utilized at an increased rate. Furthermore, while the sheet 32 is successively fed, the first separate core plates 12 and the second separate core plates 16 are formed and then quickly stacked. Accordingly, the rotor core 10a can be produced highly efficiently and quickly, resulting in very high manufacturing efficiency.

In the drop-through die assembly 46, the rotating mechanism 55 for rotating the outer guide member 58, i.e., for changing the phase of the first separate core plates 12, etc., comprises a servo mechanism including the servomotor 63 and the servo controller 69, to carry out the above servo control process. Consequently, the phase can be changed highly accurately, with high responsiveness, and setting changes can easily be made, even when the components to be manufactured are changed.

In the drop-through die assembly 46, since the outer guide member 58 and the inner guide member 62 can impart an external pressure and an internal pressure to the first separate core plates 12, etc., the holder 51 does not need to hold the lower surfaces of the first separate core plates 12. Inasmuch as the stacked assembly 11a, which is made up of layers that are stacked in a predetermined number of layers, is automatically dropped as it passes through the holder 51, the stacked assembly 11a can be fed easily and quickly to a subsequent step, without stopping the stacking process in the drop-through die assembly 46. Accordingly, efficiency in manufacturing the rotor core 10a is increased.

The outer circumferential surface of the inner guide member 62 has recesses 62a for positioning the lobes 24 of the first separate core plates 12, etc. Therefore, the first separate core plates 12, etc., can be stacked highly accurately.

The produced rotor core 10a is highly durable because the layers are coupled very strongly by the pins 22 and the adhesive 23. Since the adhesive 23 may be applied only to the web of the sheet 32, which is a blank steel sheet, the adhesive 23 can easily and quickly be applied by any of various methods using a spray, a brush, immersion, etc. The stacked assembly 11a can be fed into the heating furnace 86 when the stacked assembly 11a is tightened by the bolt 84, after the pins 22 have been inserted by the pin inserting device 70. Therefore, the rotor core 10a can be manufactured with extremely high efficiency.

Although the layers of the rotor core 10a are coupled together very strongly by the pins 22 and the adhesive 23, the layers may be coupled with sufficient strength using only the pins 22, or the adhesive 23 alone, depending on the conditions in which the rotor core 10a is to be used. In view of such alternatives, manufacturing costs can be further reduced.

If the layers are coupled only by the pins 22 without the adhesive 23, then a sheet, which is free of the adhesive 23, may be used, and the heating and cooling process after insertion of the pins 22 can be dispensed with. If the layers are coupled only by the adhesive 23 without the pins 22, then since the pins 22 do not need to be inserted, the positioners formed by the positioner forming die assembly 38 on the rotor core production line 30 do not need to be pushed back. In other words, the hole push-back die assembly 44 on the rotor core production line 30 may be dispensed with (or not used), and thus the process of inserting the pins 22 with the pin inserting device 70 may be dispensed with.

A method and apparatus for manufacturing a ring core according to a second embodiment of the present invention will be described below primarily with reference to FIGS. 23 through 26. Reference characters in FIGS. 23 through 26, which are identical to those shown in FIGS. 1 through 22, denote identical or similar parts, having similar functions and advantages, and hence will not be described in detail below. Further, for the sake of brevity, the broken-line mesh pattern representing the adhesive 23 has been omitted from illustration in FIG. 23. This applies also to the other embodiments described below as well.

Figure 23:
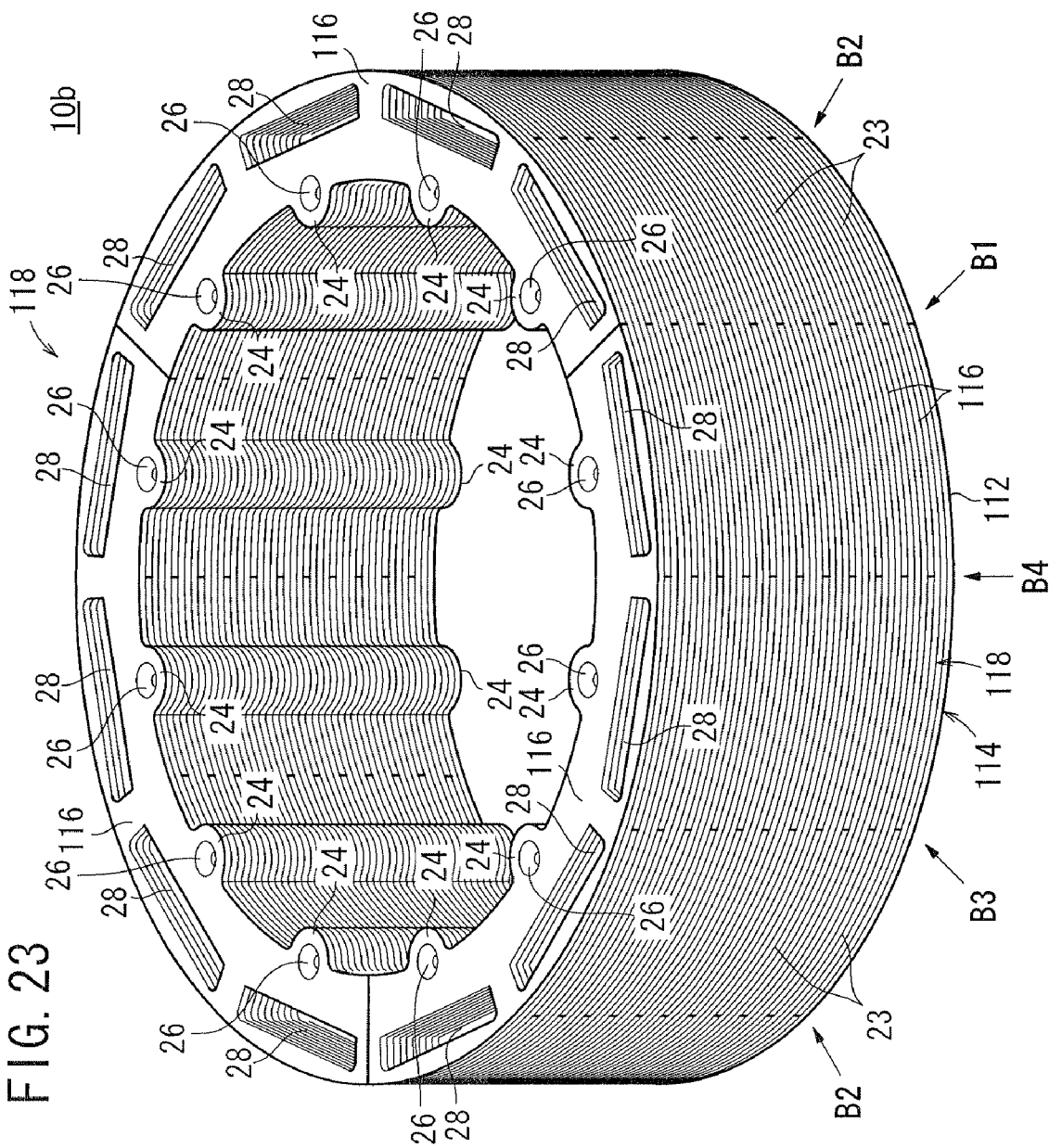
FIG. 23 is a perspective view of a rotor core manufactured by a method of manufacturing a ring core according to a second embodiment of the present invention.

FIG. 23 is a perspective view of a rotor core (ring core) 10b manufactured by the apparatus for manufacturing a ring core according to the second embodiment of the present invention.

The rotor core 10b differs from the rotor core 10a, in that the rotor core 10b comprises a ring-shaped first core plate 114, made up of first separate core plates 112 each having four lobes 24 on an inner circumferential edge thereof, and ring-shaped second core plates 118 made up of second separate core plates 116 each having four lobes 24 on the inner circumferential edge thereof. Also, the separate core plates have ends (abutting ends) displaced through different angles (phases) within the layers.

On the rotor core 10a, each of the lobes 24 is disposed in a central phase position between two adjacent magnet holes 28 (see FIG. 1, etc.). On the rotor core 10b, however, each of the lobes 24 is disposed in a phase position, which is aligned with the center of one of the magnet holes 28 (see FIGS. 23 and 24).

On the rotor core 10b, the first core plate 114 serving as the first layer has end positions indicated by the arrow B1 in FIG. 23, and the second core plate 118 serving as the second layer has end positions indicated by the arrow B2. Similarly, the second core plate 118 serving as the third layer has end positions indicated by the arrow B3, the second core plate 118 serving as the fourth layer has end positions indicated by the arrow B4, and the second core plate 118 serving as the fifth layer has end positions indicated by the arrow B1. The second core plates, as upper layers, are stacked with the end positions thereof being displaced in the same sequence. The arrows B1 through B4 are successively displaced 60° out of phase.

Figure 24:
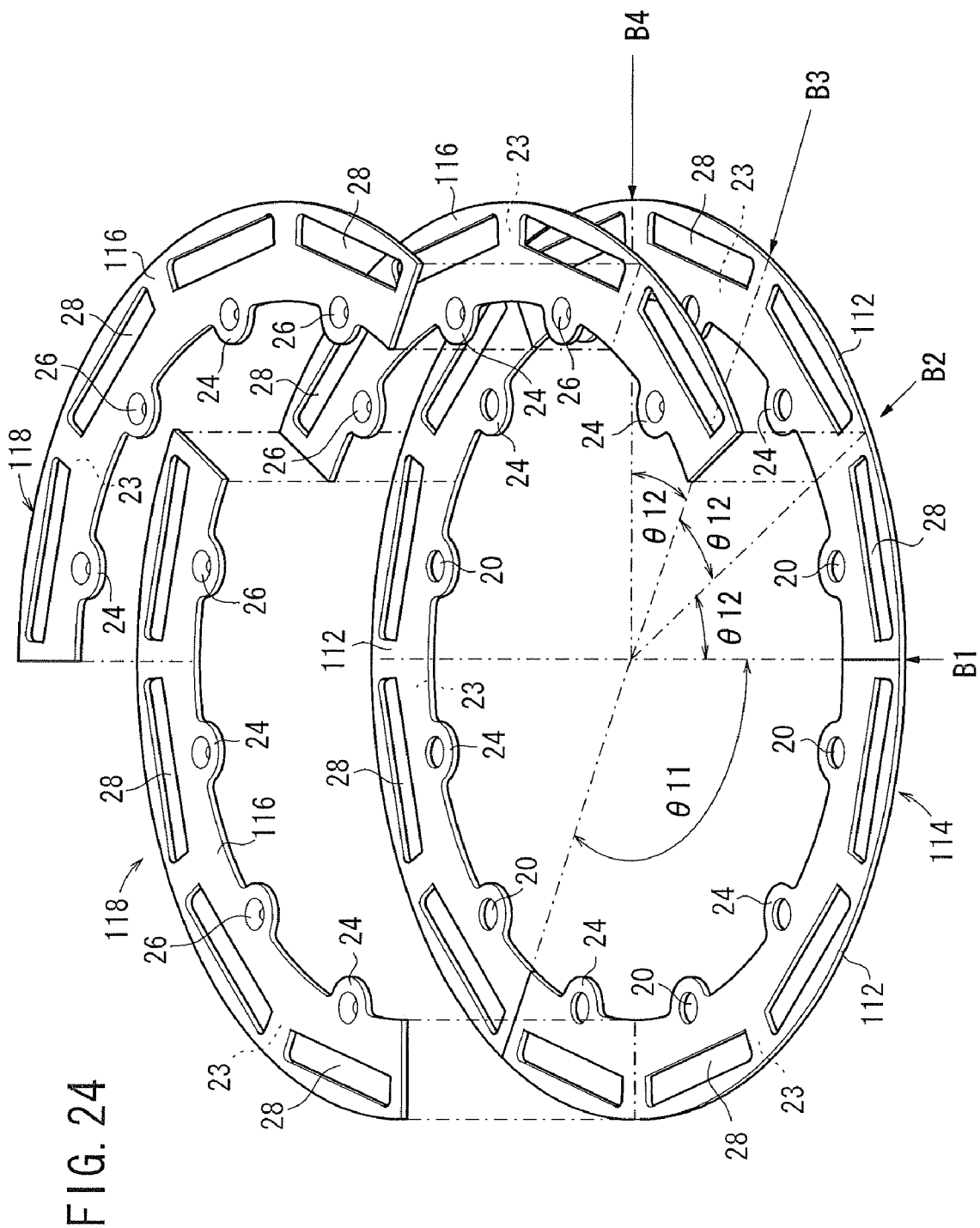
FIG. 24 is an exploded perspective view of a portion of the rotor core shown in FIG. 23.

Specifically, as shown in FIG. 24, the first core plate 114, which serves as the first layer (lowermost layer), includes the first separate core plates 112, whose ends (abutting ends) abut at three positions B1 that are angularly spaced by a predetermined angle $\theta 11$ (120° in the present embodiment). The second core plate 118, which serves as the second layer, includes the second separate core plates 116, whose ends abut at positions B2 that are angularly spaced from the positions B1 by a predetermined angle $\theta 12$ (30° in the present embodiment). The second core plate 118, which serves as the third layer, includes the second separate core plates 116, whose ends abut at positions B3 that are angularly spaced from the positions B2 by a predetermined angle $\theta 12$ (30° in the present embodiment). The positions at which ends of the second separate core plates 116 of the upper layers abut are angularly spaced in a similar manner.

As described above, the layers of the rotor core 10b are stacked so as to be successively displaced by the predetermined angle $\theta 12$ (30°). Since the first core plate 114 and the other core plates each have twelve lobes 24, the positioners 26 on the lobes 24 engage with each other between the layers (see FIGS. 26A and 26B).

The layers of the rotor core 10b thus constructed are coupled to each other only by the adhesive 23, for example. Since the process of inserting the pins 22 is not required, a production line, which is free of the hole push-back die assemblies 44 on the rotor core production line 30, and which has a different number of punching dies in the blanking push-back die assemblies 40 (i.e., a different profile for the blanking push-back die assemblies 40) for punching the lobes 24, may be used, in order to automatically form the rotor cores 10b successively, in substantially the same manner as the rotor cores 10a.

Figure 25A:
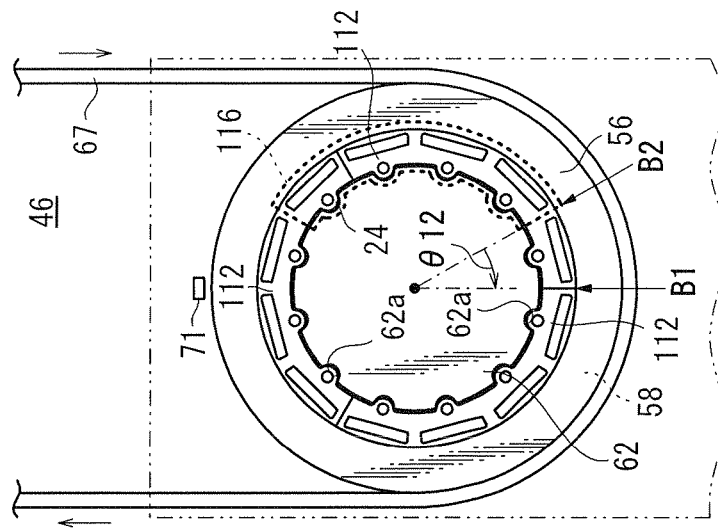
FIG. 25A is a plan view, with partial omission, showing the manner in which a 1st first separate core plate of the rotor core shown in FIG. 23 is dropped through a drop-through die assembly.
Figure 25B:
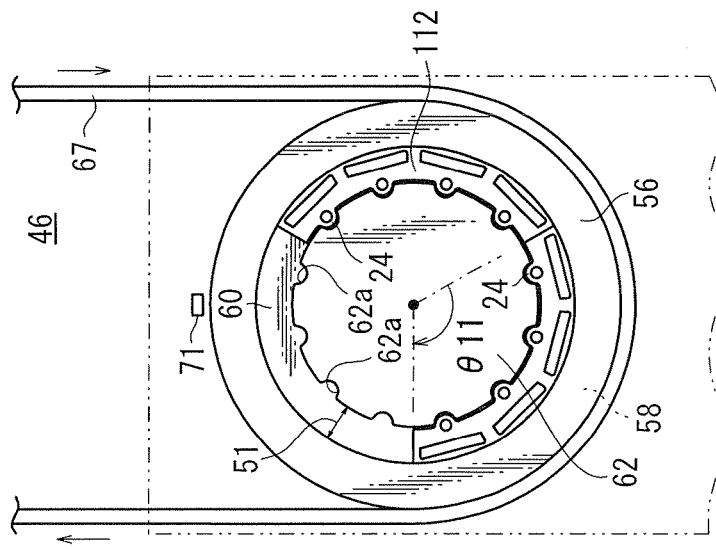
FIG. 25B is a plan view, with partial omission, showing the manner in which a 2nd first separate core plate is dropped.
Figure 25C:
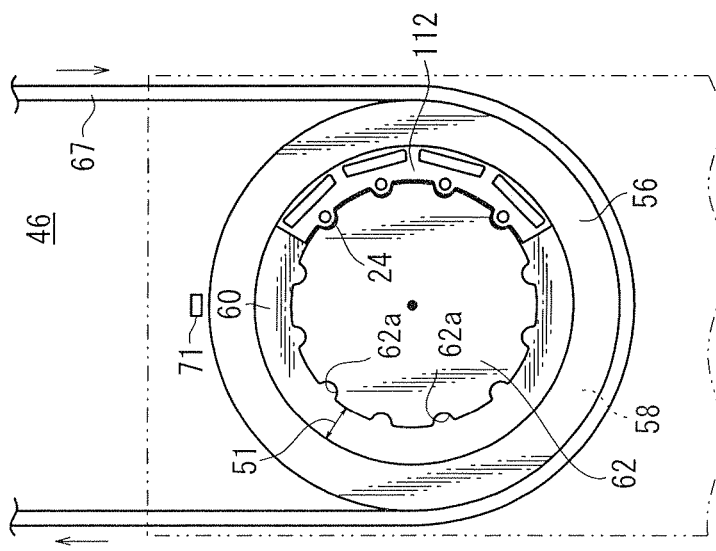
FIG. 25C is a plan view, with partial omission, showing the manner in which an outer guide member is turned a predetermined angle after a 3rd first separate core plate has been dropped.

In the drop-through die assembly 46, the rotating mechanism 55 for rotating the outer guide member 58, i.e., changing the phase of the first separate core plates 112, etc., comprises a servo mechanism, whereby the above servo control process is performed. Consequently, when producing the rotor core 10b, the core plates can be stacked while quickly and easily rotating the first separate core plates 112, etc., through the predetermined angles $\theta 11$ (120°) and $\theta 12$ (30°), as shown in FIGS. 25A through 25C.

The pins 22 are not inserted into the rotor core 10b, and the layers are coupled only by the adhesive 23. However, as with the rotor core 10b, the layers may be coupled by the pins 22 alone, or by both the pins 22 and the adhesive 23.

With the method and apparatus for manufacturing the rotor core 10b according to the second embodiment, as described above, each of the first separate core plates 112 and the second separate core plates 116 has four lobes 24, each of which is disposed in a phase position aligned with the center of one of the magnet holes 28. The layers are stacked such that the layers are displaced successively by the predetermined angle θ12 (30°).

Stated otherwise, the core plates 114, 118, which are made up of the separate core plates 112, 116, each having at least two magnet holes defined at equal intervals and arranged in a ring-shaped pattern, are stacked such that ends (abutting ends) or separating positions thereof are displaced through an angle unit corresponding to one magnet hole 28. Therefore, since the arc of each of the first separate core plates 112 extends through the predetermined angle θ11 (120°) and has four magnet holes 28, the angle unit corresponding to one magnet hole 28 represents 30° (the predetermined angle θ12), which results when the predetermined angle θ11 is divided by 4.

Therefore, the area (bonding area) at which the separate core plates within the layers are superimposed on one another is increased substantially, and the adhesive is highly resistant to forces acting in the shearing direction. Hence, the layers are coupled to each other very strongly. Therefore, in particular, the rotor core is effectively used as a rotor core, which is rotated at extremely high speeds and is subjected to strong centrifugal forces and shearing forces in the radial direction.

Figure 27:
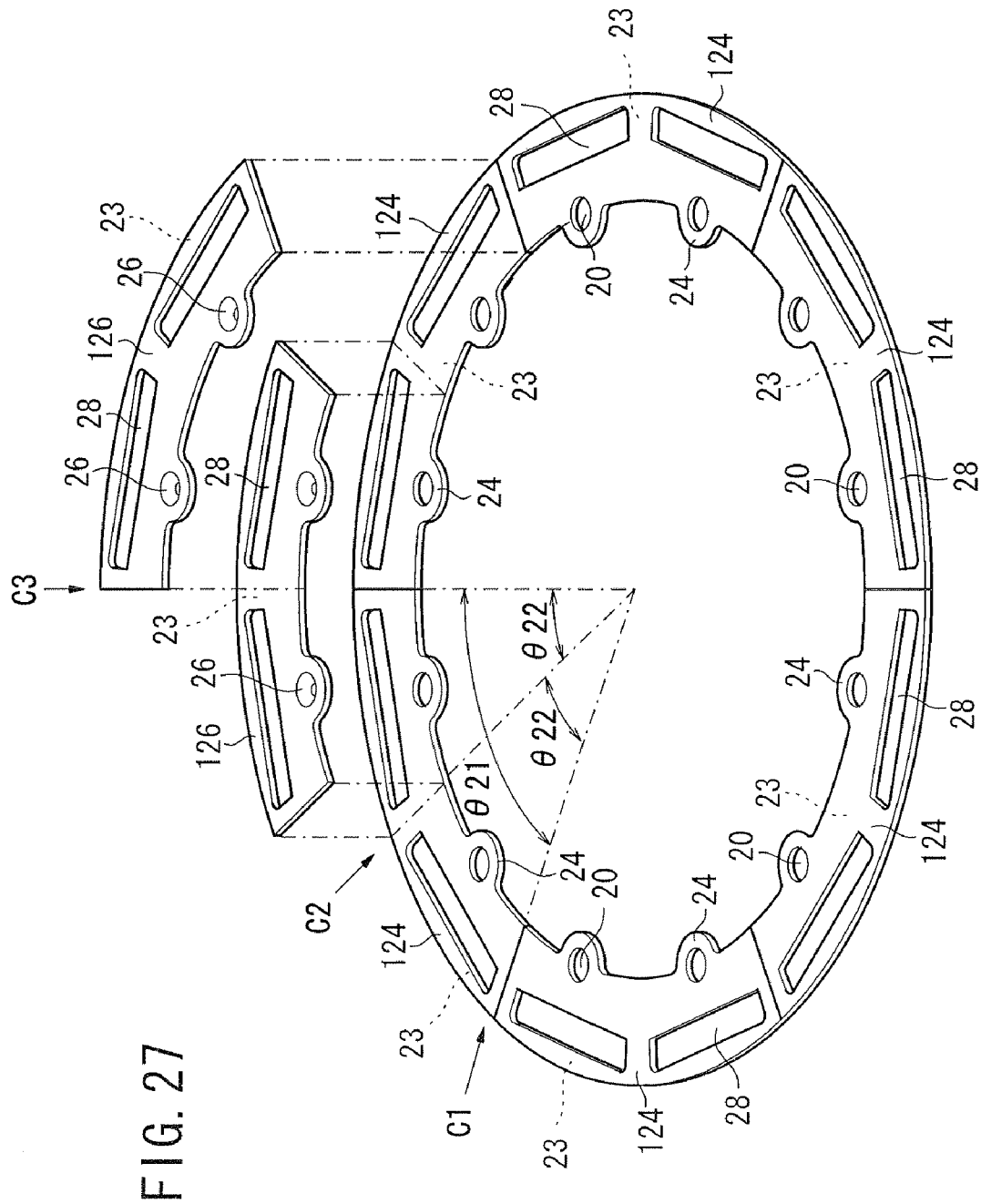
FIG. 27 is an exploded perspective view of a portion of a rotor core according to a modification of the rotor core shown in FIG. 23.

As shown in FIG. 27, the first separate core plates 112 and the second separate core plates 116 may be formed as first separate core plates 124 and second separate core plates 126, each having two magnet holes 28 and divided into a smaller size.

The arc of each of the first separate core plates 124 and the second separate core plates 126 extends through a predetermined angle θ21 (60°). The first separate core plate 114 in the lowermost layer (first layer) has an end (abutting end) at a position indicated by the arrow C1. The second separate core plates 126 in the second and third layers have ends at positions angularly spaced from the position indicated by the arrow C1, by a predetermined angle θ22 (30°) (see arrows C2, C3 in FIG. 27).

The results of a rotational burst test for rotating a rotor core, which was made up of the above separate core plates and whose layers were coupled to each other using only the adhesive 23, without the pins 22, shall be described below. The rotor core was rotated at a high speed around the central axis of the rotor core, while applying a high load (load) to the rotor core under centrifugal forces, and measuring a rupture load for the rotor core.

The test was conducted on rotor cores A through C whose layers were coupled by the following three types of adhesive bonding: The rotor core A comprised first separate core plates 12 and second separate core plates 16 (see FIG. 2) whose ends were displaced by the predetermined angle θ2 (60°). The rotor core A comprised first separate core plates 112 and second separate core plates 116 (see FIG. 24) whose ends were displaced by the predetermined angle θ12 (30°). The rotor core C comprised first separate core plates 124 and second separate core plates 126 (see FIG. 27) whose ends were displaced by the predetermined angle θ22 (30°).

The test results indicate that, if it is assumed the rotor core A had a burst load of 100, then the rotor core B had a burst load of 112, and the rotor core C had a burst load of 80. Although each of the rotor cores exhibited a required strength in practice, the rotor core B had the layers thereof coupled to each other most strongly.

Figure 28:
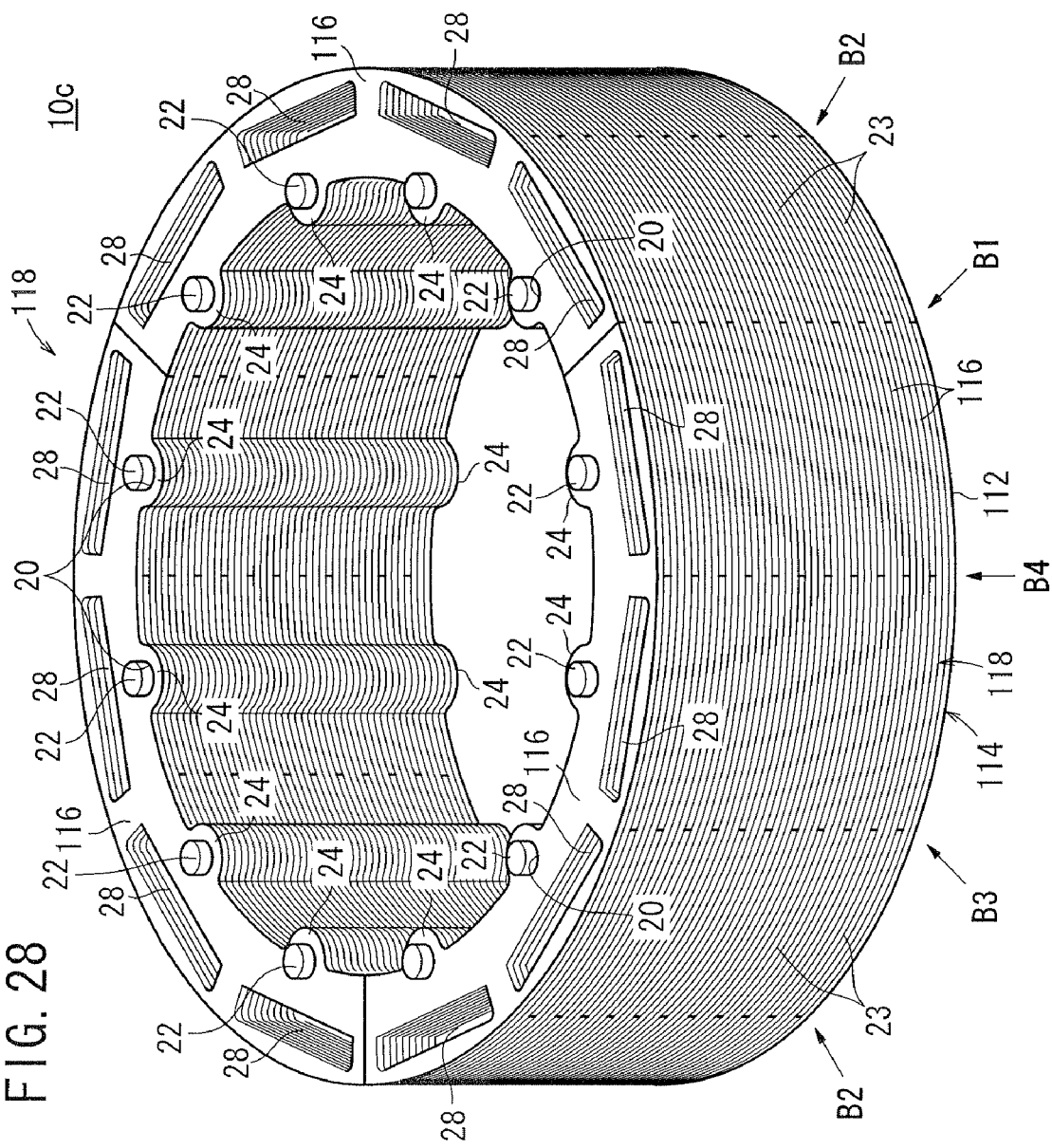
FIG. 28 is a perspective view of a rotor core manufactured by a method of manufacturing a ring core according to a third embodiment of the present invention.

A method and apparatus for manufacturing a ring core according to a third embodiment of the present invention will be described below. FIG. 28 is a perspective view of a rotor core (ring core) 10c manufactured by the apparatus for manufacturing a ring core according to the third embodiment of the present invention.

The rotor core 10c includes layers of the rotor core 10b (see FIG. 23), which are coupled to each other by pins 22.

Figure 29:
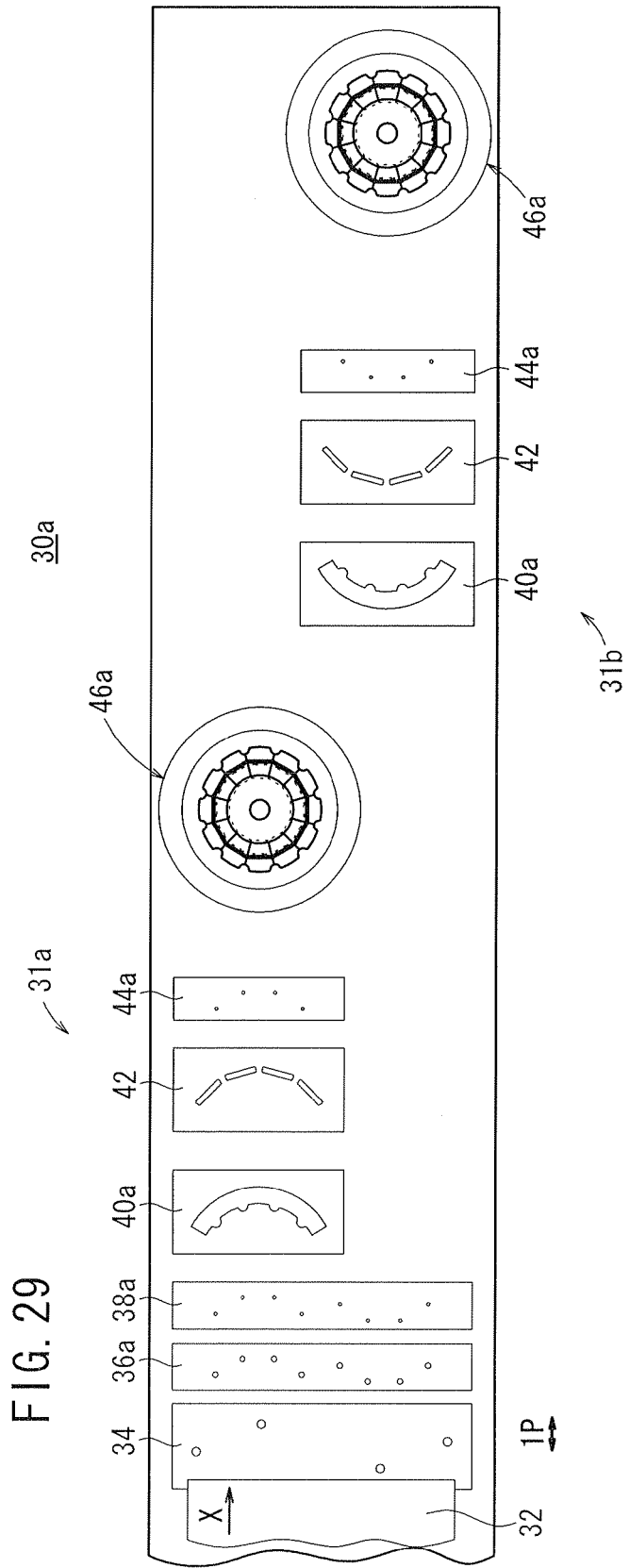
FIG. 29 is a schematic plan view of a rotor core production line according to the third embodiment of the present invention.

As shown in FIG. 29, a rotor core production line 30a includes a hole forming die assembly 36a, a positioner forming die assembly 38a, blanking push-back die assemblies 40a, and hole push-back die assemblies 44a, each of which incorporates modifications to deal with a change in the number of lobes 24 from the hole forming die assemblies 36, the positioner forming die assemblies 38, the blanking push-back die assemblies 40, and the hole push-back die assemblies 44 of the rotor core production line 30. The rotor core production line 30a includes drop-through die assemblies 46a, each having a modified outer guide member, a modified inner guide member, a modified rotating mechanism, etc., instead of the above drop-through die assemblies 46a.

The forming steps carried out on the rotor core production line 30a, which range from the step carried out by the hole forming die assembly 36a to the step carried out by the hole push-back die assemblies 44a, are essentially the same as the corresponding steps carried out by the above core production line, and will not be described in detail below.

A process of forming the rotor core 10c, by dropping and stacking first separate core plates 112 and second separate core plates 116 through the drop-through die assemblies 46a, will be described below with reference to FIGS. 30 through 33.

Figure 30:
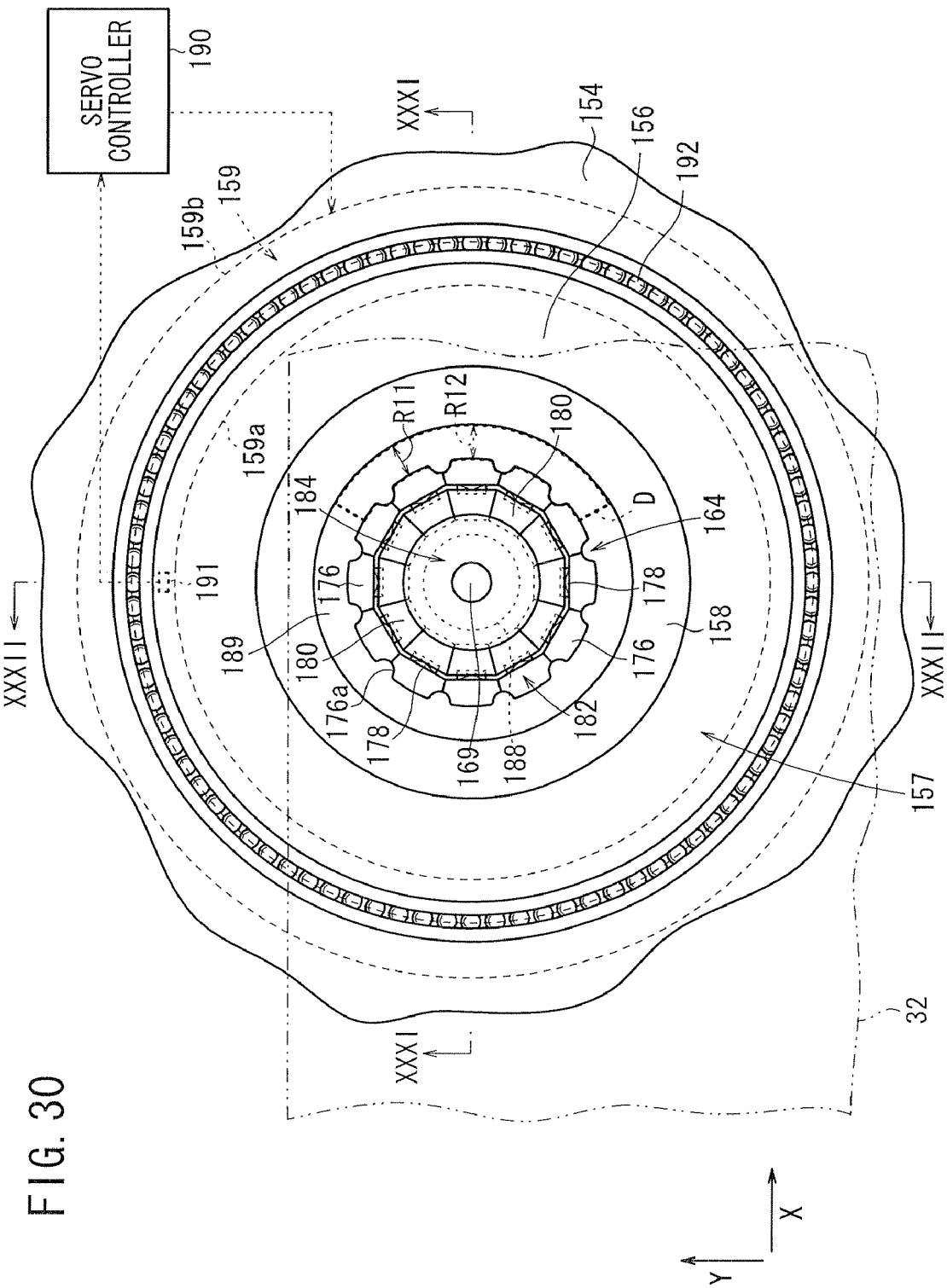
FIG. 30 is an enlarged plan view, with partial omission, of a drop-through die assembly of the rotor core production line shown in FIG. 29.
Figure 31:
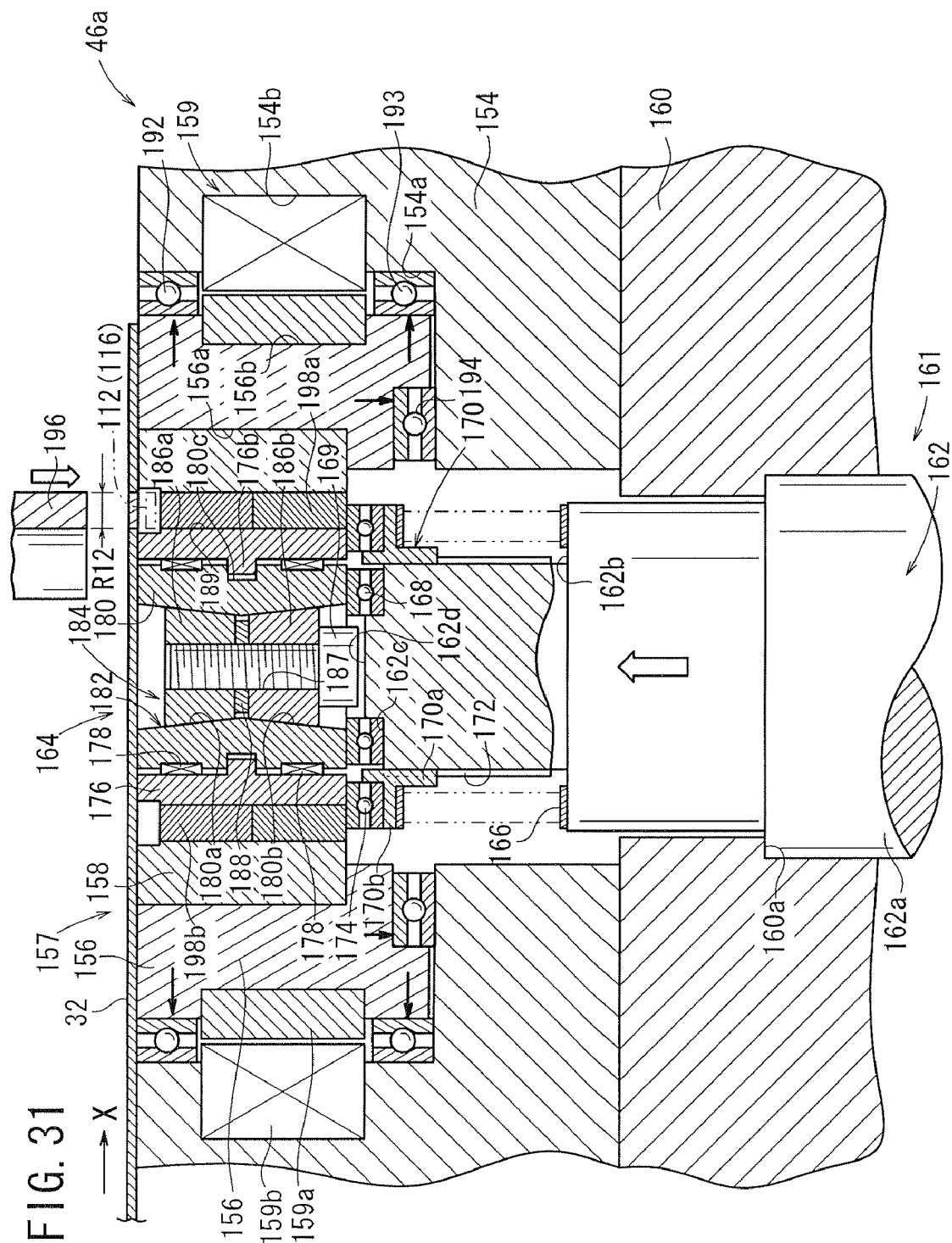
FIG. 31 is a schematic cross-sectional view taken along line XXXI-XXXI of FIG. 30.

As shown in FIGS. 30 through 32, each of the drop-through die assemblies 46a comprises a substantially cylindrical hollow upper frame 154 including a step 154a, which has an annular groove 154b defined in an inner circumferential surface thereof, and a substantially cylindrical hollow lower frame 160 supporting the lower surface of the upper frame 154. The drop-through die assembly 46a also includes an outer guide member 157 comprising a substantially cylindrical hollow movable frame 156 disposed on the step 154a of the upper frame 154 and having a step 156a defined in an inner circumferential surface thereof, and an annular groove 156b defined in an outer circumferential surface thereof, and a ring member (outer guide member, crimping member) 158 fixed to the step 156a of the movable frame 156. The outer guide member 157 is rotatable by a rotational drive force from a servomotor (rotational drive source, rotating mechanism) 159. The ring member 158 may be structured integrally with the movable frame 156.

As shown in FIG. 32, the lower surface of the upper frame 154, which is held against the lower frame 160, has a first passage 154c defined therein, which extends in the direction indicated by the arrow Y, the direction of the first passage 154c being perpendicular to the direction indicated by the arrow X in which the sheet 32 is fed, and a second passage 154d, which is slightly greater than the first passage 154c. An unloading member 163, which is movable back and forth in the direction indicated by the arrow Y, is disposed in the first passage 154c.

The drop-through die assembly 46a also includes an inner guide member 164 disposed radially inwardly of the ring member 158 and held at a predetermined position (height) backed up by the distal end of a rod 162, in the form of a stepped cylinder of a hydraulic cylinder mechanism (back pressure applying mechanism) 161.

The hydraulic cylinder mechanism 161 is capable of moving vertically and stopping the rod 162, which extends in the movable frame 156, the upper frame 154, and the lower frame 160, at a predetermined position. A flange 162a is mounted on the lower end of the rod 162. The flange 162a functions as a positioner for preventing the rod 162 from being lifted beyond a predetermined position (height) when the flange 162a abuts against a flange 160a, which is disposed on an inner circumferential portion of the lower frame 160. The rod 162 includes a first step 162b on which a plurality (eighteen in the present embodiment) of helical springs (compression springs, resilient members) 166 are arrayed circumferentially, and a second step 162c, which is smaller in diameter and lower in height than the first step 162b, the first step 162b and the second step 162c being disposed on a distal end portion (upper end portion) of the rod 162.

As can be seen from FIGS. 31 and 32, the second step 162c has a shape defined by lowering a peripheral edge portion of a distal end surface 162d of the rod 162. An upwardly projecting bearing 168 is disposed on the second step 162c, and has an end surface (upper end surface) that essentially provides the distal end surface of the rod 162. A recess, which is defined by the inner circumferential surface of the bearing 168 and the distal end surface 162d, functions as a clearance for a protrusion (the head of a bolt 169, to be described later) on a lower surface of the inner guide member 164, and also as a diametrical positioner for the inner guide member 164.

The helical springs 166 have lower ends in the directions in which the helical springs 166 are expanded and compressed (vertical directions in FIG. 31), secured to the bottom surface of the first step 162b, and upper ends secured to a slider 170. The slider 170 comprises a hollow cylindrical member 170a surrounding a vertical circumferential surface of the first step 162b, and vertically movable while being guided by guide ridges 172 that extend axially of the rod 162 on the vertical circumferential surface of the first step 162b. The hollow cylindrical member 170a has a flange 170b projecting in a diametrical direction thereof. The flange 170b has a lower surface secured to upper ends of the helical springs 166 and an upper surface on which a bearing 174 is disposed. Spring constants of the helical springs 166 are set such that when the weight of the slider 170 and the bearing 174, together with the weight of the helical springs 166 themselves, act on the helical springs 166, the upper surface of the bearing 174 is located at a position (original position), which is the same as the upper surface of the bearing 168.

The inner guide member 164 has an outer circumferential surface functioning to support and guide the inner annular edges of the first core plate 114 and the second core plates 118. The inner guide member 164 comprises an outer frame member 182, and a central member 184 disposed radially inwardly of the outer frame member 182. The outer frame member 182 comprises a plurality of sets (twelve in the present embodiment) of first guide members (piece members 176, arranged in a ring-shaped pattern, and held against inner circumferential surfaces of the first core plate 114, etc., and second guide members (piece members) 180 disposed radially inwardly of the first guide members 176, with leaf springs 178 interposed therebetween (see FIG. 30).

The second guide members 180 have slanted surfaces 180a, 180b having diameters that are progressively greater in upward and downward directions from a substantially vertically central portion thereof. The central member 184 includes a pair of wedges 186a, 186b, each having a conical shape, held respectively against the slanted surfaces 180a, 180b. A threaded hole 187 extends axially centrally through the wedges 186a, 186b. A bolt 169 is threaded through the threaded hole 187. A spacer (shim) 188 is inserted between the wedges 186a, 186b. When the bolt 169 is threaded through the threaded hole 187 and the wedges 186a, 186b are fastened thereby, the spacer 188 determines the axial (vertical) positions of the wedges 186a, 186b.

The axial positions of the wedges 186a, 186b (the distance between the wedges 186a, 186b) at the time the bolt 169 is tightened can be established by changing the thickness of the spacer 188 that is inserted between the wedges 186a, 186b. The diametrical position of the second guide member 180 can thus be adjusted by means of sliding contact between the slanted surfaces 180a, 180b and the wedges 186a, 186b.

Specifically, if the thickness of the spacer 188 is reduced, then since the wedge 186a and the wedge 186b are brought more closely to each other, the second guide member 180 is pressed and spread diametrically. Therefore, the outer frame member 182 is spread diametrically (radially), thereby reducing the dimension R11 (see FIG. 30) of a gap 189 between the first guide member 176 and the ring member 158. Conversely, if the thickness of the spacer 188 is increased, then since the wedge 186a and the wedge 186b are more greatly spaced from each other, the outer frame member 182 contracts diametrically (radially), thereby increasing the dimension R11 of the gap 189 between the first guide member 176 and the ring member 158.

The second guide member 180 has an annular groove 180c defined in an outer circumferential surface thereof. An annular ledge 176b disposed on the inner circumferential surface of the first guide member 176 engages within the annular groove 180c. Therefore, the first guide member 176 and the second guide member 180 are combined vertically with each other.

Basically, in the inner guide member 164 constructed in the foregoing manner, the outer circumferential surface of the outer frame member 182, i.e., the outer circumferential surfaces of the first guide members 176 arranged in the ring-shaped pattern, are shaped complementarily to the inner annular edges of the first core plate 114 and the second core plates 118. Therefore, the outer circumferential surfaces of the first guide members 176, which are arranged in the ring-shaped pattern, have a plurality of axially extending recesses 176a (see FIG. 30) defined therein, and the lobes 24 on the inner circumferential surfaces of the first core plate 114 and the second core plates 118 engage within the recesses 176a.

As shown in FIGS. 31 and 32, the rotational drive source, i.e., the servomotor 159, comprises a rotor 159a fixedly mounted in the annular groove 154b of the upper frame 154, and a stator 159b fixedly mounted in the annular groove 156b of the movable frame 156 of the outer guide member 157. The rotor 159a is disposed as a web surrounding the outer circumferential surface of the movable frame 156. The stator 159b is disposed in confronting relation to the rotor 159a. The servomotor 159 is thus constructed as a so-called direct-drive motor, with the rotor 159a being directly disposed on the movable frame 156 of the outer guide member 157 to be rotated.

When current is supplied to coils, not shown, of the stator 159b under the control of a servo controller 190, the rotor 159a is rotated through a predetermined angle and the outer guide member 157 (the movable frame 156 and the ring member 158) is rotated highly accurately and quickly through the predetermined angle in unison with the rotor 159a. A sensor 191 may be disposed in the vicinity of the outer guide member 157 for inputting rotational angle information and angular position (phase) information of the outer guide member 157 to the servo controller 190. Based on the rotational angle information and the angular position information, the servo controller 190 can control the servomotor 159 through a feedback loop for effecting highly accurate rotational control. The servomotor 159 may be replaced with a rotary actuator or the like, which is actuatable under pneumatic pressure.

Three bearings 192 through 194 are disposed between the movable frame 156 of the outer guide member 157 and the upper frame 154, for allowing the outer guide member 157 to be smoothly rotated. The bearings 192 through 194 also function as bearing members for bearing pressing forces, which are applied to the outer guide member 157 from the inner guide member 164 and a punch 196, to be described later.

In the drop-through die assembly 46 constructed in the foregoing manner, the dimension R11 (see FIG. 30) of the gap 189, which is formed between the outer circumferential surfaces of the first guide members 176 of the inner guide member 164 and the inner circumferential surface of the ring member 158 of the outer guide member 157, is slightly smaller than the dimension R12 that defines the radial width of the first separate core plates 112 and the second separate core plates 116 through the positional adjustment of the wedges 186a, 186b, which is made by the bolt 169 (R11<R12). Therefore, the gap 189 can function as a holder 189 for holding the dropped first separate core plates 112, etc.

When operation of the drop-through die assembly 46a is initiated, i.e., when the separate core plates start to be stacked, first and second dummy members 198a, 198b which have a shape that is substantially the same as that of the stacked assembly made up of a predetermined number (50 in the present embodiment) of the first core plate 114 and second core plates 118, are inserted into the holder 189. The first and second dummy members 198a, 198b thus inserted reliably position and hold the components (the first guide members 176, the second guide members 180, the central member 184, etc.) of the inner guide member 164 as an integral assembly in a desired position, so as to prevent removal of the first guide members 176, etc.

The drop-through die assembly 46a operates as follows: With the sheet 32 being positioned by the pilot holes 47 and the pilot pins, the 1st first separate core plate 112, which is pushed back to the sheet 32 by the blanking push-back die assembly 40a, moves over the inner guide member 164, and is set above the holder 189 (see FIG. 31). In other words, the 1st first separate core plate 112 is set in the drop-through die assembly 46a at the drop-through position D shown in FIG. 30.

Then, as shown in FIG. 31, the punch 196 is lowered to drop the 1st first separate core plate 112 from the sheet 32.

In the holder 189, the dropped 1st first separate core plate 112 has an inner arcuate edge thereof held in sliding contact with the outer circumferential surface of the inner guide member 164, and is subjected to an internal pressure, while the outer arcuate edge thereof is held in sliding contact with the inner circumferential surface of the ring member 158, and is subjected to a side pressure (external pressure). Specifically, the inner circumferential surface of the dropped 1st first separate core plate 112 is supported by the inner guide member 164 while being positioned by the lobes 24 and the recesses 176a. Also, the outer circumferential surface of the dropped 1st first separate core plate 112 is subjected to a pressure from the ring member 158 of the outer guide member 157, so that the 1st first separate core plate 112 is press-fitted into the holder 189 (the gap 189). Moreover, the lobes 24 may be replaced with recesses, and the recesses 176a may be replaced with lobes, for providing a similar positioning action.

The first guide members 176 of the inner guide member 164 are resiliently supported on the second guide members 180 by leaf springs 178. Therefore, when the first separate core plate 112 is press-fitted into the holder 189, the first separate core plate 112 is stably held by the holder 189, essentially without being affected by variations of the width dimension R12 due to machining errors or different machining lots of the first separate core plate 112, or by variations of the width dimension R11 of the holder 189 due to wear, etc., of the inner guide member 164 and the outer guide member 157. Since the first separate core plate 112 is prevented from being forcibly pushed into the holder 189, the first separate core plate 112, the first guide members 176, and the ring member 158 are effectively prevented from becoming deformed and damaged, yet the separate core plates still can be smoothly press-fitted into the holder 189.

As shown by the two-dot-dash lines in FIG. 31, the first separate core plate 112 is held in the holder 189 (see FIG. 33A). At the same time, the lower surface of the first separate core plate 112 pushes the first and second dummy members 198a, 198b downwardly by a distance equal to the thickness of the first separate core plate 112, and the lowermost first dummy member 198a presses downwardly on the bearing 174. The first dummy member 198a thus causes the bearing 174 and the slider 170 to come into contact with the helical springs 166, by a distance equal to the thickness of the first separate core plate 112, against the bias of the helical springs 166.

At this time, since the second guide members 180 and the central member 184 of the inner guide member 164 are subjected to a back pressure through the bearing 168 and are backed up by the rod 162 of the hydraulic cylinder mechanism 161, the second guide members 180 and the central member 184 are not displaced, but are held in the predetermined position (original position), even under downward pressing forces from the punch 196. Furthermore, since the annular ledge 176b of the first guide members 176 engages within the annular groove 180c of the second guide member 180, the first guide members 176 are not pushed downwardly together with the first separate core plates 112 and the first and second dummy members 198a, 198b, but are held in the original position.

When the first separate core plates 112 are press-fitted into the holder 189, the inner guide member 164 (the first guide members 176) and the outer guide member 157 (the ring member 158) are subjected to both diametrical (radial) and axial (vertically downward) forces by the punch 196. In the drop-through die assembly 46a, the bearing 168 functions as a bearing member for bearing pressing forces applied in the axial direction of the inner guide member 164, and the bearings 192 through 194 function as bearing members for bearing pressing forces applied in diametrical and axial directions of the outer guide member 157 (the movable frame 156). Therefore, the inner guide member 164 and the outer guide member 157 (the movable frame 156) are effectively prevented from being pressed excessively against the rod 162 and the upper frame 154, and impediments to smooth rotation thereof in subsequent steps can be prevented. The bearings 192, 193 also function as bearing members for bearing diametrical pressing forces applied from the inner guide member 164 under the bias of the leaf springs 178.

At this time, the step of dropping the 1st first separate core plate 112 (which corresponds to the twenty-third step of the first embodiment) is completed. Next, operation of the drop-through die assembly 46a in subsequent steps will be described below.

While the dropped 1st first separate core plate 112 is held in the holder 189 (see FIG. 33A), the servomotor 159 is energized to turn the movable frame 156 and the ring member 158 of the outer guide member 157 through the predetermined angle θ11 (120° in the present embodiment) (see FIG. 33B).

Due to the relationship, wherein the dimension R11 is less than the dimension R12 (R11<R12), the first separate core plates 112 and the first and second dummy members 198a, 198b are press-fitted in the holder 189, and the lobes 24 of the first separate core plate 112 and lobes (not shown) of the first and second dummy members 198a, 198b engage within the recesses 176a of the inner guide member 164. Therefore, rotation of the outer guide member 157 is transmitted to the inner guide member 164 through the first separate core plate 112, etc., which is press-fitted in the holder 189. The inner guide member 164 is turned through the predetermined angle θ11 in synchronism with the outer guide member 157, while being backed up by the hydraulic cylinder mechanism 161. Naturally, the first separate core plate 112 held in the holder 189 also is turned in unison with the outer guide member 157 through the predetermined angle θ11.

When the above parts are rotated, a side surface of the movable frame 156 of the outer guide member 157 is borne by the bearings 192, 193, and the lower surface thereof is borne by the bearing 194. Lower surfaces of the first guide members 176 of the inner guide member 164 are borne by the bearing 194, and lower surfaces of the second guide members 180 of the inner guide member 164 are borne by the bearing 168. The lower surface of the first dummy member 198a, which is press-fitted into the holder 189, also is borne by the bearing 174. According to the present embodiment, therefore, rotational drive forces from the servomotor 159 are not attenuated by friction between the components, but rather the rotation of the outer guide member 157 is smoothly and reliably transmitted to the first separate core plates 112 and the first and second dummy members 198a, 198b. The first separate core plates 112 can thus be turned through the predetermined angle θ11 and positioned highly accurately and quickly.

Then, a 2nd first separate core plate 112 is dropped and press-fitted into the holder 189 in the same manner as the 1st first separate core plate 112. As shown in FIG. 33B, the dropped 2nd first separate core plate 112 is placed in a circumferentially juxtaposed relation to the 1st first separate core plate 112.

After the outer guide member 157 has been further turned through the predetermined angle θ11, a 3rd first separate core plate 112 is dropped and press-fitted into the holder 189. The dropped 3rd first separate core plate 112 is placed in the same plane as the 1st and 2nd first separate core plates 112, in juxtaposed relation thereto, thereby forming the ring-shaped first core plate 114. The first core plate 114 thus formed serves as the lowermost layer (first layer) of the rotor core 10c.

As shown in FIG. 33C, while the first core plate 114 is held in the holder 189, the outer guide member 157 is turned through the predetermined angle θ12 (30° in the present embodiment), thereby turning the first core plate 114 through the predetermined angle θ12.

Then, a 1st second separate core plate 116 (a fourth one of the first and second separate core plates) is dropped so as to be stacked on the first core plate 114 and press-fitted into the holder 189.

Since the first core plate 114 has been turned through the predetermined angle θ12, the dropped 1st second separate core plate 116 is stacked over abutting ends B1 of the two first separate core plates 112 (the 1st and 3rd first separate core plates 112) of the first core plate 114 (see FIG. 3C). Similar to the first separate core plates 112, the dropped second separate core plate 116 is fitted into the holder 189 under a punching load (pressing force) from the punch 196, and at the same time is stacked while pressing downwardly on the first separate core plates 112 and the first and second dummy members 198a, 198b, which are disposed therebeneath.

The positioning lobes 26a of the dropped 1st second separate core plate 116 engage within the holes 20 of the 1st first separate core plate 112 and the holes 20 of the 3rd first separate core plate 112.

Then, the outer guide member 157 is turned through the predetermined angle θ11 (120°), while turning the first core plate 114 and the 1st second separate core plate 116 through the predetermined angle θ11. Then, 2nd and 3rd second separate core plates 116 (fifth and sixth ones of the separate core plates) are dropped. At this time, the second core plate 118 serving as the second layer of the rotor core 10c is stacked on the first core plate 114 that serves as the first layer, the second layer being displaced from the first layer by the predetermined angle θ12 (30°). At this time, the positioning lobes 26a of the positioners 26 of the second core plate 118 engage within the holes 20 of the first core plate 114, in a similar manner as the rotor core 10b shown in FIG. 24.

Then, the outer guide member 157 is turned through the predetermined angle θ12 (30°), thereby turning the first core plate 114 (first layer) and the second core plate 118 (second layer) through the predetermined angle θ12. Thereafter, a 4th second separate core plate 116 (a seventh one of the separate core plates) is dropped onto the second layer. The first core plate 114 (first layer), the second core plate 118 (second layer), and the 4th second separate core plate 116 are turned through the predetermined angle θ11 (120°). Then, 5th and 6th second separate core plates 116 (eighth and ninth ones of separate core plates) are dropped.

At this time, the second core plate 118 serving as the third layer of the rotor core 10c is stacked on the second layer, and the third layer is displaced from the second layer by the predetermined angle θ12 (30°). Also, at this time, the positioning lobes 26a of the second core plate 118 that serves as the third layer engage within the positioning cavities 26b of the second core plate 118 that serves as the third layer.

Subsequently, the drop-through die assemblies 46a of the first forming apparatus 31a and the second forming assemblies 31b continuously stack core plates up to a predetermined number of layers (in the present embodiment, a total of 50 layers, including the first core plate 114 as the lowermost layer and 49 second core plates 118 stacked thereon). When the first core plate 114 and the second core plates 118 are stacked in a predetermined number of layers (50 layers), a stacked assembly 111a made up of the fifty layers is formed on the second dummy member 198b and is held in the holder 189 (see FIG. 34).

The stacked assembly 111a thus formed is made up of the separate core plates 112, 116 stacked and press-fitted into the holder 189. The holes 20 and the positioning lobes 26a are reliably crimped together between the first core plate 114 and the second core plates 118. Similarly, the positioning cavities 26b and the positioning lobes 26a are reliably crimped together between the second core plates 118. Therefore, the layers of the stacked assembly 111a are integrally pressed together and have a strength large enough to prevent the layers from being displaced outside of the stack (displaced out of position) due to light shocks while in transportation, for example. Since the separate core plates 112, 116 are stacked while the ring member 158 (the outer guide member 157) is rotated, even if the positioning lobes 26a and the positioning cavities 26b are positionally displaced slightly between the layers when they are stacked, the separate core plates 112, 116 become axially aligned upon rotation of the ring member 158 due to sliding contact between the ring member 158 and the annular outer circumferential surfaces of the layers, and hence are pressed together accurately.

When the stacked assembly 111a is formed in this manner, the first dummy member 198a, which has depressed the slider 170 against the helical springs 166 under the stacked assembly 111a, is completely released from the holder 189 (see FIG. 34). The first dummy member 198a is then unloaded from the apparatus. The unloading process, which will not be described in detail, is substantially the same as the process for unloading the stacked assembly 111a, which will be described below with reference to FIGS. 35A through 35C.

After the first dummy member 198a has been unloaded, a 1st first separate core plate 112 in a second cycle (a 151st one of the separate core plates, as counted from the first step) is stacked onto the pressed stacked assembly 111a in the drop-through die assembly 46a. First separate core plates 112 and second separate core plates 116 are successively stacked up to a predetermined number of layers, in the same manner as the steps described above.

A stacked assembly 111b is formed on the stacked assembly 111a. At this time, the second dummy member 198b is completely released from the holder 189. The second dummy member 198b is then unloaded from the apparatus, similar to the first dummy member 198a. The lowermost layer (first layer) of the stacked assembly 111b is provided by the first core plate 114, as with the lowermost layer of the stacked assembly 111a, and has a flat lower surface, which is free of positioning lobes 26a. Therefore, the lowermost layer (first layer) of the stacked assembly 111b does not engage in and is not pressed into the positioning cavities 26b in the uppermost layer (50th layer) of the stacked assembly 111a. Rather, the stacked assembly 111a and the stacked assembly 111b are formed separately from each other.

Then, a 1st first separate core plate 112 in a third cycle (a 301st one of the separate core plates as counted from the first step) is stacked onto the pressed stacked assembly 111b. First separate core plates 112 and second separate core plates 116 are successively stacked in a predetermined number of layers, in the same manner as the steps described above.

As shown in FIG. 35A, at this time, a new stacked assembly 111c is formed on the stacked assembly 111b. Naturally the stacked assembly 111b and the stacked assembly 111c are formed separately from each other. The stacked assembly 111a, which has initially been formed, is completely released from the holder 189. While the stacked assembly 111c is being stacked, the stacked assembly 111a is sandwiched at all times between the helical springs 166 and the stacked assembly 111b thereabove by the helical springs 166. Therefore, the engaging regions (crimped regions) of the holes 20 and the positioning lobes 26a, and the engaging regions (crimped regions) of the positioning cavities 26b and the positioning lobes 26a, are prevented from becoming disintegrated under the weight of the first core plate 114, etc., of the stacked assembly 111a. Hence, the stacked assembly 111a is reliably prevented from becoming disintegrated.

Then, from the state shown in FIG. 35A, the rod 16a of the hydraulic cylinder mechanism 161 is lowered in order to place the stacked assembly 111a on the upper surface of the lower frame 160 (see FIG. 35B).

Therefore, as shown in FIG. 35C, when the unloading member 163 is moved horizontally (in the direction indicated by the arrow Y) on the upper surface of the lower frame 160, the stacked assembly 111a can be unloaded from the drop-through die assembly 46a, and can easily be fed to a subsequent step (the step of inserting the pins 22 in the present embodiment). Since the stacked assemblies 111b, 111c are press-fitted into the holder 189, i.e., between the ring member 158 and the inner guide member 164, the inner guide member 164 does not fall, even when the rod 16a of the hydraulic cylinder mechanism 161 is lowered. Since the first guide members 176 in the outer circumferential portion of the inner guide member 164 are biased diametrically (radially) by the leaf springs 178, the inner guide member 164 is prevented more reliably from falling.

As with the rotor core production line 30, the rotor core production line 30a forms a new stacked assembly on the stacked assembly 111c, and successively carries out such a process in order to form a succession of stacked assemblies, for thereby producing the rotor core 10c from the single web of sheet 32, and automatically unloading the stacked assemblies.

A process of inserting the pins 22 into the stacked assembly 111a, etc., with the pin inserting device, and thereafter heating and cooling the stacked assembly 111a, etc., to firmly bond the layers with the adhesive 23, for thereby forming the rotor core 10c, is substantially the same as the corresponding process according to the first embodiment, and will not be described below.

The method and apparatus for manufacturing the rotor core 10c according to the third embodiment, as described above, offers the following advantages, in addition to those of the first and second embodiments:

In the servomotor 159 of the drop-through die assembly 46a, the rotor 159a is directly mounted on the movable frame 156 of the outer guide member 157, and the stator 159b is directly mounted on the upper frame 154, which bears the outer guide member 157. The servomotor 159 is thus constructed as a so-called direct-drive motor, directly mounted in the outer guide member 157. Consequently, the stacked assemblies can be positioned in the desired drop position (index position) more accurately and quickly than if the outer guide member 157 were rotated by a motor through a belt, so that the rotor core 10c can be manufactured in a reduced period of time.

In the drop-through die assembly 46a, the outer guide member 157 and the inner guide member 164 apply a side pressure (external pressure) and an internal pressure to the first separate core plates 112, etc., which are stacked, thereby reliably holding the first separate core plates 112, etc., in the holder 189. The first guide members 176 of the inner guide member 164 are supported on the second guide members 180 by leaf springs 178. Therefore, even in the presence of variations in the width dimension R12, due to machining errors or different machining lots of the first separate core plate 112, and variations in the width dimension R11 of the holder 189 due to wear, etc., of the inner guide member 164 and the ring member 158, the first separate core plates 112, etc., are repeatably and stably press-fitted and held in the holder 189. Moreover, inasmuch as the first separate core plates 112, etc., are prevented from being excessively pressed into the holder 189 due to the first guide member 176 that is resiliently supported by the leaf springs 178, the separate core plates, the first guide members 176, and the ring member 158, etc., are effectively prevented from becoming deformed and damaged. Rather, the separate core plates can be press-fitted smoothly into the holder 189.

The drop-through die assembly 46a according to the present embodiment is thus capable of speeding up an index function to determine the position where the separate core plates are to be dropped, and also of increasing the accuracy at which the separate core plates are positioned, thus allowing the separate core plates to be stably stacked (crimped) and reliably held in position. Therefore, the quality of the stacked assemblies produced after the separate core plates are stacked, i.e., the quality of the rotor core 10c, is increased.

The bearings 192, 193 are disposed one on each side of the rotor 159a on the movable frame 156, which supports the ring member 158, while the bearing 194 is disposed on the lower surface of the movable frame 156 for counteracting the pressing forces from the punch 196 that drops the separate core plates, and from the inner guide member 164 that is biased by the leaf springs 178. The ring member 158 and the movable frame 156 are thus effectively prevented from becoming distorted and deformed, and can support the outer circumferential edges of the separate core plates, which are stacked in a stable manner. The bearings 192, 193 also are effective to prevent unwanted stresses from being applied to the servomotor 159, and thus can prevent the servomotor 159 from failing to operate.

The drop-through die assemblies 46a of the rotor core production line 30a may be used to manufacture the other rotor cores 10a, 10c. The rotor core 10c may also be manufactured on the rotor core production line 30. The rotor core 10c may have sufficient strength, even if the layers thereof are fastened only by the pins 22, or only the adhesive 23, and hence may be manufactured at a reduced cost.

A method and apparatus for manufacturing a ring core according to a fourth embodiment of the present invention will be described below. FIG. 36 is a plan view of a rotor core (ring core) 10d manufactured by the apparatus for manufacturing a ring core according to the fourth embodiment of the present invention.

The rotor core 10d differs from the rotor core 10b shown in FIG. 23, in that the rotor core 10d has rectangular lobes (plate-size rectangular lobes) 224 and positioners (coupling portions, crimping portions) 226, instead of the lobes 24 and the positioners 26.

The rectangular lobes 224 have rectangular shapes, unlike the substantially semicircular lobes 24. Specifically, each of the rectangular lobes 224 includes a pair of walls (side ends) 228, 228 extending substantially perpendicular and diametrically to the arcuate direction of the separate core plates 212, 216.

Figure 39:
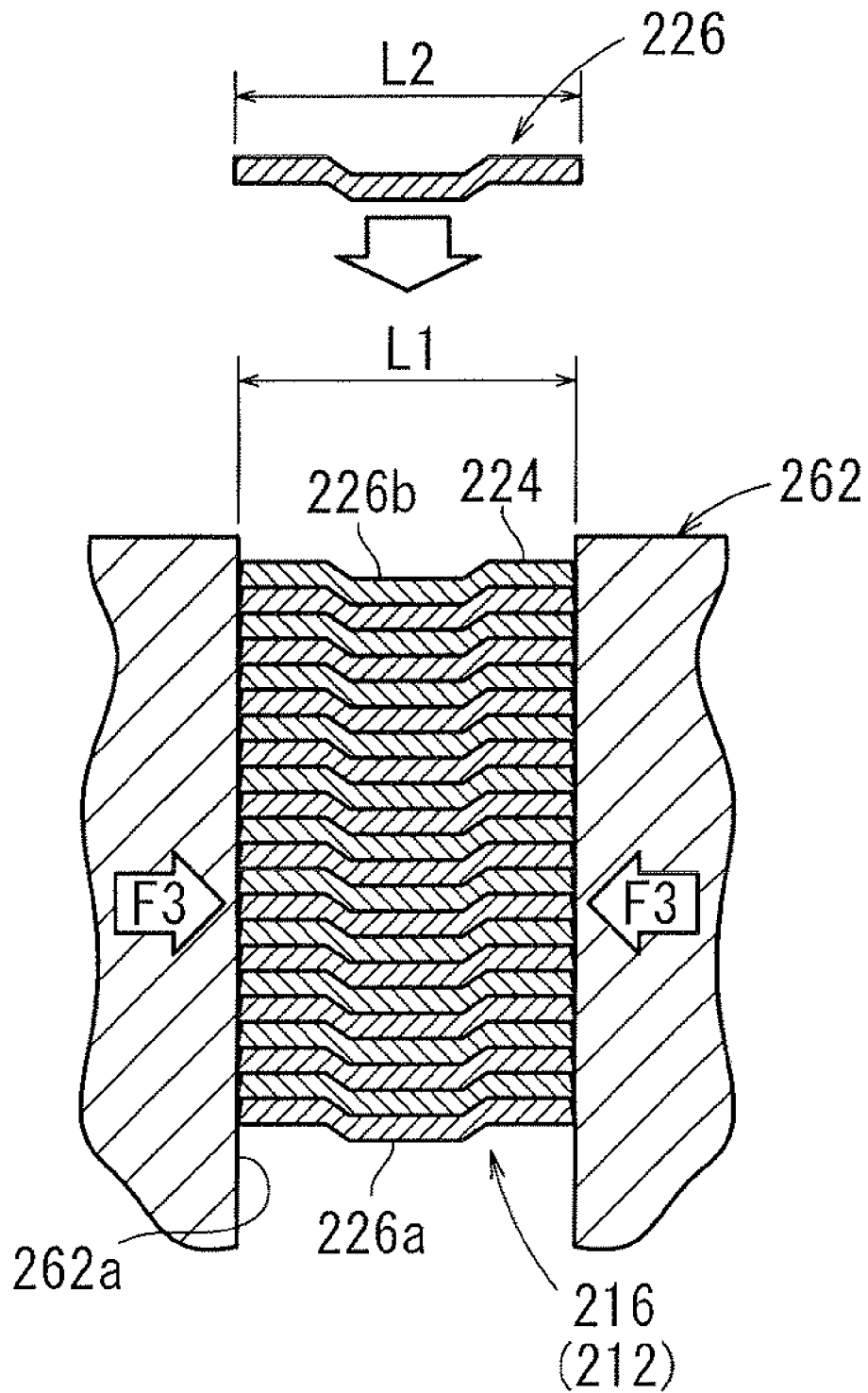
FIG. 39 is a cross-sectional view, with partial omission, showing rectangular lobes of separate core plates stacked by the drop-through die assembly shown in FIG. 38, and a rectangular recess in the inner guide member.

The positioners 226 have rectangular shapes, unlike the circular positioners 26. As shown in FIG. 39, each of the positioners 226 comprises a positioning lobe 226a disposed on a lower surface of the separate core plates 212, 216 and projecting downwardly therefrom, and a positioning cavity 226b disposed on an upper surface of the separate core plates 212, 216, and defined by an inner wall surface of the positioning lobe 226a. When the positioning lobe 226a engages and is crimped in the positioning cavity 226b of the lower layer core plates 214, 218, the positioners 226 function as positioning portions, for positioning the layers as they are stacked, and as coupling portions for coupling the layers with a certain strength, similar to the aforementioned positioners 26.

Figure 37:
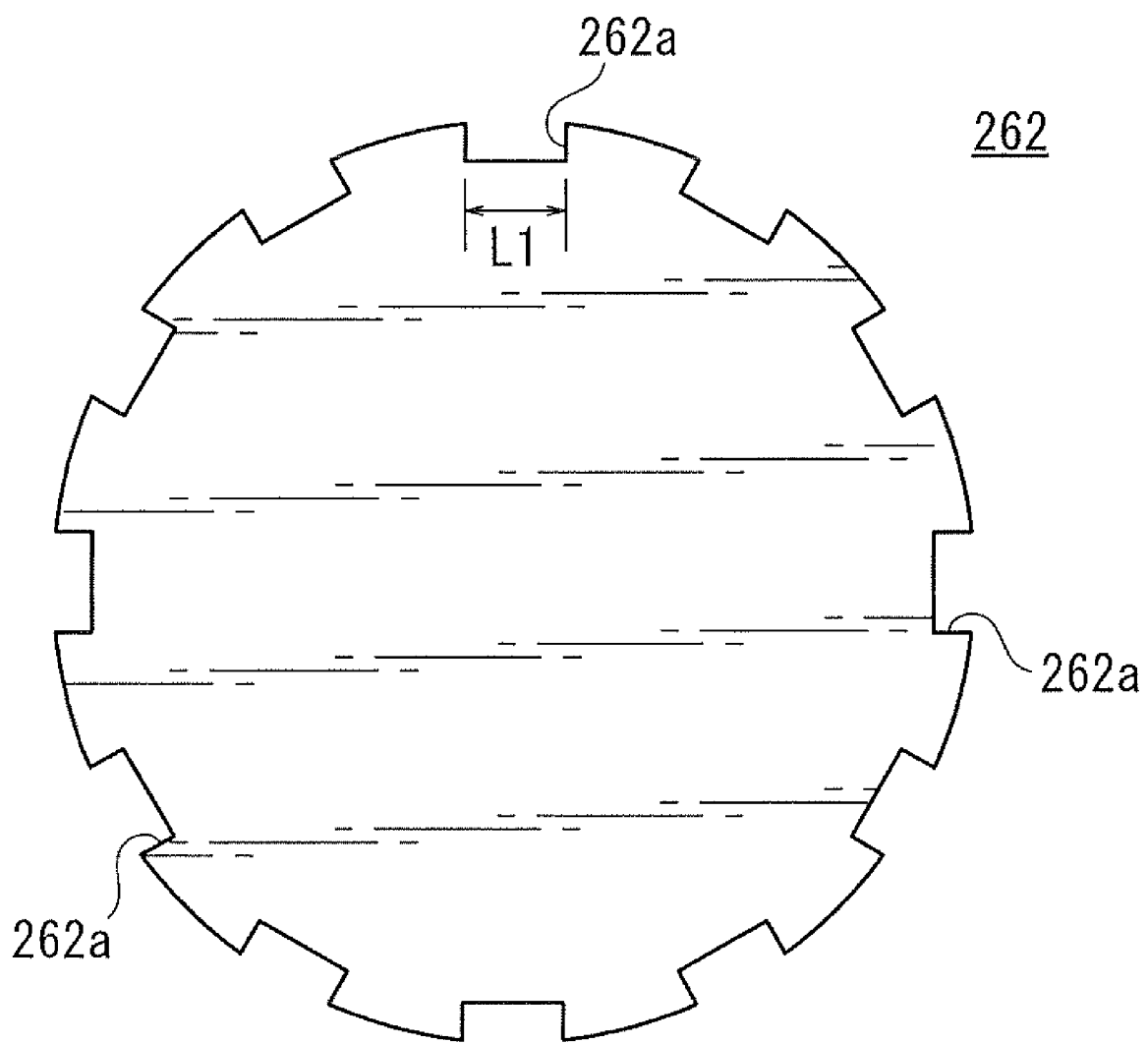
FIG. 37 is a plan view of an inner guide member used when the rotor core shown in FIG. 36 is manufactured.

According to the present embodiment, in order to handle the separate core plates 212, 216 having the rectangular lobes 224, in place of the drop-through die assembly 46, as shown in FIG. 37, a drop-through die assembly 46b, including an inner guide member 262 with rectangular recesses 262a complementary to the rectangular lobes 224, is used to form the rotor core 10d. The rectangular recesses 262a have a width L1, which is slightly smaller than a width L2 (distance between the walls 228) of the rectangular lobes 224 (L1<L2).

Figure 38:
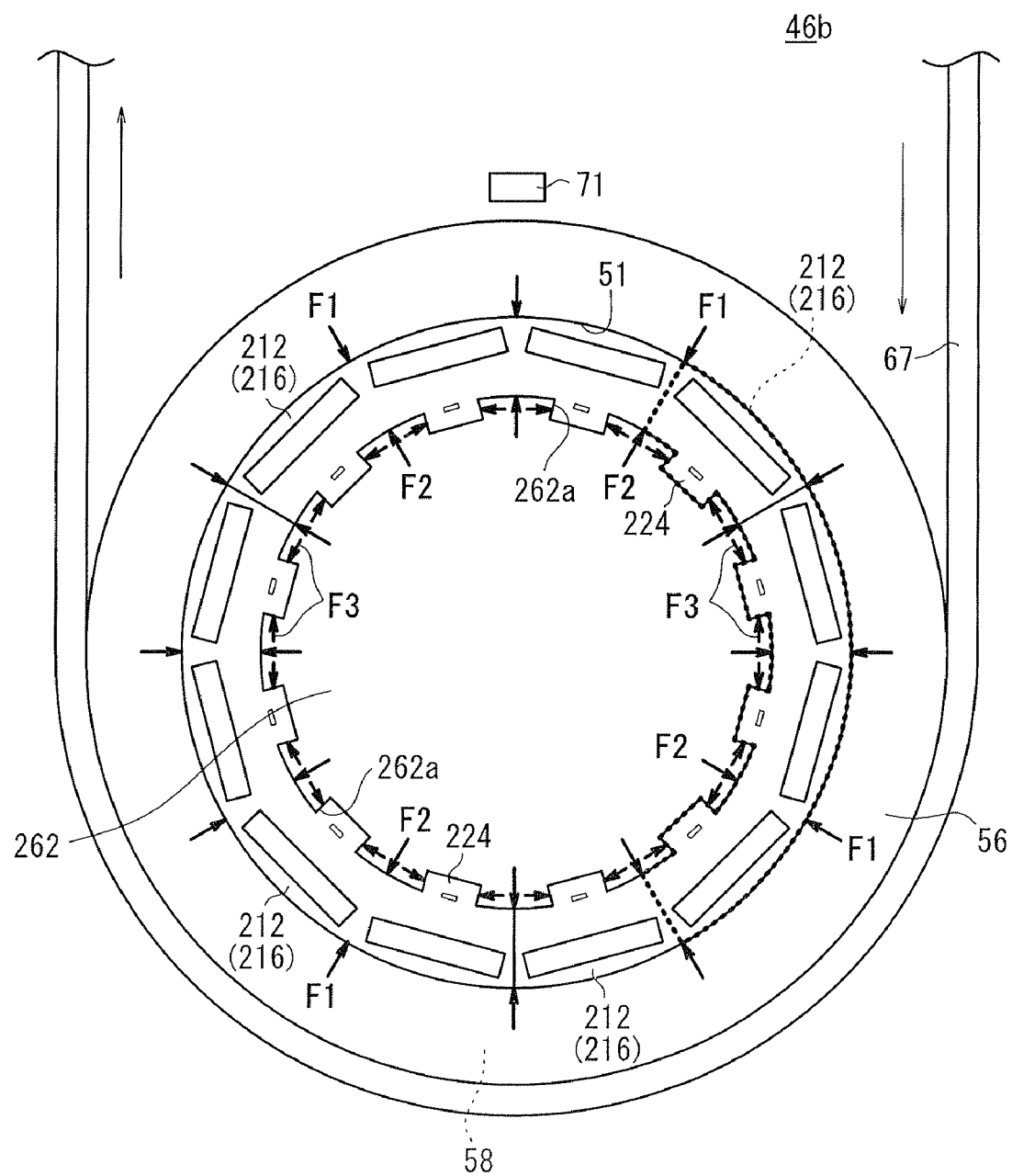
FIG. 38 is a plan view, with partial omission, showing the manner in which a separate core plate is stacked by a drop-through die assembly, which includes the inner guide member shown in FIG. 37.

According to the present embodiment, the width L1 of the rectangular recesses 262a is smaller than the width L2 of the rectangular lobes 224. Therefore, as shown in FIG. 38, when the separate core plates 212 (216) are stacked while being rotated about axes thereof and the layers are pressed (crimped), the rectangular lobes 224 of the separate core plates 212 (216) are press-fitted into the rectangular recesses 262a of the inner guide member 262. The walls 228 of the rectangular lobes 224 are subjected to a pressure from inner wall surfaces of the rectangular recesses 262a.

According to the present embodiment, therefore, when the separate core plates 212 (216) are stacked in the drop-through die assembly 46b, inner arcuate edges of the separate core plates 212 (216) are held in sliding contact with the inner circumferential surface of the outer guide member 58 and are subjected to a side pressure (external pressure) F1. Further, inner arcuate edges thereof are held in sliding contact with the outer circumferential surface of the inner guide member 262 and are subjected to an internal pressure F2. Furthermore, the rectangular lobes 224 have walls 228 thereof held in sliding contact with the rectangular recesses 262a and are subjected to a pressure F3 (see FIG. 38).

According to the present embodiment, since the width L1 of the rectangular recesses 262a of the inner guide member 262 is smaller than the width L2 of the rectangular lobes 224, the separate core plates 212 (216), which are press-fitted into the holder 51, are subjected to pressures F1 through F3 in three directions. Therefore, the stacked separate core plates 212 (216) can be held stably in the holder 51 under increased retentive forces, in the direction in which the separate core plates 212 (216) are rotated. The rotor core 10d can thus be formed efficiently and quickly, with increased quality and accuracy.

Rather than the rectangular shape with the walls 228 extending substantially parallel to each other, the rectangular lobes 224 may be of a trapezoidal shape with the walls 228 extending non-parallel to each other, for example. In other words, the rectangular lobes 224 may be of any structure, insofar as a pressure can be applied to the lobes of the separate core plates to increase the retentive forces in the holder.

In the present embodiment, the rectangular lobes 224 may be replaced with rectangular recesses (plate-side rectangular recesses) and the rectangular recesses 262a may be replaced with rectangular lobes. The positioners 226 may be of a circular shape, similar to the positioners 26, and the pins 22 may be inserted therein.

The rectangular recesses 262a, which are substantially similar to the inner guide member 262, may be applied to the aforementioned inner guide member 164, for example, and the rotor core 10d may be formed by the drop-through die assembly 46a.

The rotor cores 10c, 10c described in the respective embodiments employ pins 22, and the pins 22 are made of a nonmagnetic material. The holes 20 (lobes 24) in which the pins 22 are inserted are in a phase position aligned with centers of the magnet holes 28, or in a central phase position between two adjacent magnet holes 28. The pins 22 are offset by the lobes 24 toward the central axis of the rotor core, from the inside-diameter surface of the rotor core. Naturally, the pins 22 may be disposed at the same pitch as the inside diameter of the rotor core, so that the pins 22 are effectively prevented from posing an obstacle to the magnetic path produced by magnets that are fitted into the magnet holes 28.

Specifically, since the pins 22 are made of a nonmagnetic material, magnetic flux formed by the flow of magnetism passing through the rotor core does not pass through the pins 22, and hence heat due to eddy currents is reduced, thereby minimizing a reduction in fuel economy and output power, because the magnetic flux does not pass through the nonmagnetic material. If the pins 22 are made of a metal such as S50C, then since magnetic flux passes through the pins 22, the pins 22 tend to generate heat and cause a loss.

The pins 22 are disposed under the above conditions (e.g., the pins 22 are disposed in a phase position aligned with centers of the magnet holes 28, or in a central phase position between two adjacent magnet holes 28, or offset toward a central axis of the rotor core). In other words, since the pins 22 are disposed in positions where the flux density is low, a reduction in fuel economy and output power is further minimized. A magnetic field analysis conducted under the above conditions indicated that induced voltage curves, plotted respectively when the pins 22 were used (e.g., the rotor cores 10a, 10c) and when the pins 22 were not used (e.g., the rotor core 10b), exhibited substantially the same peak value, and it was found that there was almost no performance difference, for example, no output difference, irrespective of whether the pins 22 were used or not.

In the rotor cores described above, separate core plates are stacked in a brickwork pattern. Accordingly, shearing loads acting on the pins when the rotor core is in use are effectively distributed.

In the above rotor cores, ends (abutting ends) of the separate core plates have straight shapes. Even if gaps are formed between abutting ends under centrifugal forces when the rotor core is in use, the gaps are uniform, for thereby effectively preventing an induced voltage output waveform from being disturbed by magnetic flux concentration or magnetic saturation, caused by partial contact between the abutting ends. As a result, the phase angle can be detected with increased sensitivity.

In the above rotor cores, if the layers are coupled by pins 22, the positioners 26, which are used when the layers are stacked, are ejected once the pins 22 have been inserted. Consequently, degradation of the magnetic characteristics, which would otherwise result if the positioners 26 were left in place, is reduced.

In the above embodiments, each of the layers is made up of three separate core plates. If the number of separate core plates in each of the layers is changed, then the angles θ1 through θ3, θ11, θ12 may also be changed. Similarly, the number of lobes 24 and the number of pins 22 may also be changed.

The layout of the die assemblies of the rotor core production lines 30, 30a may be changed, and the structure of the die assemblies may also be changed, depending on the shape of the rotor core to be manufactured.

The above rotor core production lines 30, 30a are capable of simultaneously manufacturing two rotor cores from the sheet 32. However, the rotor core production lines 30, 30a may be used to simultaneously manufacture one, or three or more, rotor cores.

In each of the above embodiments, the first separate core plates, etc., may have six magnet holes each.

The apparatus for manufacturing a ring core according to the present invention also may be applied effectively to the formation of a stator core, for use in a stator.

The present invention is not limited to the above embodiments, but may adopt various structural details, without departing from the essential scope of the invention.

The invention claimed is:

1. A method of manufacturing a ring core made up of a plurality of separate core plates having lobes defined on an inner circumferential surface thereof, the separate core plates being arranged and stacked in a ring-shaped pattern, comprising:
supporting the separate core plates with either one of an inner guide member disposed radially inwardly of the separate core plates stacked in the ring-shaped pattern and an outer guide member disposed radially outwardly of the separate core plates, and applying pressure from the other of the inner guide member and the outer guide member, wherein the inner guide member has recesses corresponding to the lobes for positioning and supporting the lobes; and
stacking the separate core plates in the ring-shaped pattern to form the ring core, while rotating the separate core plates in unison through a predetermined angle with the inner guide member and the outer guide member.

2. The method of manufacturing a ring core according to claim 1, wherein the lobes include positioners for fitting into engagement with the core plates in adjacent layers when the separate core plates are stacked as layers.

3. The method of manufacturing a ring core according to claim 2, further comprising the steps of:
blanking the positioners and thereafter pushing back blanked portions to portions of the separate core plates from which the blanked positions have been blanked; and
ejecting the blanked portions that have been pushed back to the stacked separate core plates with pins, and inserting the pins into the separate core plates stacked as layers to thereby couple the layers together.

4. The method of manufacturing a ring core according to claim 3, wherein the pins are made of a nonmagnetic material.

5. The method of manufacturing a ring core according to claim 1, wherein the separate core plates are press-fitted between the inner guide member and the outer guide member.

6. The method of manufacturing a ring core according to claim 1, wherein the separate core plates are coated in advance with an adhesive.

7. The method of manufacturing a ring core according to claim 1, wherein when the separate core plates are stacked as layers in the ring-shaped pattern, the separate core plates have ends thereof displaced relatively to each other between superimposed layers.

8. A method of manufacturing a ring core made up of a plurality of separate core plates arranged and stacked in a ring-shaped pattern, comprising:
supporting the separate core plates with either one of an inner guide member disposed radially inwardly of the separate core plates stacked in the ring-shaped pattern and an outer guide member disposed radially outwardly of the separate core plates, and applying pressure from the other of the inner guide member and the outer guide member; and
stacking the separate core plates in the ring-shaped pattern to form the ring core, while rotating the separate core plates in unison through a predetermined angle with the inner guide member and the outer guide member,
wherein the separate core plates are press-fitted between the inner guide member and the outer guide member.

9. The method of manufacturing a ring core according to claim 8, wherein the separate core plates have plate-side lobes on inner circumferential surfaces thereof, the plate-side lobes including positioners for fitting into engagement with the core plates in adjacent layers when the separate core plates are stacked as layers, and
the inner guide member has recesses corresponding to the plate-side lobes for positioning and supporting the plate-side lobes.

10. The method of manufacturing a ring core according to claim 9, further comprising the steps of:
blanking the positioners and thereafter pushing back blanked portions to portions of the separate core plates from which the blanked positions have been blanked; and
ejecting the blanked portions that have been pushed back to the stacked separate core plates with pins, and inserting the pins into the separate core plates stacked as layers to thereby couple the layers together.

11. The method of manufacturing a ring core according to claim 10, wherein the pins are made of a nonmagnetic material.

12. The method of manufacturing a ring core according to claim 8, wherein the separate core plates are coated in advance with an adhesive.

13. The method of manufacturing a ring core according to claim 8, wherein when the separate core plates are stacked as layers in the ring-shaped pattern, the separate core plates have ends thereof displaced relatively to each other between superimposed layers.

* * * * *